US012413870B2

(12) United States Patent
Asakura

(10) Patent No.: US 12,413,870 B2
(45) Date of Patent: Sep. 9, 2025

(54) SOLID-STATE IMAGING ELEMENT

(71) Applicant: Sony Semiconductor Solutions Corporation, Kanagawa (JP)

(72) Inventor: LuongHung Asakura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 177 days.

(21) Appl. No.: 18/550,180

(22) PCT Filed: Jan. 13, 2022

(86) PCT No.: PCT/JP2022/000864
§ 371 (c)(1),
(2) Date: Sep. 12, 2023

(87) PCT Pub. No.: WO2022/190657
PCT Pub. Date: Sep. 22, 2022

(65) Prior Publication Data
US 2024/0187752 A1    Jun. 6, 2024

(30) Foreign Application Priority Data

Mar. 19, 2021   (JP) ................. 2021-045378

(51) Int. Cl.
*H04N 25/616*    (2023.01)
*H04N 25/532*    (2023.01)
(Continued)

(52) U.S. Cl.
CPC ......... *H04N 25/616* (2023.01); *H04N 25/532* (2023.01); *H04N 25/766* (2023.01); *H04N 25/77* (2023.01); *H04N 25/78* (2023.01)

(58) Field of Classification Search
CPC .. H04N 25/532; H04N 25/616; H04N 25/766; H04N 25/77; H04N 25/771; H04N 25/78
See application file for complete search history.

(56) References Cited

U.S. PATENT DOCUMENTS

2015/0341582 A1*  11/2015  Sakaguchi ........... H04N 25/771
                                                       348/301
2020/0260034 A1*   8/2020  Moue ..................... H10F 39/802
2021/0144330 A1*   5/2021  Otaka .................. H04N 25/443

FOREIGN PATENT DOCUMENTS

JP    2015119340 A    6/2015
JP    2018207488 A   12/2018
JP    2019057873 A    4/2019

OTHER PUBLICATIONS

International Search Report (PCT/ISA/210), International Application No. PCT/JP2022/000864, dated Mar. 22, 2022.
(Continued)

*Primary Examiner* — Lin Ye
*Assistant Examiner* — Chriss S Yoder, III
(74) *Attorney, Agent, or Firm* — Michael Best & Friedrich LLP

(57) ABSTRACT

To improve image quality in a solid-state imaging element that simultaneously performs exposure in all pixels.
The solid-state imaging element includes a predetermined number of capacitive elements, a pre-stage circuit, a selection circuit, a post-stage circuit, and a vertical scanning circuit. The pre-stage circuit generates a predetermined reset level and a signal level corresponding to an exposure amount, and causes each of the capacitive elements to hold a corresponding one of the reset level and the signal level. In the selection circuit, a selection transistor that opens and closes a path between one end of each capacitive element and a predetermined node is arranged. The post-stage circuit sequentially reads the reset level and the signal level via the node. The vertical scanning circuit performs control to lower the potential of the one end when the reset level and the signal level are held.

20 Claims, 42 Drawing Sheets

(51) Int. Cl.
*H04N 25/766* (2023.01)
*H04N 25/77* (2023.01)
*H04N 25/78* (2023.01)

(56) References Cited

OTHER PUBLICATIONS

Geunsook Park et al., "A 2.2μm Stacked Back Side Illuminated Voltage Domain Global Shutter CMOS Image Sensor," 2019 IEEE International Electr on Devices Meeting, pp. 16.4.1-16.4.4.

\* cited by examiner

FIG. 9
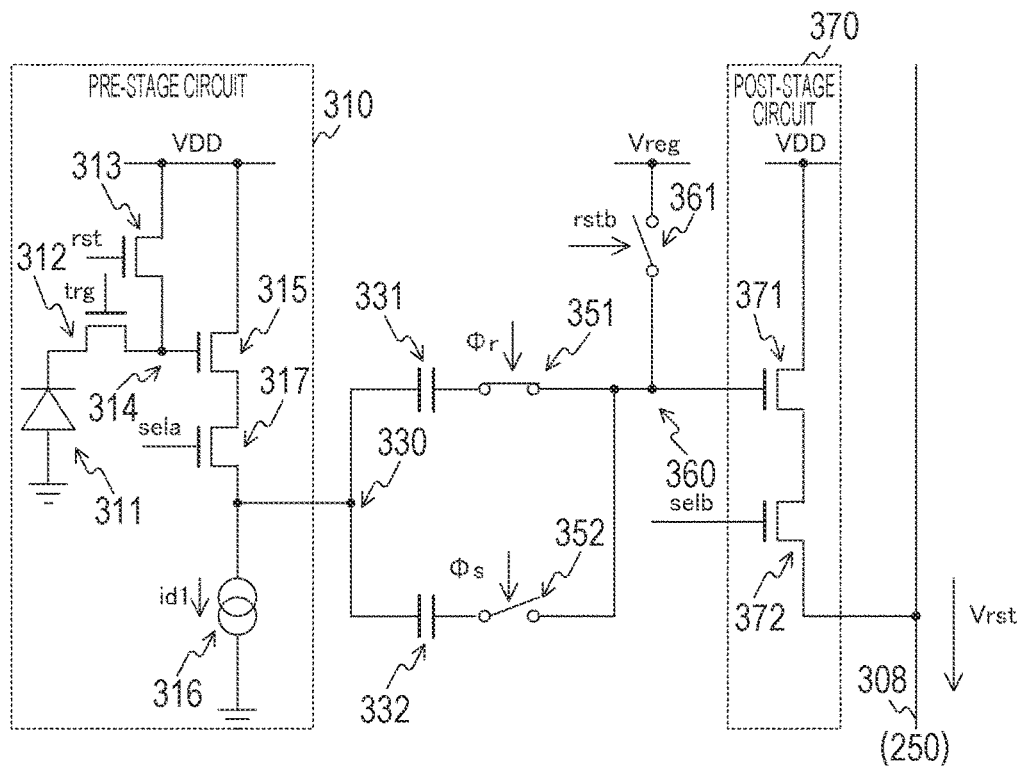
a
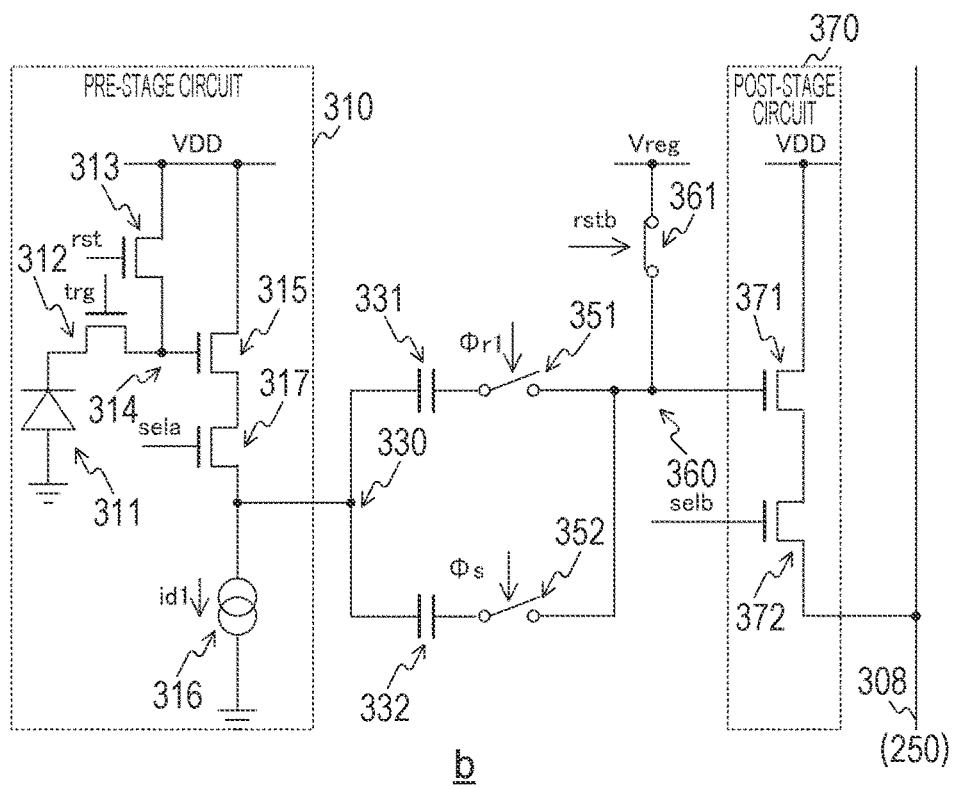
b

FIG. 21
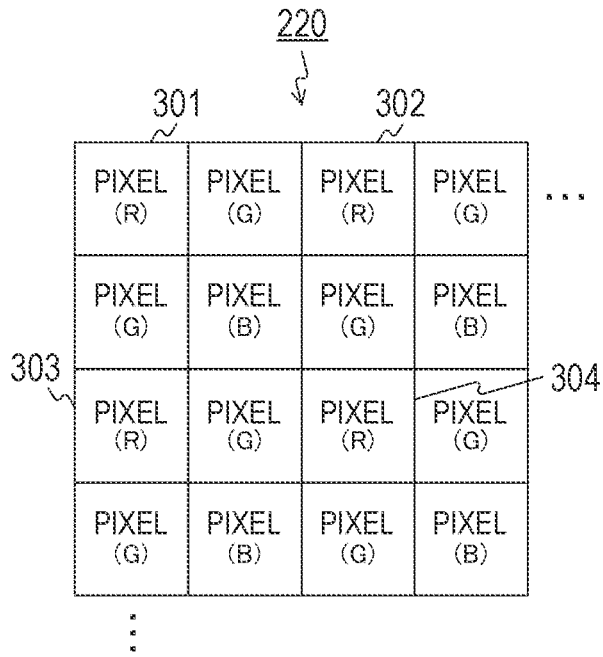
a
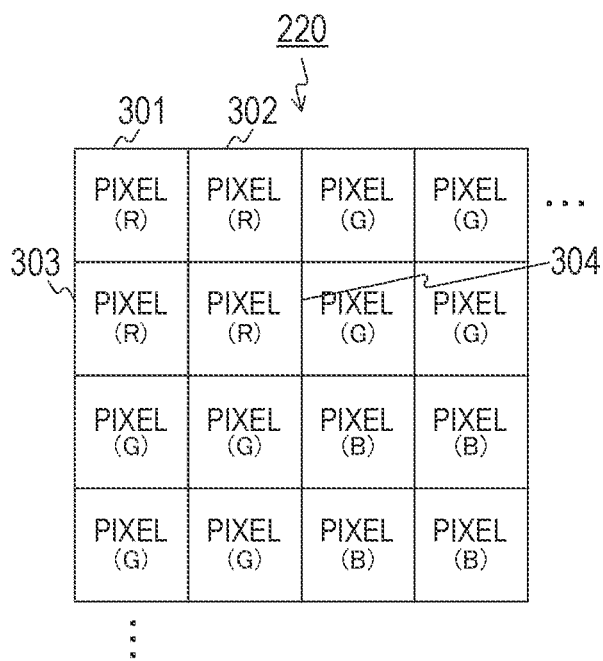
b

SOLID-STATE IMAGING ELEMENT

TECHNICAL FIELD

The present technology relates to a solid-state imaging element. Specifically, the present technology relates to a solid-state imaging element that performs analog to digital (AD) conversion for each column.

BACKGROUND ART

Conventionally, for a solid-state imaging element, in order to miniaturizing pixels, a column analog to digital converter (ADC) method in which with an ADC arranged for each column outside a pixel array unit, pixel signals are sequentially read row by row has been used. In this column ADC method, in a case where exposure is performed by a rolling shutter method in which exposure starts row by row, there is a possibility that rolling shutter distortion occurs. Therefore, in order to realize a global shutter method in which exposure simultaneously starts in all pixels, a solid-state imaging element in which a pair of capacitors is provided for each pixel, and the capacitors hold a reset level and a signal level has been proposed (for example, refer to Non-Patent Document 1). A pair of transistors is arranged between the pair of capacitors and a pre-stage circuit, and the reset level and the signal level are supplied to the capacitors via the transistors.

CITATION LIST

Non-Patent Document

Non-Patent Document 1: Geunsook Park et al., A 2.2 µm Stacked Back Side Illuminated Voltage Domain Global Shutter CMOS Image Sensor, 2019 IEEE International Electron Devices Meeting.

SUMMARY OF THE INVENTION

Problems to be Solved by the Invention

In the above-described conventional technology, the reset level and the signal level are held in the pair of capacitors for each pixel, thereby realizing the global shutter method based on the column ADC method. In the above-described conventional technology, however, the longer the time during which a signal (reset level or signal level) is held in the pair of capacitors, the more likely that leakage current will occur at a pn junction between a high-impedance drain of a transistor or the like and a semiconductor substrate. When leakage current occurs, noise is generated in image data due to variations in leakage current for each pixel, and the image quality of the image data may deteriorate accordingly.

The present technology has been made in view of such circumstances, and it is therefore an object of the present technology to improve image quality for a solid-state imaging element in which all pixels are simultaneously exposed.

Solutions to Problems

The present technology has been made to solve the above-described problems, and a first aspect of the present technology is a solid-state imaging element including a predetermined number of capacitive elements, a pre-stage circuit that generates a predetermined reset level and a signal level corresponding to an exposure amount and causes each of the capacitive elements to hold a corresponding one of the reset level and the signal level, a selection circuit in which a selection transistor that opens and closes a path between one end of each of the capacitive elements and a predetermined node is arranged, a post-stage circuit that sequentially reads the reset level and the signal level via the node, and a vertical scanning circuit that performs control to lower a potential of the one end when the reset level and the signal level are held. This configuration brings about an effect of suppressing the occurrence of leakage current.

Furthermore, according to the first aspect, the node may be a post-stage node that is a connection point between the selection circuit and the post-stage circuit, the capacitive elements may include first and second capacitive elements, the selection circuit may include a first selection transistor that opens and closes a path between one end of the first capacitive element and the post-stage node, and a second selection transistor that opens and closes a path between one end of the second capacitive element and the post-stage node, the first and second capacitive elements having their respective another ends commonly connected to a predetermined pre-stage node, the pre-stage circuit may include a pre-stage selection transistor that outputs each of the reset level and the signal level to the pre-stage node in accordance with a predetermined pre-stage selection signal input to a gate, and the vertical scanning circuit may lower a voltage of the pre-stage selection signal when the reset level and the signal level are held. This configuration brings about an effect of suppressing the occurrence of leakage current by means of control of reference voltage.

Furthermore, according to the first aspect, the node may be a pre-stage node that is a connection point between the pre-stage circuit and the selection circuit, the predetermined number of capacitive elements may include first and second capacitive elements, the selection circuit may include a first selection transistor that opens and closes a path between one end of the first capacitive element and the pre-stage node, and a second selection transistor that opens and closes a path between one end of the second capacitive element and the pre-stage node, and the vertical scanning circuit may lower a reference voltage of a signal line to which their respective another ends of the first and second capacitive elements are commonly connected when the reset level and the signal level are held. This configuration brings about an effect of suppressing the occurrence of leakage current by means of control of reference voltage.

Furthermore, according to the first aspect, the node may be a pre-stage node that is a connection point between the pre-stage circuit and the selection transistor, the predetermined number of capacitive elements may include a first capacitive element inserted between the selection transistor and a predetermined signal line and a second capacitive element inserted between the selection transistor and the post-stage circuit, and the vertical scanning circuit may lower a reference voltage of the signal line when the reset level and the signal level are held. This configuration brings about an effect of suppressing the occurrence of leakage current by means of control of reference voltage.

Furthermore, according to the first aspect, the node may be a connection node between the pre-stage circuit and the post-stage circuit, the predetermined number of capacitive elements may include first and second capacitive elements, the selection circuit may include a first selection transistor that opens and closes a path between one end of the first capacitive element and the connection node, and a second selection transistor that opens and closes a path between one end of the second capacitive element and the connection node, and the vertical scanning circuit may lower a reference voltage of a signal line to which their respective another ends of the first and second capacitive elements are commonly connected when the reset level and the signal level are held. This configuration brings about an effect of suppressing the occurrence of leakage current by means of control of reference voltage.

Furthermore, according to the first aspect, a post-stage reset transistor may be further provided, the node may be a post-stage node that is a connection point between the selection circuit and the post-stage circuit, the pre-stage circuit may be arranged in a pre-stage circuit block that generates each of the reset level and a plurality of the signal levels corresponding to the exposure amount and causes each of the capacitive elements to hold a corresponding one of the reset level and the plurality of signal levels, the selection circuit may be arranged in a selection unit that sequentially performs control to connect a capacitive element in which the reset level is held among the predetermined number of capacitive elements to a predetermined post-stage node, control to disconnect the predetermined number of capacitive elements from the post-stage node, and control to connect a capacitive element in which one of the plurality of signal levels is held among the predetermined number of capacitive elements to the post-stage node, and the post-stage reset transistor may initialize a level of the post-stage node when the predetermined number of capacitive elements are disconnected from the post-stage node. This configuration brings about an effect of reducing kTC noise.

Furthermore, according to the first aspect, the predetermined number of capacitive elements may include first and second capacitive elements and third and fourth capacitive elements, the pre-stage circuit block may include a first pre-stage circuit that sequentially generates a first reset level and a first signal level and causes the first and second capacitive elements to hold the first reset level and the first signal level, and a second pre-stage circuit that sequentially generates a second reset level and a second signal level and causes the third and fourth capacitive elements to hold the second reset level and the second signal level, and the selection unit may include a first selection circuit that connects one of the first and second capacitive elements to the post-stage node, and a second selection circuit that connects one of the third and fourth capacitive elements to the post-stage node. This configuration brings about an effect of holding the reset level and the signal level of each of the two pixels.

Furthermore, according to the first aspect, the first pre-stage circuit may include a first photoelectric conversion element, a first pre-stage transfer transistor that transfers charges from the first photoelectric conversion element to a first floating diffusion layer, a first reset transistor that initializes the first floating diffusion layer, and a first pre-stage amplification transistor that amplifies a voltage of the first floating diffusion layer, and the second pre-stage circuit may include a second photoelectric conversion element, a second pre-stage transfer transistor that transfers charges from the second photoelectric conversion element to a second floating diffusion layer, a second reset transistor that initializes the second floating diffusion layer, and a second pre-stage amplification transistor that amplifies a voltage of the second floating diffusion layer. This configuration brings about an effect of holding the level corresponding to the voltage of the floating diffusion layer.

Furthermore, according to the first aspect, the first pre-stage circuit may further include a first current source transistor connected to a first pre-stage node, the second pre-stage circuit may further include a second current source transistor connected to a second pre-stage node, the first pre-stage amplification transistor may amplify the voltage of the first floating diffusion layer, and outputs the amplified voltage to the first pre-stage node, the second pre-stage amplification transistor may amplify the voltage of the second floating diffusion layer, and outputs the amplified voltage to the second pre-stage node, the first and second capacitive elements may have their respective one ends commonly connected to the first pre-stage node, and have their respective another ends connected to the first selection circuit, and the third and fourth capacitive elements may have their respective one ends commonly connected to the second pre-stage node, and have their respective another ends connected to the second selection circuit. This configuration brings about an effect of supplying a constant current to each pixel.

Furthermore, according to the first aspect, at predetermined exposure start timing, the first and second pre-stage transfer transistors may transfer the charges to the first and second floating diffusion layers, and the first and second reset transistors may initialize the first and second floating diffusion layers and the first and second photoelectric conversion elements, and at predetermined exposure end timing, the first and second pre-stage transfer transistors may transfer the charges to the first and second floating diffusion layers. This configuration brings about an effect of simultaneously exposing all pixels.

Furthermore, according to the first aspect, the selection unit may sequentially perform control to connect one of the first and second capacitive elements to the post-stage node, control to connect the other of the first and second capacitive elements to the post-stage node, control to connect one of the third and fourth capacitive elements to the post-stage node, and control to connect the other of the third and fourth capacitive elements to the post-stage node. This configuration brings about an effect of sequentially reading the reset level and the signal level of each of the two pixels.

Furthermore, according to the first aspect, in a predetermined addition mode, the selection unit may sequentially perform control to connect both one of the first and second capacitive elements and one of the third and fourth capacitive elements to the post-stage node and control to connect both the other of the first and second capacitive elements and the other of the third and fourth capacitive elements to the post-stage node. This configuration brings about an effect of reading the signal obtained by pixel addition.

Furthermore, according to the first aspect, the first pre-stage circuit may further include a first pre-stage selection transistor that outputs a voltage amplified by the first pre-stage amplification transistor to a predetermined pre-stage node in accordance with a predetermined first selection signal, the second pre-stage circuit may further include a second pre-stage selection transistor that outputs a voltage amplified by the second pre-stage amplification transistor to the pre-stage node in accordance with a predetermined second selection signal, and a current source transistor connected to the pre-stage node, the first and second capacitive elements may have their respective one ends commonly connected to the pre-stage node, and have their respective another ends connected to the first selection circuit, and the third and fourth capacitive elements may have their respective one ends commonly connected to the pre-stage node, and have their respective another ends connected to the second selection circuit. This configuration brings about an effect of sharing the current source transistor by two pixels.

Furthermore, according to the first aspect, the first and second pre-stage selection transistors may sequentially shift to a closed state immediately before a predetermined exposure end timing and after the exposure end timing, the first reset transistor may initialize the first floating diffusion layer in a case where the first pre-stage selection transistor is in the closed state, the second reset transistor may initialize the second floating diffusion layer in a case where the second pre-stage selection transistor is in the closed state, the first and second pre-stage selection transistors may sequentially shift to the closed state immediately after the exposure end timing, and the first and second pre-stage transfer transistors may transfer the charges at the predetermined exposure end timing. This configuration in which the current source transistor is shared by two pixels brings about an effect of simultaneously exposing all pixels.

Furthermore, according to the first aspect, a short-circuit transistor that opens and closes a path between a first post-stage node and a second post-stage node may be further provided, the predetermined number of capacitors may include first, second, third, fourth, fifth, sixth, seventh, and eighth capacitive elements, and the selection unit may include a first selection circuit that connects one of the first and second capacitive elements to the first post-stage node, a second selection circuit that connects one of the third and fourth capacitive elements to the first post-stage node, a third selection circuit that connects one of the fifth and sixth capacitive elements to the second post-stage node, and a fourth selection circuit that connects one of the seventh and eighth capacitive elements to the second post-stage node. This configuration brings about an effect of short-circuiting the first post-stage node and the second post-stage node.

Furthermore, according to the first aspect, in a predetermined non-addition mode, the short-circuit transistor may be in an open state, and in the non-addition mode, the selection unit may perform, in a predetermined order, control to sequentially connect each of the first and second capacitive elements to the first post-stage node, control to sequentially connect each of the third and fourth capacitive elements to the first post-stage node, control to sequentially connect each of the fifth and sixth capacitive elements to the second post-stage node, and control to sequentially connect each of the seventh and eighth capacitive elements to the second post-stage node. This configuration brings about an effect of sequentially reading the reset level and the signal level of each of the four pixels in the non-addition mode.

Furthermore, according to the first aspect, in a predetermined addition mode, the short-circuit transistor may be in a closed state, and in the addition mode, the selection unit may sequentially perform control to connect one of the fifth and sixth capacitive elements and one of the seventh and eighth capacitive elements to the second post-stage node while connecting one of the first and second capacitive elements and one of the third and fourth capacitive elements to the first post-stage node, and control to connect the other of the fifth and sixth capacitive elements and the other of the seventh and eighth capacitive elements to the second post-stage node while connecting the other of the first and second capacitive elements and the other of the third and fourth capacitive elements to the first post-stage node. This configuration brings about an effect of adding four pixels in the pixel addition mode.

Furthermore, according to the first aspect, the predetermined number of capacitive elements may include first and second capacitive elements and a third capacitor, the pre-stage circuit block may include a first photoelectric conversion element, a first pre-stage transfer transistor that transfers charges from the first photoelectric conversion element to a predetermined floating diffusion layer, a second photoelectric conversion element, a second pre-stage transfer transistor that transfers charges from the second photoelectric conversion element to a predetermined floating diffusion layer, a reset transistor that initializes the floating diffusion layer, and a pre-stage amplification transistor that amplifies a voltage of the floating diffusion layer and outputs the amplified voltage to a predetermined pre-stage node, and the first and second capacitive elements and the third capacitive element may have their respective one ends commonly connected to the pre-stage node, and have their respective another ends connected to the selection unit. This brings about an effect of holding the reset level and the plurality of signal levels.

Furthermore, according to the first aspect, at predetermined exposure start timing, the first and second pre-stage transfer transistors may transfer the charges to the floating diffusion layer, and the reset transistor may initialize the floating diffusion layer and the first and second photoelectric conversion elements, and at predetermined exposure end timing, the first and second pre-stage transfer transistors may sequentially transfer the charges to the first and second floating diffusion layers. This brings about an effect of exposing all pixels.

Furthermore, according to the first aspect, the selection unit may sequentially perform control to connect one of the first and second capacitive elements to the post-stage node, control to connect the other of the first and second capacitive elements to the post-stage node, and control to connect the third capacitive element to the post-stage node. This brings about an effect of sequentially reading the reset level and the plurality of signal levels.

BRIEF DESCRIPTION OF DRAWINGS

FIG. 9 is a diagram depicting an example of states of the pixel at the time of reading a reset level and at the time of initialization of a post-stage node in the first embodiment of the present technology.

FIG. 21 is a plan view depicting a configuration example of a pixel array unit in a third embodiment of the present technology.

MODE FOR CARRYING OUT THE INVENTION

Hereinafter, modes for carrying out the present technology (hereinafter referred to as embodiments) will be described. The description will be given in the following order.

Figure 1:
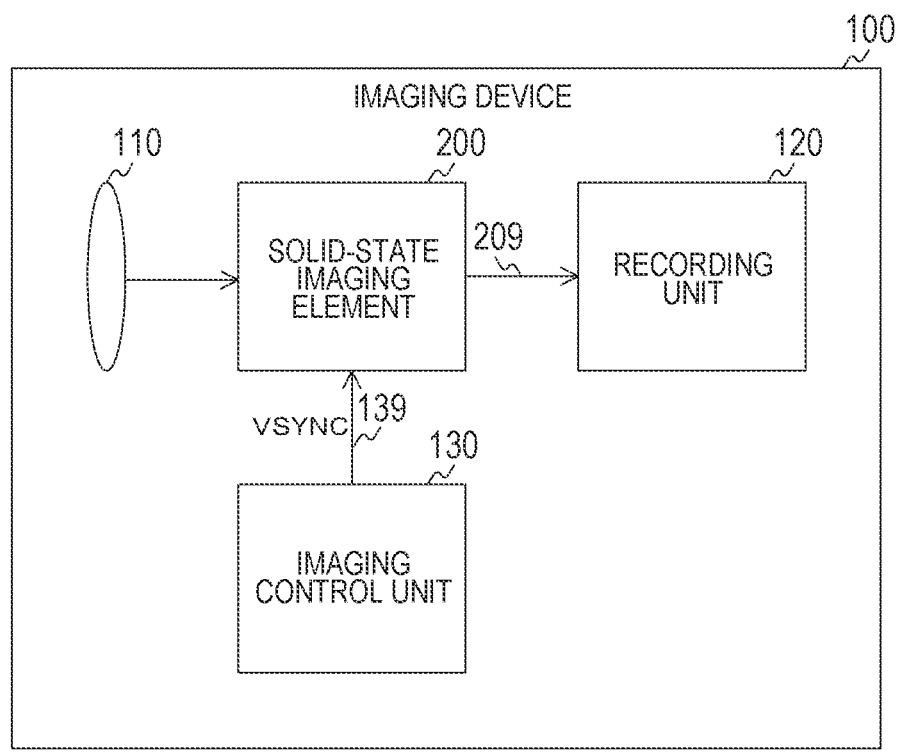
FIG. 1 is a block diagram depicting a configuration example of an imaging device in a first embodiment of the present technology.

1. First Embodiment (example of controlling pre-stage selection transistor)
2. Second Embodiment (example of sharing circuit by two pixels and controlling pre-stage selection transistor)
3. Third Embodiment (example of short-circuiting post-stage nodes and controlling pre-stage selection transistor)
4. Fourth Embodiment (example of sharing current source and controlling pre-stage selection transistor)
5. Fifth Embodiment (example of causing one capacitor to hold reset level, causing a plurality of capacitors to hold signal level, and controlling pre-stage selection transistor)
6. Sixth Embodiment (example of controlling reference voltage)
7. Seventh Embodiment (example of controlling reference voltage)
8. Eighth Embodiment (example of controlling reference voltage)
9. Application Example to Mobile Body 1. First Embodiment Configuration Example of Imaging Device FIG. 1 is a block diagram depicting a configuration example of an imaging device 100 in a first embodiment of the present technology. The imaging device 100 is a device that captures image data, and includes an imaging lens 110, a solid-state imaging element 200, a recording unit 120, and an imaging control unit 130. As the imaging device 100, a digital camera, and an electronic device (a smartphone, a personal computer, or the like) having an imaging function are assumed.

The solid-state imaging element 200 captures the image data under control of the imaging control unit 130. The solid-state imaging element 200 supplies the image data to the recording unit 120 via a signal line 209.

The imaging lens 110 condenses light and guides the light to the solid-state imaging element 200. The imaging control unit 130 controls the solid-state imaging element 200 to capture the image data. For example, the imaging control unit 130 supplies an imaging control signal including a vertical synchronization signal VSYNC to the solid-state imaging element 200 via a signal line 139. The recording unit 120 records the image data.

Here, the vertical synchronization signal VSYNC is a signal indicating imaging timing, and a periodic signal of a constant frequency (such as 60 hertz) is used as the vertical synchronization signal VSYNC.

Note that although the imaging device 100 records the image data, the image data may be transmitted to the outside of the imaging device 100. In this case, an external interface for transmitting the image data is further provided. Alternatively, the imaging device 100 may further display the image data. In this case, a display section is further provided.

Configuration Example of Solid-State Imaging Element

Figure 2:
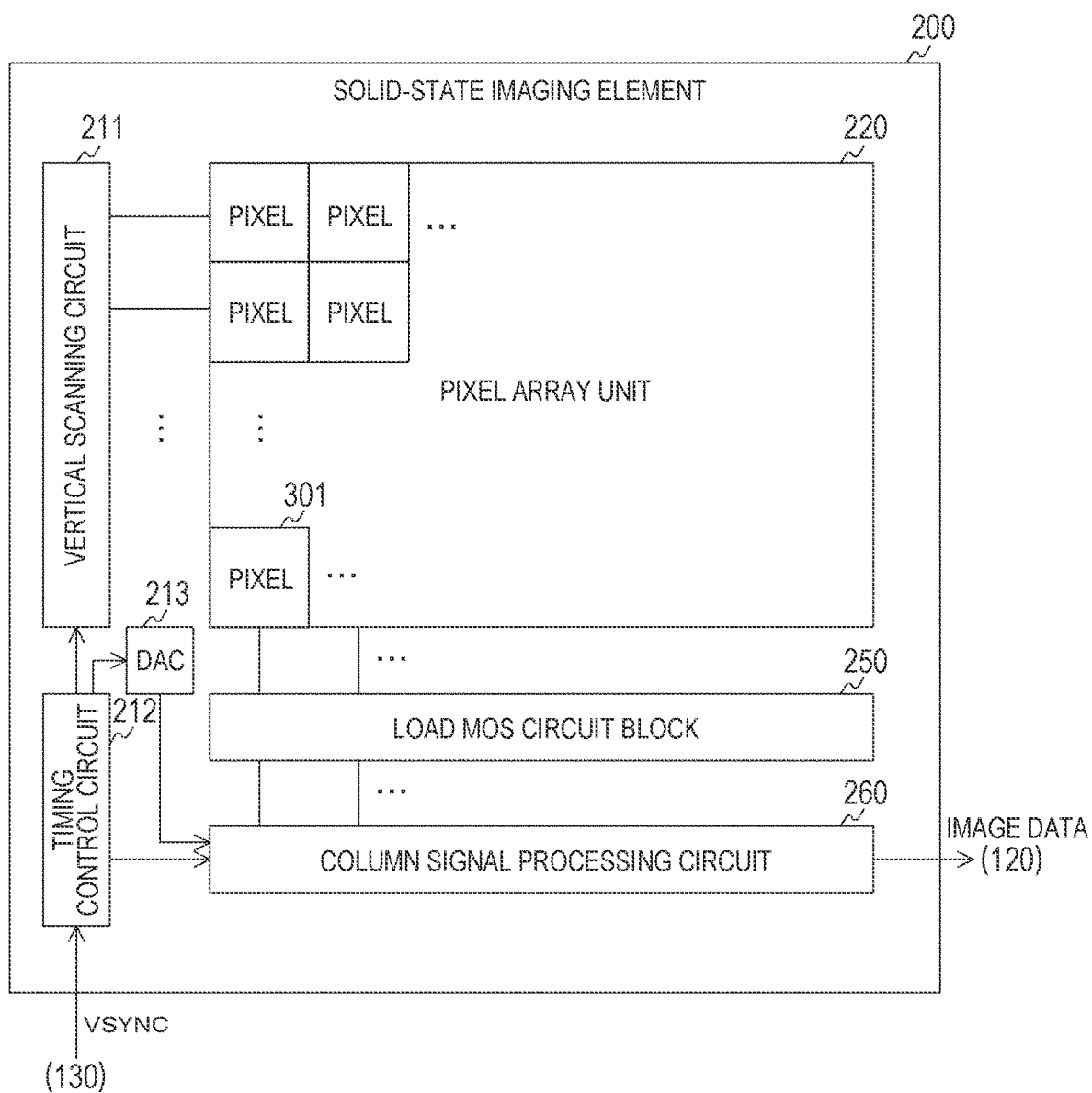
FIG. 2 is a block diagram depicting a configuration example of a solid-state imaging element in the first embodiment of the present technology.

FIG. 2 is a block diagram depicting a configuration example of the solid-state imaging element 200 in the first embodiment of the present technology. The solid-state imaging element 200 includes a vertical scanning circuit 211, a pixel array unit 220, a timing control circuit 212, a digital to analog converter (DAC) 213, a load MOS circuit block 250, and a column signal processing circuit 260. In the pixel array unit 220, a plurality of pixels such as pixels 301 is arranged in a two-dimensional lattice pattern. Furthermore, each circuit in the solid-state imaging element 200 is provided in, for example, a single semiconductor chip.

The timing control circuit 212 controls the operation timing of each of the vertical scanning circuit 211, the DAC 213, and the column signal processing circuit 260 in synchronization with the vertical synchronization signal VSYNC from the imaging control unit 130.

The DAC 213 generates a sawtooth wave-like ramp signal by digital-to-analog (DA) conversion. The DAC 213 supplies the generated ramp signal to the column signal processing circuit 260.

The vertical scanning circuit 211 sequentially selects and drives rows, and outputs analog pixel signals. The pixel photoelectrically converts incident light to generate an analog pixel signal. This pixel supplies the pixel signal to the column signal processing circuit 260 via the load MOS circuit block 250.

In the load MOS circuit block 250, a MOS transistor that supplies a constant current is provided for each column.

The column signal processing circuit 260 performs signal processing such as AD conversion processing and correlated double sampling (CDS) processing on the pixel signal for each column. The column signal processing circuit 260 supplies the image data including the processed signals to the recording unit 120.

Configuration Example of Pixel

Figure 3:
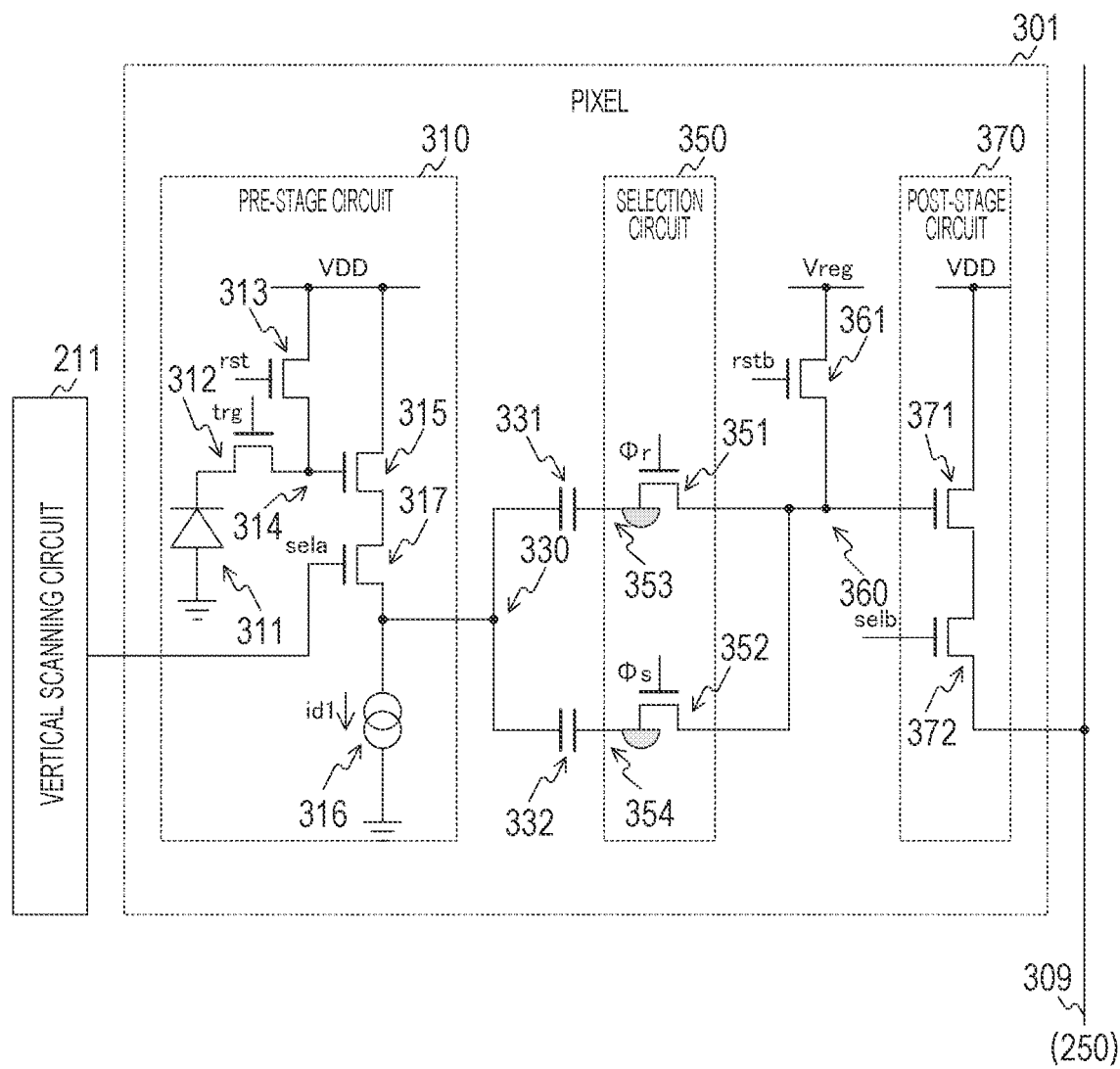
FIG. 3 is a circuit diagram depicting a configuration example of a pixel in the first embodiment of the present technology.

FIG. 3 is a circuit diagram depicting a configuration example of the pixel 301 in the first embodiment of the present technology. In the pixel 301, a pre-stage circuit 310, capacitive elements 331 and 332, a selection circuit 350, a post-stage reset transistor 361, and a post-stage circuit 370 are arranged. As the capacitive elements 331 and 332, for example, a capacitor having a metal-insulator-metal (MIM) structure is used. Note that the capacitive elements 331 and 332 are examples of first and second capacitive elements described in the claims.

The pre-stage circuit 310 sequentially generates a reset level and a signal level, and causes the capacitive elements 331 and 332 to hold the reset level and the signal level. The pre-stage circuit 310 includes a photoelectric conversion element 311, a transfer transistor 312, a floating diffusion (FD) reset transistor 313, an FD 314, a pre-stage amplification transistor 315, a current source transistor 316, and a pre-stage selection transistor 317.

The photoelectric conversion element 311 generates charges by the photoelectric conversion. The transfer transistor 312 transfers the charges from the photoelectric conversion element 311 to the FD 314 in accordance with a transfer signal trg from the vertical scanning circuit 211.

The FD reset transistor 313 extracts the charges from the FD 314 to initialize the FD 314 in accordance with an FD reset signal rst from the vertical scanning circuit 211. The FD 314 accumulates charges, and generates a voltage corresponding to a charge amount.

The pre-stage amplification transistor 315 amplifies the level of the voltage of the FD 314. The pre-stage selection transistor 317 outputs the level amplified by the pre-stage amplification transistor 315 to a pre-stage node 330 in accordance with a pre-stage selection signal sela from the vertical scanning circuit 211.

The FD reset transistor 313 and the pre-stage amplification transistor 315 have their respective drains connected to a power supply voltage VDD. The current source transistor 316 is connected to the source of the pre-stage selection transistor 317. The current source transistor 316 supplies a current id1 under the control of the vertical scanning circuit 211.

The capacitive elements 331 and 332 have their respective one ends commonly connected to the pre-stage node 330, and have their respective other ends connected to the selection circuit 350.

The selection circuit 350 includes selection transistors 351 and 352. The selection transistor 351 opens and closes a path between the capacitive element 331 and a post-stage node 360 in accordance with a selection signal Φr from the vertical scanning circuit 211. The selection transistor 352 opens and closes a path between the capacitive element 332 and the post-stage node 360 in accordance with a selection signal Φs from the vertical scanning circuit 211.

The post-stage reset transistor 361 initializes the level of the post-stage node 360 to a predetermined potential Vreg in accordance with a post-stage reset signal rstb from the vertical scanning circuit 211. A potential different from the power supply voltage VDD (for example, a potential lower than VDD) is set as the potential Vreg.

The post-stage circuit 370 includes a post-stage amplification transistor 371, and a post-stage selection transistor 372. The post-stage amplification transistor 371 amplifies the level of the post-stage node 360. The post-stage selection transistor 372 outputs a signal at the level amplified by the post-stage amplification transistor 371 to a vertical signal line 309 as a pixel signal in accordance with a post-stage selection signal selb from the vertical scanning circuit 211.

Note that, for example, n-channel metal oxide semiconductor (nMOS) transistors are used as various transistors (transfer transistor 312 and the like) in the pixel 301.

The vertical scanning circuit 211 supplies a high-level FD reset signal rst and a high-level transfer signal trg to all rows at the start of exposure. Therefore, the photoelectric conversion element 311 is initialized. Hereinafter, this control is referred to as "PD reset".

Then, the vertical scanning circuit 211 supplies the high-level FD reset signal rst over the pulse period while setting the pre-stage selection signal sela, the post-stage reset signal rstb, and the selection signal Φr to the high level for all the rows immediately before the end of the exposure. Therefore, the FD 314 is initialized, and a level corresponding to the level of the FD 314 at that time is held in the capacitive element 331. This control is hereinafter referred to as "FD reset".

The level of the FD 314 at the time of FD reset and the level (the level held in the capacitive element 331 and the level of the vertical signal line 309) corresponding to the level of the FD 314 are hereinafter collectively referred to as "P-phase" or "reset level".

At the end of the exposure, the vertical scanning circuit 211 supplies the high-level transfer signal trg over the pulse period while setting the pre-stage selection signal sela, the post-stage reset signal rstb, and the selection signal 4?s to the high level for all the rows. Therefore, signal charges corresponding to the exposure amount are transferred to the FD 314, and a level corresponding to the level of the FD 314 at that time is held in the capacitive element 332.

The level of the FD 314 at the time of signal charge transfer and the level (the level held in the capacitive element 332 and the level of the vertical signal line 309) corresponding to the level of the FD 314 are hereinafter collectively referred to as "D-phase" or "signal level".

The exposure control of simultaneously starting and ending the exposure for all the pixels in this manner is called a global shutter method. By this exposure control, the pre-stage circuit 310 of all the pixels sequentially generates the reset level and the signal level. The reset level is held in the capacitive element 331, and the signal level is held in the capacitive element 332.

After the end of the exposure, the vertical scanning circuit 211 sequentially selects a row, and sequentially outputs the reset level and the signal level of the row. In a case of outputting the reset level, the vertical scanning circuit 211 supplies the high-level selection signal Φr over a predetermined period while setting the pre-stage selection signal sela and the post-stage selection signal selb of the selected row to the high level. Therefore, the capacitive element 331 is connected to the post-stage node 360, and the reset level is read.

After the reset level is read, the vertical scanning circuit 211 opens the selection transistors 351 and 352 over a certain period to disconnect the capacitive elements 331 and 332 from the post-stage node 360. Note that, at this time, the post-stage reset transistor 361 of the selected row may initialize the level of the post-stage node 360.

The vertical scanning circuit 211 supplies the high-level selection signal Φs over a predetermined period with the pre-stage selection signal sela and the post-stage selection signal selb of the selected row kept at the high level. Therefore, the capacitive element 332 is connected to the post-stage node 360, and the signal level is read.

By the above-described read control, the selection circuit 350 of the selected row sequentially performs control to connect the capacitive element 331 to the post-stage node 360, control to disconnect the capacitive elements 331 and 332 from the post-stage node 360, and control to connect the capacitive element 332 to the post-stage node 360.

Furthermore, the post-stage circuit 370 of the selected row sequentially read the reset level and the signal level from the capacitive elements 331 and 332 via the post-stage node 360, and output the reset level and the signal level to the vertical signal line 309.

Here, a node 353 between the capacitive element 331 and the selection transistor 351 in the drawing is in a high-impedance state while the signal (the reset level or the signal level) is held in the capacitive element 331. Furthermore, a node 354 between the capacitive element 332 and the selection transistor 352 is also in the high-impedance state. A gray semicircle in the drawing indicates a node that becomes high impedance during hold.

The column signal processing circuit 260 sequentially performs the reading row by row after the end of the exposure by the global shutter method, so that the capacitive elements 331 and 332 need to hold the reset level and the signal level over a period from the end of the exposure to the reading. The later a row is in the read order, the longer the hold time, and the hold time may reach several tens of milliseconds for a row that is last in the read order, for example. The longer the hold time and the higher the potentials of the high-impedance nodes 353 and 354, the more likely that leakage current will occur at a pn junction between the nodes and a semiconductor substrate.

When leakage current occurs, noise is generated in image data due to variations in leakage current for each pixel, and there is a possibility that the image quality of the image data deteriorates. Therefore, in order to suppress the occurrence of leakage current, the vertical scanning circuit 211 lowers the pre-stage selection signal sela from the high level (the power supply voltage VDD or the like) to a middle level Vm when the reset level and the signal level are held. The middle level Vm is a voltage between the high level and a low level (such as a ground voltage). In response to the decrease in the voltage of the pre-stage selection signal sela, the potential of the pre-stage node 330 decreases, and the potentials of the nodes 353 and 354 also shift to the lower level accordingly. It is therefore possible to suppress the occurrence of leakage current.

Figure 4:
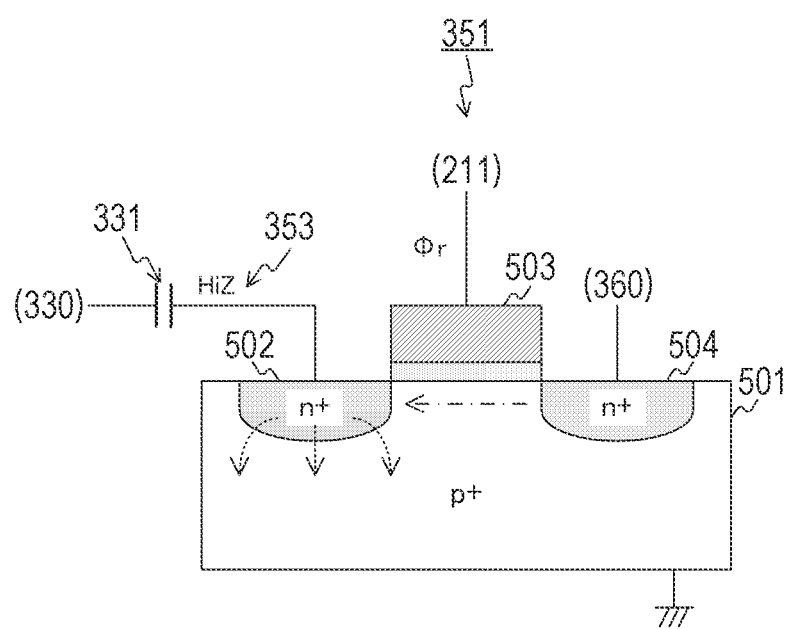
FIG. 4 is an example of a cross-sectional view of a pre-stage selection transistor in the first embodiment of the present technology.

FIG. 4 is an example of a cross-sectional view of the selection transistor 351 in the first embodiment of the present technology. In a $p^+$ semiconductor substrate 501, $n^+$ regions 502 and 504 are formed. Furthermore, a gate electrode 503 is formed between these regions with an oxide film interposed between the gate electrode 503 and the regions.

The $n^+$ regions 502 and 504 and the gate electrode 503 function as the selection transistor 351. The $n^+$ region 502 is a drain of the selection transistor 351 and is connected to one end of the capacitive element 331. The node 353 is in a high-impedance state while the signal level or the like is held.

The higher the potential of the high-impedance node 353, the more likely that leakage current will occur at the pn junction between the node 353 and the semiconductor substrate 501. A dotted line in the drawing indicates leakage current that occurs in a case where the potential is high. The same applies to the node 354.

Therefore, as described above, the vertical scanning circuit 211 lowers the potentials of the nodes 353 and 354 by lowering the pre-stage selection signal sela to the middle level Vm. Therefore, the leakage current that occurs at the pn junction can be suppressed.

However, when the potentials of the nodes 353 and 354 are too low, leakage current may increase between the drain and the source of the selection transistors 351 and 352. A long dashed short dashed line in the drawing indicates leakage current that occurs in a case where the potential is too low.

Therefore, the middle level Vm is adjusted to an optimum value at which the occurrence of both the leakage current from the drain to the semiconductor substrate 501 and the leakage current between the drain and the source can be suppressed.

Configuration Example of Column Signal Processing Circuit

Figure 5:
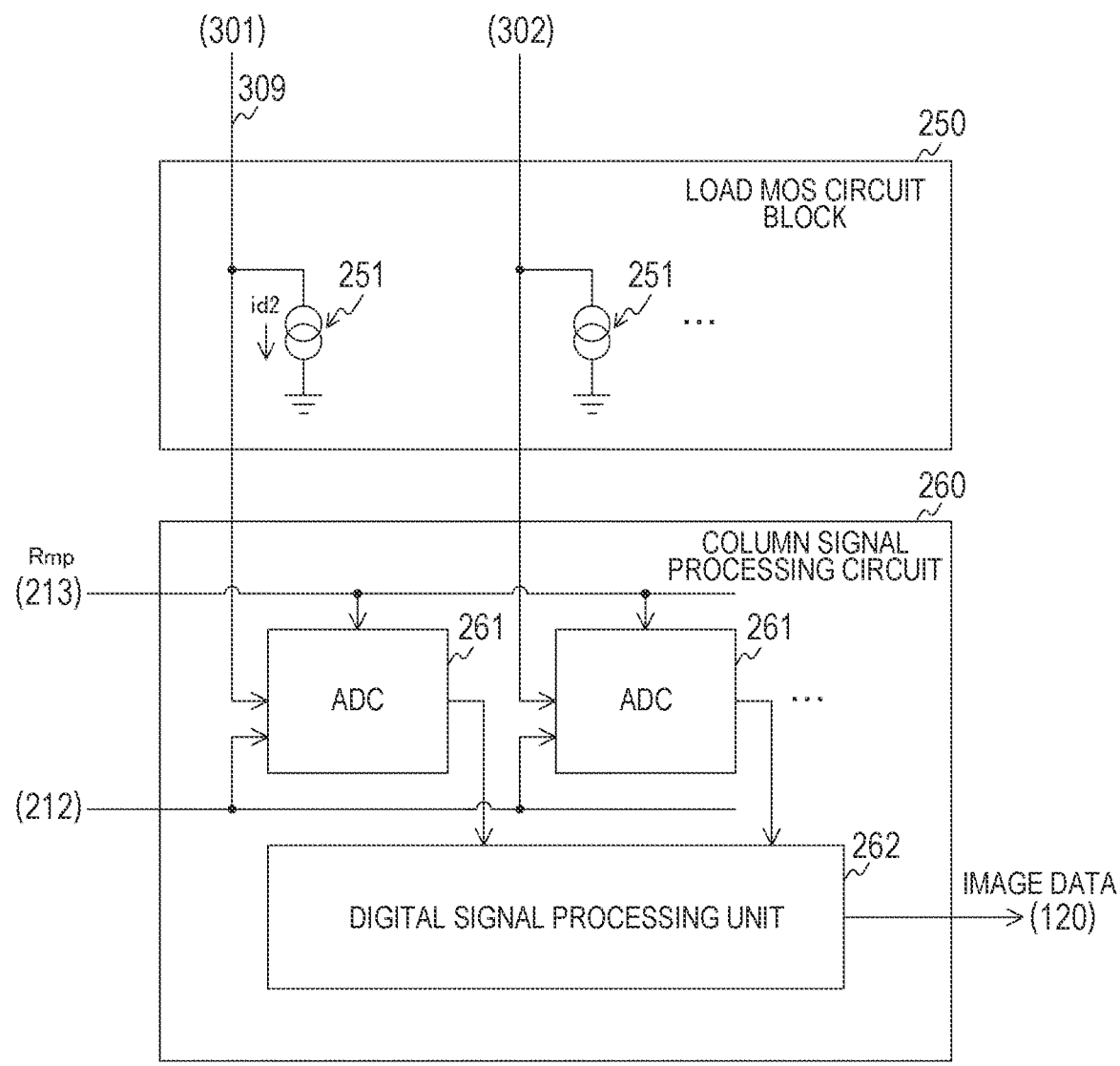
FIG. 5 is a block diagram depicting a configuration example of a column signal processing circuit in the first embodiment of the present technology.

FIG. 5 is a block diagram depicting a configuration example of the column signal processing circuit 260 in the first embodiment of the present technology.

In the load MOS circuit block 250, the vertical signal line 309 is wired for each column. In a case where the number of columns is I (I is an integer), I vertical signal lines 309 are wired. Furthermore, a load MOS transistor 251 that supplies a constant current id2 is connected to each of the vertical signal lines 309.

In the column signal processing circuit 260, a plurality of ADCs 261 and a digital signal processing unit 262 are arranged. The ADC 261 is arranged for each column. In a case where the number of columns is I, I ADCs 261 are arranged.

The ADC 261 converts an analog pixel signal from the corresponding column into a digital signal using a ramp signal Rmp from the DAC 213. The ADC 261 supplies the digital signal to the digital signal processing unit 262. For example, a single-slope ADC including a comparator and a counter is arranged as the ADC 261.

The digital signal processing unit 262 performs predetermined signal processing such as CDS processing on each of the digital signals for each column. The digital signal processing unit 262 supplies image data including the processed digital signal to the recording unit 120.

Operation Example of Solid-State Imaging Element

Figure 6:
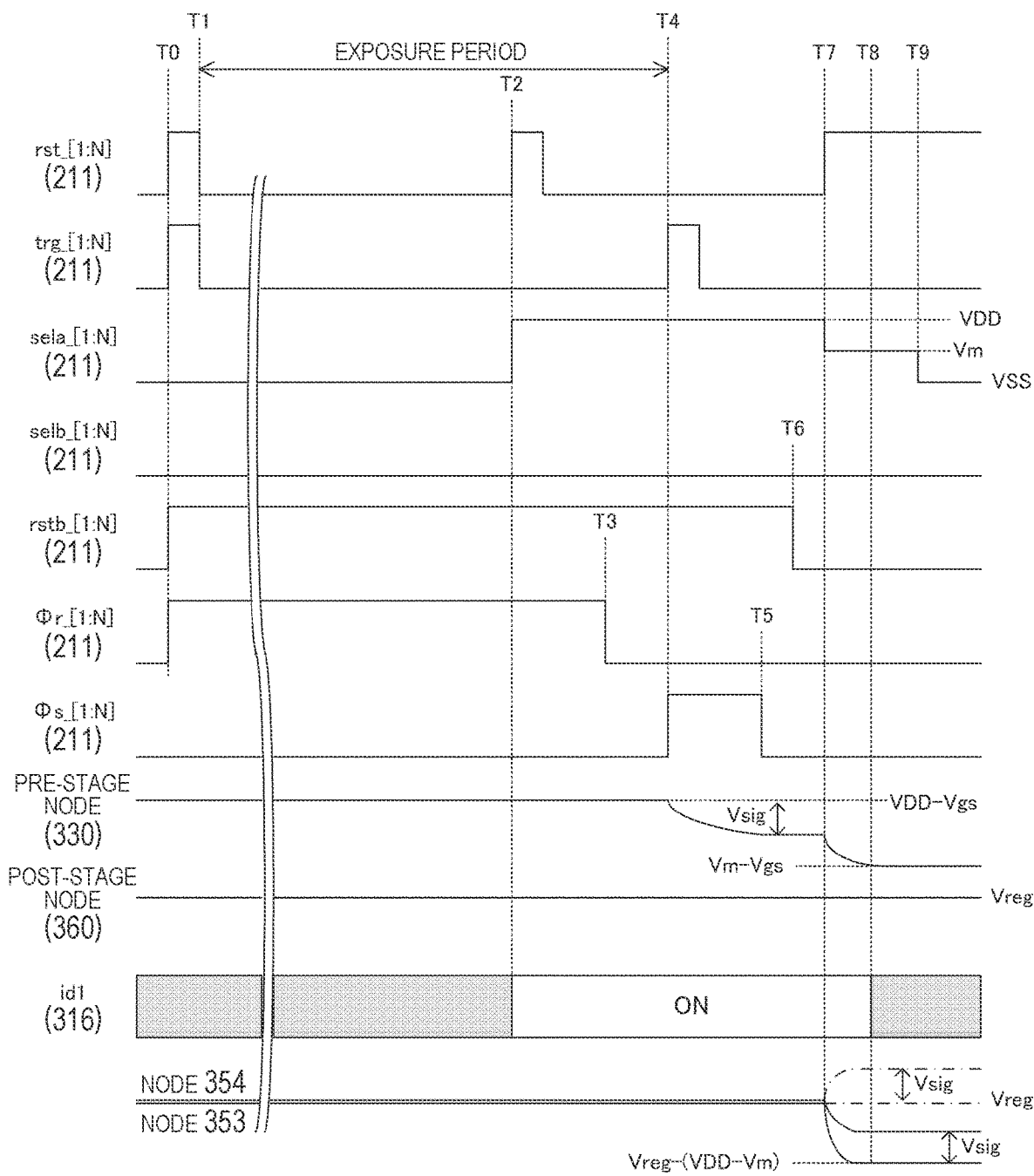
FIG. 6 is a timing chart depicting an example of a global shutter operation in the first embodiment of the present technology.

FIG. 6 is a timing chart depicting an example of a global shutter operation in the first embodiment of the present technology. The vertical scanning circuit 211 sets the post-stage reset signal rstb and the selection signal Φr to the high level for all the rows (in other words, all the pixels) at timing T0 immediately before the start of the exposure.

Furthermore, the vertical scanning circuit 211 supplies the high-level FD reset signal rst and the high-level transfer signal trg to all the rows over a period from timing T0 to timing T1 after the pulse period elapses. Therefore, all the pixels are PD reset, and the exposure simultaneously starts in all the rows.

Here, rst_[n], trg_[n], sela_[n], selb_[n], r_[n], and Φs_[n] in the drawing indicate signals to pixels in an n-th row among N rows. N is an integer indicating the total number of rows, and n is an integer from 1 to N.

At timing T2 immediately before the end of the exposure period, the vertical scanning circuit 211 turns on the current source transistor 316 while setting the pre-stage selection signal sela to the high level, and supplies the high-level FD reset signal rst over the pulse period for all the rows. Therefore, all the pixels are FD reset, and the reset level is sampled and held.

At timing T3 after timing T2, the vertical scanning circuit 211 returns the selection signal Φr to the low level.

At timing T4 of the end of the exposure, the vertical scanning circuit 211 sets the selection signal Φs to the high level and supplies the high-level transfer signal trg over the pulse period for all the rows. Therefore, the signal level is sampled and held. Furthermore, the potential of the pre-stage node 330 decreases from VDD−Vgs to VDD−Vgs−Vsig. Here, Vgs represents a gate-source voltage of the pre-stage selection transistor 317, and Vsig represents the signal level.

At timing T5 after timing T4, the vertical scanning circuit 211 returns the selection signal Φs to the low level. At timing T6 immediately after that, the vertical scanning circuit 211 returns the post-stage reset signal rstb to the low level.

At timing T7 after timing T6, the vertical scanning circuit 211 sets the FD reset signal rst to the high level and lowers the pre-stage selection signal sela from the high level (the power supply voltage VDD or the like) to the middle level Vm. Therefore, the potential of the pre-stage node decreases from VDD−Vgs−Vsig and becomes Vm−Vgs at timing T8.

In response to the change in the potential of the pre-stage node 330, the high-impedance node 353 on the reset side decreases from Vreg to Vreg−(VDD−Vm). The high-impedance node 354 on the signal side decreases from Vreg to Vreg−(VDD−Vm)+Vsig.

At timing T8 when the potentials of the nodes 353 and 354 decrease, the vertical scanning circuit 211 turns off the current source transistor 316 to stop the current id1. At subsequent timing T9, the vertical scanning circuit 211 sets the pre-stage selection signal sela to the low-level (the ground voltage VSS or the like).

If the pre-stage selection transistor 317 is not provided, the potential of the node 354 increases to Vreg+Vsig while the potential of the node 353 remains at Vreg at timing T7. A long dashed short dashed line in the drawing indicates changes in the potentials of the nodes 353 and 354 in a case where the pre-stage selection transistor 317 is not provided. In this case, since the nodes 353 and 354 have high potentials, there is a possibility that leakage current occurs at the pn junction.

However, since the pre-stage selection transistor 317 is provided, and the vertical scanning circuit 211 lowers the pre-stage selection signal sela to the middle level Vm, it is possible to lower the potentials of the nodes 353 and 354. It is therefore possible to suppress the occurrence of leakage current.

Figure 7:
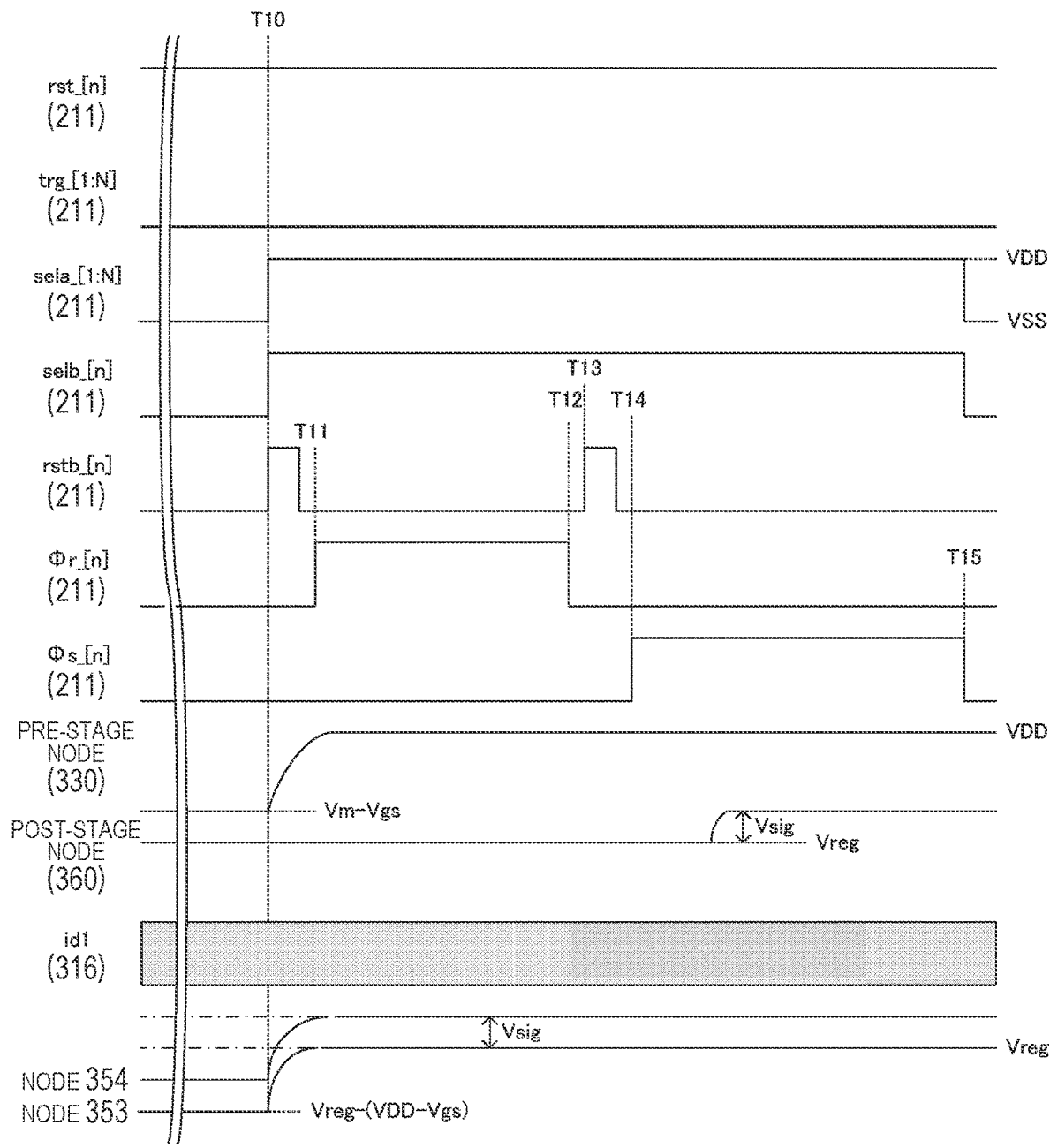
FIG. 7 is a timing chart depicting an example of a read operation of the pixel in the first embodiment of the present technology.

FIG. 7 is a timing chart depicting an example of a read operation of the pixel in the first embodiment of the present technology. During the read period of the n-th row after timing T10, the vertical scanning circuit 211 sets the pre-stage selection signal sela and the post-stage selection signal selb of the n-th row to the high level with the FD reset signal rst kept at the high level. Furthermore, the vertical scanning circuit 211 supplies the high-level post-stage reset signal rstb to the n-th row over the pulse period from timing T10.

The vertical scanning circuit 211 supplies the high-level selection signal Φr to the n-th row over a period from timing T11 immediately after timing T10 to timing T12. The potential of the pre-stage node 330 increases back to the power supply voltage VDD, and the potentials of the nodes 353 and 354 increase accordingly. Furthermore, the potential of the post-stage node 360 becomes the reset level. This reset level is AD-converted by the ADC 261.

Furthermore, the vertical scanning circuit 211 supplies the high-level post-stage reset signal rstb over the pulse period from timing T13.

Then, the vertical scanning circuit 211 supplies the high-level selection signal Φs to the n-th row over a period from timing T14 to timing T15. The potential of the post-stage node 360 becomes the signal level. This signal level is AD-converted by the ADC 261. A difference between the reset level and the signal level corresponds to a net signal level from which reset noise and offset noise of the FD have been removed.

As illustrated in the drawing, the high-level selection signals Φr and Φs are sequentially supplied. In accordance with these selection signals, a selection unit 340 sequentially connects the capacitive elements 331 and 332 to the post-stage node 360. Then, the reset level and the signal level of the first pixel in a pixel block 300 are sequentially read.

If the pre-stage selection signal sela remains at the low level during the read period (period from timing T10 to T15), the potentials of the nodes 353 and 354 decrease, and the potential of the vertical signal line 309 also decreases. In this case, there is a possibility that the operating point and range of the post-stage circuit cannot be sufficiently secured. Therefore, the vertical scanning circuit 211 returns the pre-stage selection signal sela to the high level during the read period.

Note that the solid-state imaging element 200 reads the signal level after the reset level, but is not limited to this order. The solid-state imaging element 200 can also read the reset level after the signal level. In this case, the vertical scanning circuit 211 supplies the high-level selection signal Φr after the high-level selection signal Φs. Furthermore, in this case, it is necessary to reverse the slope of the slope of the ramp signal.

Figure 8:
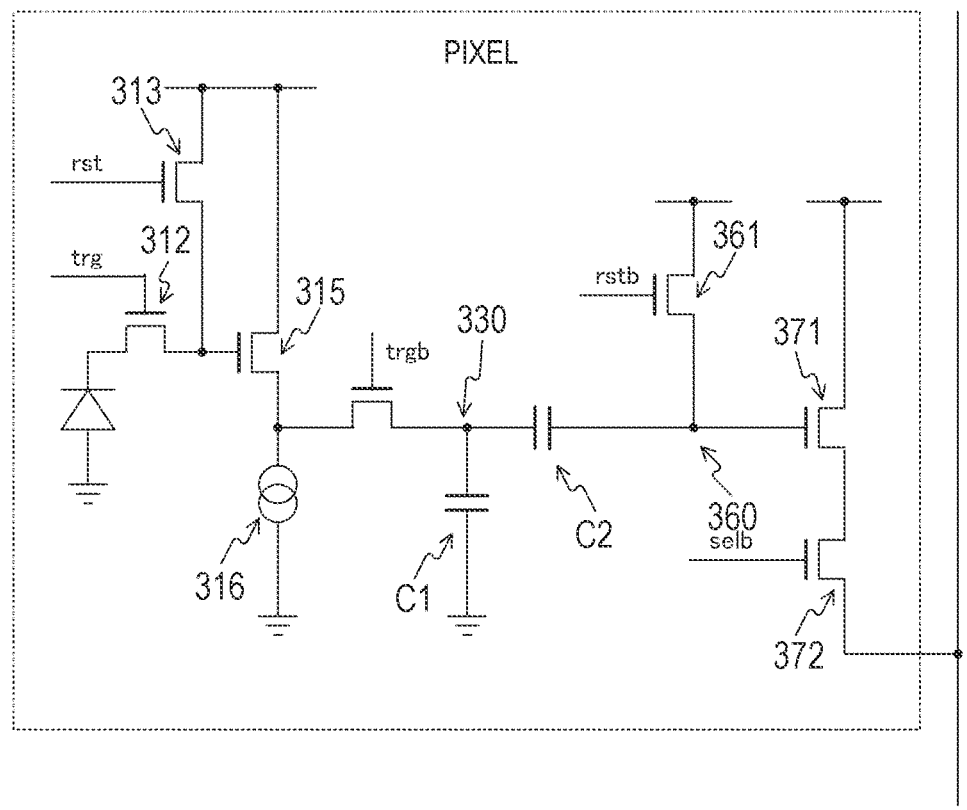
FIG. 8 is a circuit diagram depicting a configuration example of a pixel in a comparative example.

FIG. 8 is a circuit diagram depicting a configuration example of a pixel in a comparative example. In this comparative example, the selection circuit 350 is not provided, and a transfer transistor is inserted between the pre-stage node 330 and the pre-stage circuit. Furthermore, capacitors C1 and C2 are inserted instead of the capacitive elements 331 and 332. The capacitor C1 is inserted between the pre-stage node 330 and the ground terminal, and the capacitor C2 is inserted between the pre-stage node 330 and the post-stage node 360.

The exposure control and the read control of the pixel in this comparative example are described in FIG. 5.5.2 of "Jae-kyu Lee, et al., A 2.1e-Temporal Noise and −105 dB Parasitic Light Sensitivity Backside-Illuminated 2.3 µm-Pixel Voltage-Domain Global Shutter CMOS Image Sensor Using High-Capacity DRAM Capacitor Technology, ISSCC 2020", for example. In this comparative example, assuming that the capacitance value of each of the capacitors C1 and C2 is C, a level Vn of kTC noise at the time of exposure and reading is expressed by the following expression.

$$Vn = (3*kT/C)^{1/2} \qquad \text{Expression 1}$$

In the above expression, k is a Boltzmann constant, and the unit is, for example, Joule per Kelvin (J/K). T is an absolute temperature, and the unit is, for example, Kelvin (K). Furthermore, the unit of Vn is, for example, volt (V), and the unit of C is, for example, farad (F).

FIG. 9 is a diagram depicting an example of states of the pixel 301 at the time of reading the reset level and at the time of initialization of the post-stage node in the first embodiment of the present technology. In the drawing, a indicates the state of the pixel 301 at the time of reading the reset level, and b in the drawing indicates the state of the pixel 301 at the time of initialization of the post-stage node 360. Furthermore, in the drawing, the selection transistor 351, the selection transistor 352, and the post-stage reset transistor 361 are represented by graphical symbols of switches for convenience of description.

As illustrated in a of the drawing, the vertical scanning circuit 211 closes the selection transistor 351, and opens the selection transistor 352 and the post-stage reset transistor 361. Therefore, the reset level of the first pixel is read through the post-stage circuit 370.

As illustrated in b of the drawing, after the reset level is read, the vertical scanning circuit 211 opens the selection transistor 351 and the selection transistor 352, and closes the post-stage reset transistor 361. Therefore, the capacitive elements 331 and 332 are disconnected from the post-stage node 360, and the level of the post-stage node 360 is initialized.

The capacitance value of a parasitic capacitance Cp of the post-stage node 360 disconnected from the capacitive elements 331 and 332 in this manner is assumed to be very small as compared with the capacitive elements 331 and 332. For example, assuming that the parasitic capacitance Cp is several femtofarads (fF), the capacitive elements 331 and 332 are on the order of several tens of femtofarads.

Figure 10:
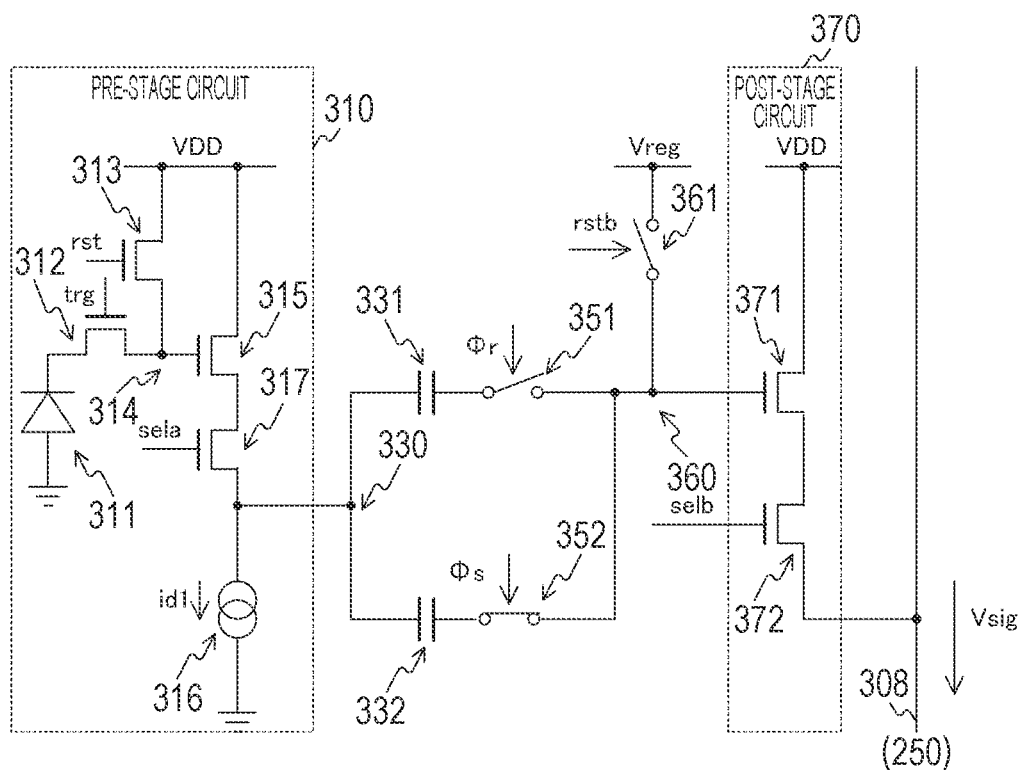
FIG. 10 is a diagram depicting an example of a state of the pixel at the time of reading a signal level in the first embodiment of the present technology.

FIG. 10 is a diagram depicting an example of a state of the pixel 301 at the time of reading the signal level in the first embodiment of the present technology.

After the initialization of the post-stage node 360, the vertical scanning circuit 211 closes the selection transistor 352, and opens the selection transistor 351 and the post-stage reset transistor 361. Therefore, the signal level of the first pixel is read through the post-stage circuit 370.

Here, kTC noise at the time of exposure of pixels is considered. At the time of the exposure, kTC noise occurs in each of sampling of the reset level and sampling of the signal level immediately before the end of the exposure. Assuming that the capacitance value of each of the capacitive elements 331 and 332 is C, the level Vn of the kTC noise at the time of the exposure is expressed by the following expression.

$$Vn = (2*kT/C)^{1/2} \qquad \text{Expression 2}$$

Furthermore, as illustrated in FIGS. 9 and 10, since the post-stage reset transistor 361 is driven at the time of the reading, the kTC noise occurs at that time. However, the capacitive elements 331 and 332 are disconnected at the time of driving the post-stage reset transistor 361, and the parasitic capacitance Cp at that time is small. Therefore, the kTC noise at the time of the reading can be ignored as compared with the kTC noise at the time of the exposure. Therefore, the kTC noise at the time of the exposure and reading is expressed by Expression 7.

With Expressions 1 and 2, in the pixel block 300 in which the capacitor is disconnected at the time of the reading, the kTC noise is smaller than that in the comparative example in which the capacitor cannot be disconnected at the time of the reading. Therefore, the image quality of the image data can be improved.

As described above, according to the first embodiment of the present technology, since the held potentials of the nodes 353 and 354 are lowered by means of the control of the pre-stage selection transistor 317, it is possible to suppress the occurrence of the leakage current at the pn junction. Therefore, the image quality of the image data can be improved.

2. Second Embodiment

In the first embodiment described above, the post-stage reset transistor and the selection circuit are arranged for each pixel, but with this configuration, it is difficult to reduce the circuit scale. The solid-state imaging element 200 of the second embodiment is different from that of the first embodiment in that two adjacent pixels share a post-stage reset transistor and a selection circuit.

Figure 11:
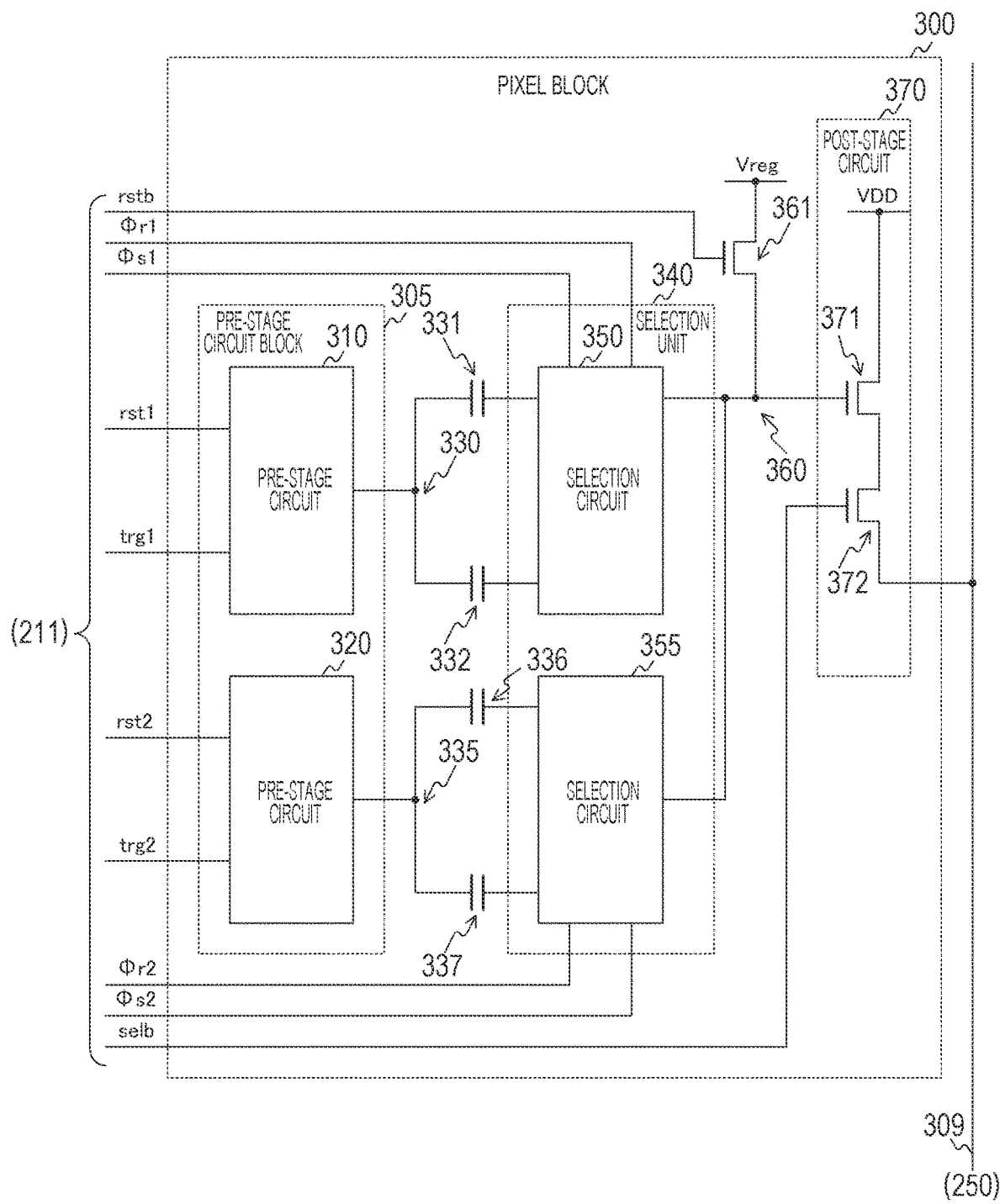
FIG. 11 is a circuit diagram depicting a configuration example of a pixel block in a second embodiment of the present technology.

FIG. 11 is a circuit diagram depicting a configuration example of the pixel block 300 in the second embodiment of the present technology. In the pixel array unit 220 of the second embodiment, a plurality of pixel blocks 300 is arranged. In each of the pixel blocks 300, the pixel 301 and a pixel 302 are arranged.

In the pixel block 300, a pre-stage circuit block 305, capacitive elements 331, 332, 336, and 337, the selection unit 340, the post-stage reset transistor 361, and the post-stage circuit 370 are arranged.

Furthermore, pre-stage circuits 310 and 320 are arranged in the pre-stage circuit block 305. In the selection unit 340, selection circuits 350 and 355 are arranged. The post-stage circuit 370 includes the post-stage amplification transistor 371, and the post-stage selection transistor 372.

The selection circuit 350 connects one of the capacitive elements 331 and 332 to the post-stage node 360. The selection circuit 355 connects one of the capacitive elements 336 and 337 to the post-stage node 360. Note that the selection circuit 350 is an example of a first selection circuit described in the claims, and the selection circuit 355 is an example of a second selection circuit described in the claims.

Figure 12:
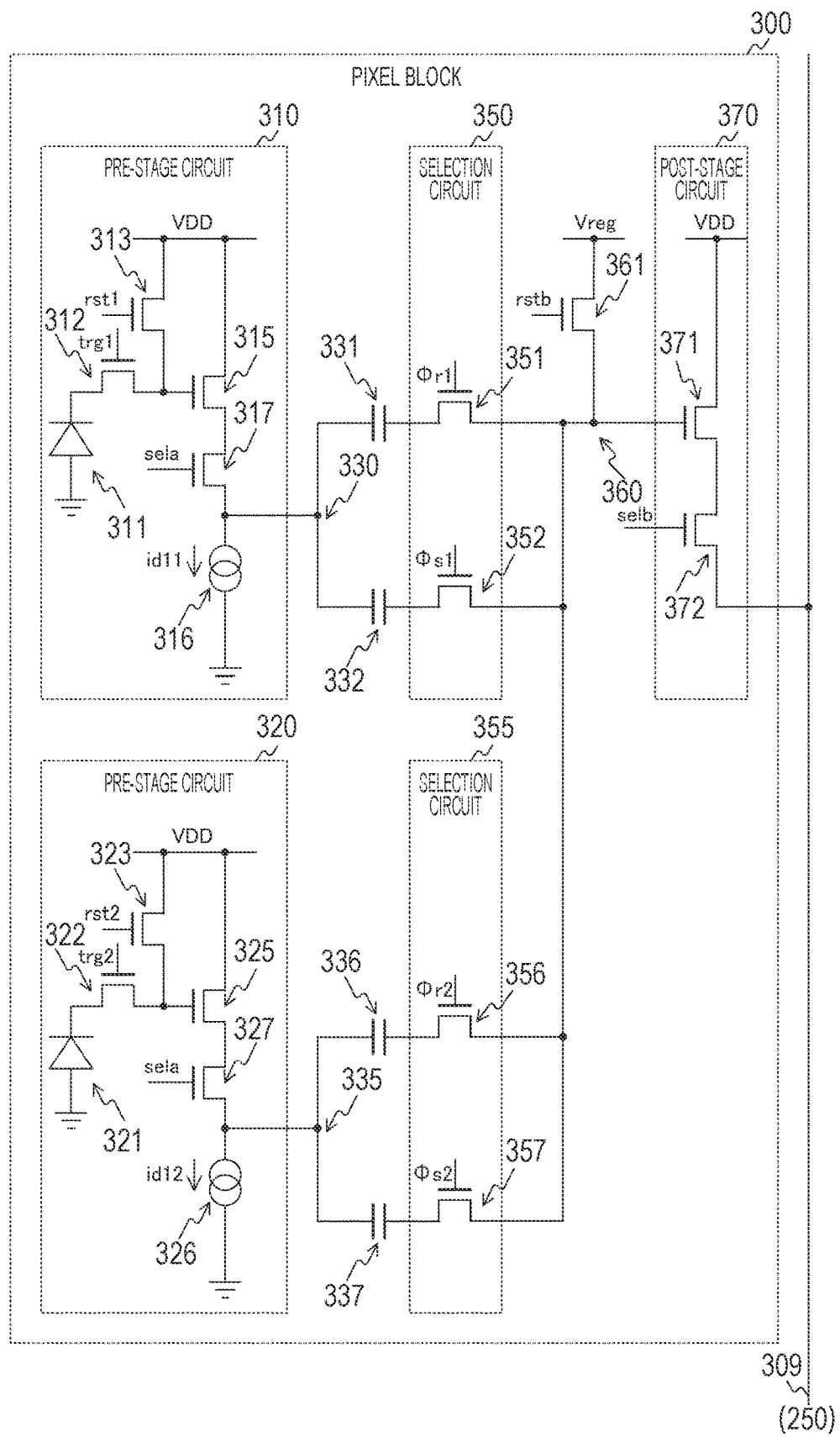
FIG. 12 is a circuit diagram depicting a configuration example of a pre-stage circuit and a selection circuit in the second embodiment of the present technology.

FIG. 12 is a circuit diagram depicting a configuration example of the pre-stage circuits 310 and 320 and the selection circuits 350 and 355 in the second embodiment of the present technology.

The pre-stage circuit 310 includes the photoelectric conversion element 311, the transfer transistor 312, the FD reset transistor 313, the FD 314, the pre-stage amplification transistor 315, the current source transistor 316, and the pre-stage selection transistor 317.

Furthermore, the pre-stage circuit 320 includes a photoelectric conversion element 321, a transfer transistor 322, an FD reset transistor 323, an FD 324, a pre-stage amplification transistor 325, a current source transistor 326, and a pre-stage selection transistor 327. The pre-stage selection signal sela is supplied to the pre-stage selection transistors 317 and 327.

The photoelectric conversion elements 311 and 321 generate charges by photoelectric conversion. The transfer transistor 312 transfers the charges from the photoelectric conversion element 311 to the FD 314 in accordance with a transfer signal trg1 from the vertical scanning circuit 211. The transfer transistor 322 transfers the charges from the photoelectric conversion element 321 to the FD 324 in accordance with a transfer signal trg2 from the vertical scanning circuit 211.

Note that the photoelectric conversion elements 311 and 321 are examples of first and second photoelectric conversion elements described in the claims. Note that the transfer transistors 312 and 322 are examples of first and second transfer transistors described in the claims.

The FD reset transistor 313 extracts the charges from the FD 314 to initialize the FD 314 in accordance with an FD reset signal rst1 from the vertical scanning circuit 211. The FD reset transistor 323 extracts the charges from the FD 324 to initialize the FD 324 in accordance with an FD reset signal rst2 from the vertical scanning circuit 211. The FDs 314 and 324 accumulate charges, and generate a voltage corresponding to a charge amount.

Note that the FD reset transistors 313 and 323 are examples of first and second reset transistors described in the claims. The FDs 314 and 324 are examples of first and second floating diffusion layers described in the claims.

The pre-stage amplification transistor 315 amplifies the level of the voltage of the FD 314, and outputs the amplified voltage to the pre-stage node 330 via the pre-stage selection transistor 317. The pre-stage amplification transistor 325 amplifies the level of the voltage of the FD 324, and outputs the amplified voltage to a pre-stage node 335 via the pre-stage selection transistor 327. Note that the pre-stage amplification transistors 315 and 325 are examples of first and second pre-stage amplification transistors described in the claims.

The FD reset transistors 313 and 323 and the pre-stage amplification transistors 315 and 325 have their respective drains connected to the power supply voltage VDD. The current source transistor 316 is connected to the source of the pre-stage selection transistor 317. The current source transistor 316 supplies a current id11 under the control of the vertical scanning circuit 211. The current source transistor 326 is connected to the source of the pre-stage selection transistor 327. The current source transistor 326 supplies a current id12 under the control of the vertical scanning circuit 211.

Note that the current source transistors 316 and 326 are examples of first and second current source transistors described in the claims.

The capacitive elements 331 and 332 have their respective one ends commonly connected to the pre-stage node 330 and have their respective other ends connected to the selection circuit 350. The capacitive elements 336 and 337 have their respective one ends commonly connected to the pre-stage node 335 and have their respective other ends connected to the selection circuit 355.

The selection circuit 350 includes the selection transistors 351 and 352. The selection transistor 351 opens and closes a path between the capacitive element 331 and the post-stage node 360 in accordance with a selection signal Φr1 from the vertical scanning circuit 211. The selection transistor 352 opens and closes a path between the capacitive element 332 and the post-stage node 360 in accordance with a selection signal Φs1 from the vertical scanning circuit 211.

The selection circuit 355 includes selection transistors 356 and 357. The selection transistor 356 opens and closes a path between the capacitive element 336 and the post-stage node 360 in accordance with a selection signal Φr2 from the vertical scanning circuit 211. The selection transistor 357 opens and closes a path between the capacitive element 337 and the post-stage node 360 in accordance with a selection signal Φs2 from the vertical scanning circuit 211.

Note that, for example, nMOS transistors are used as various transistors (transfer transistor 312 and the like) in the pixel block 300.

The circuit including the pre-stage circuit 310, the capacitive elements 331 and 332, the selection circuit 350, the post-stage reset transistor 361, and the post-stage circuit 370 described above functions as one pixel. Furthermore, the circuit including the pre-stage circuit 320, the capacitive elements 336 and 337, the selection circuit 355, the post-stage reset transistor 361, and the post-stage circuit 370 described above also functions as one pixel. The post-stage reset transistor 361 and the post-stage circuit 370 are shared by these two pixels.

Furthermore, the two pixels in the pixel block 300 are arranged in the column direction, for example. In other words, these two pixels are arranged in an odd row and an even row. Note that the positional relationship between the two pixels in the pixel block 300 is not limited to such an odd row and an even row. For example, the two pixels can be arranged in an odd column and an even column. Alternatively, one of the two pixels can be arranged diagonally above the other pixel.

Figure 13:
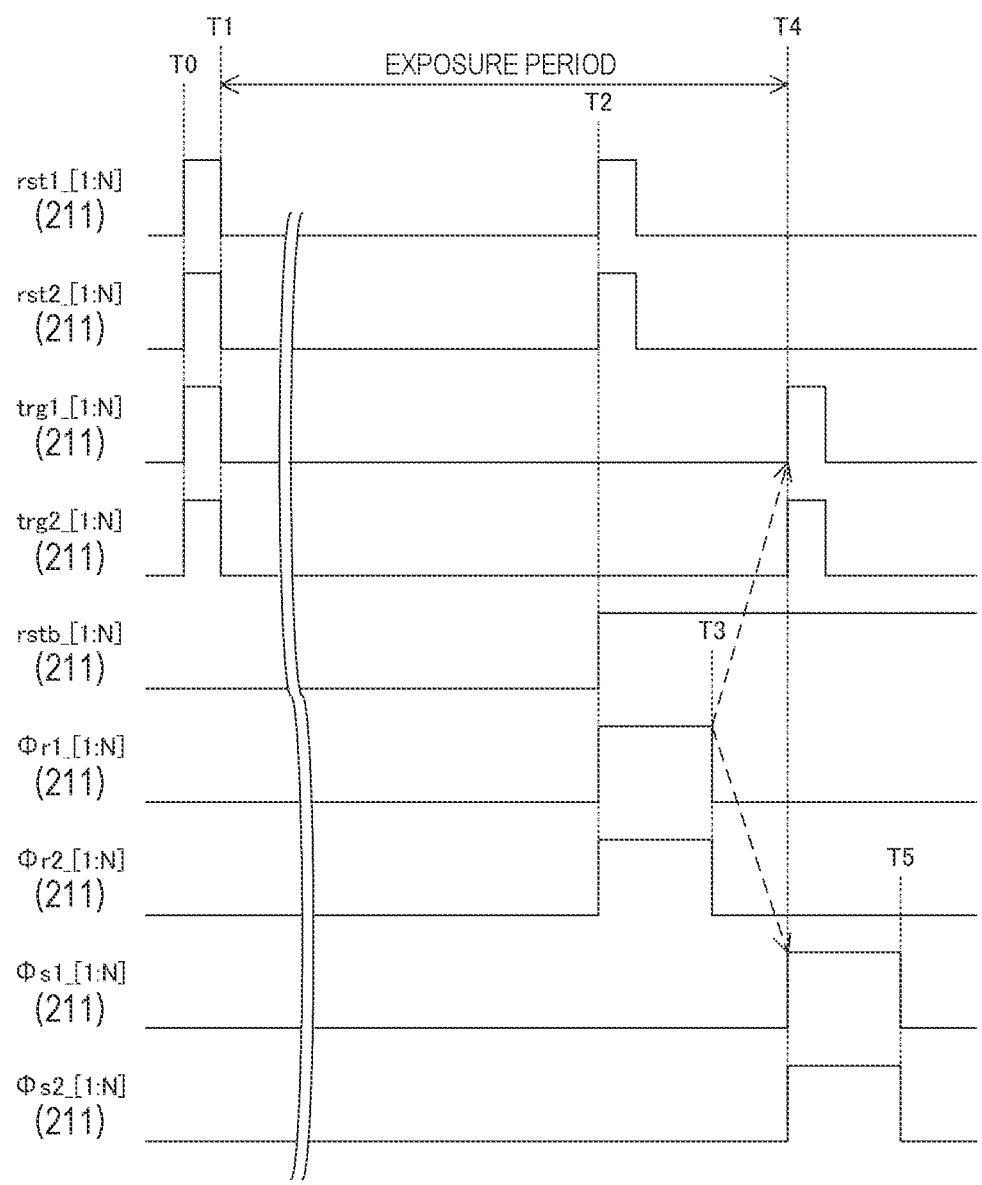
FIG. 13 is a timing chart depicting an example of a global shutter operation in the second embodiment of the present technology.

FIG. 13 is a timing chart depicting an example of a global shutter operation in the second embodiment of the present technology. The vertical scanning circuit 211 supplies high-level FD reset signals rst1 and rst2 and high-level transfer signals trg1 and trg2 to all the rows (in other words, all the pixels) over a period from timing T0 immediately before the start of the exposure to timing T1 after the pulse period elapses. Therefore, all the pixels are PD reset, and the exposure simultaneously starts in all the rows.

Here, rst1_[n], rst2_[n], trg1_[n], and trg2_[n] in the drawing indicate signals to pixels in the n-th row among the N rows. N is an integer indicating the total number of rows in which the pixel blocks 300 are arranged, and n is an integer from 1 to N. In a case where two pixels in the pixel block 300 are pixels in an even row and an odd row, the n-th row of the pixel block 300 includes two rows, an odd row and an even row.

At timing T2 immediately before the end of the exposure period, the vertical scanning circuit 211 supplies the high-level FD reset signals rst1 and rst2 over the pulse period while setting the post-stage reset signal rstb and the selection signals Φr1 and Φr2 to the high level for all the rows. Therefore, all the pixels are FD reset, and the reset level is sampled and held. Here, rstb_[n], Φr1_[n], and Φr2_[n] in the drawing indicate signals to pixels in the n-th row.

At timing T3 after timing T2, the vertical scanning circuit 211 returns the selection signals Φr1 and Φr2 to the low level.

At timing T4 of the end of the exposure, the vertical scanning circuit 211 supplies the high-level transfer signals trg1 and trg2 over the pulse period while setting the post-stage reset signal rstb and the selection signals Φs1 and Φ2 to the high level for all the rows. Therefore, the signal level is sampled and held. Furthermore, Φs1_[n] and Φs2_[n] in the drawing indicates signals to pixels in the n-th row.

At timing T5 after timing T4, the vertical scanning circuit 211 returns the selection signals Φs1 and Φs2 to the low level.

Figure 14:
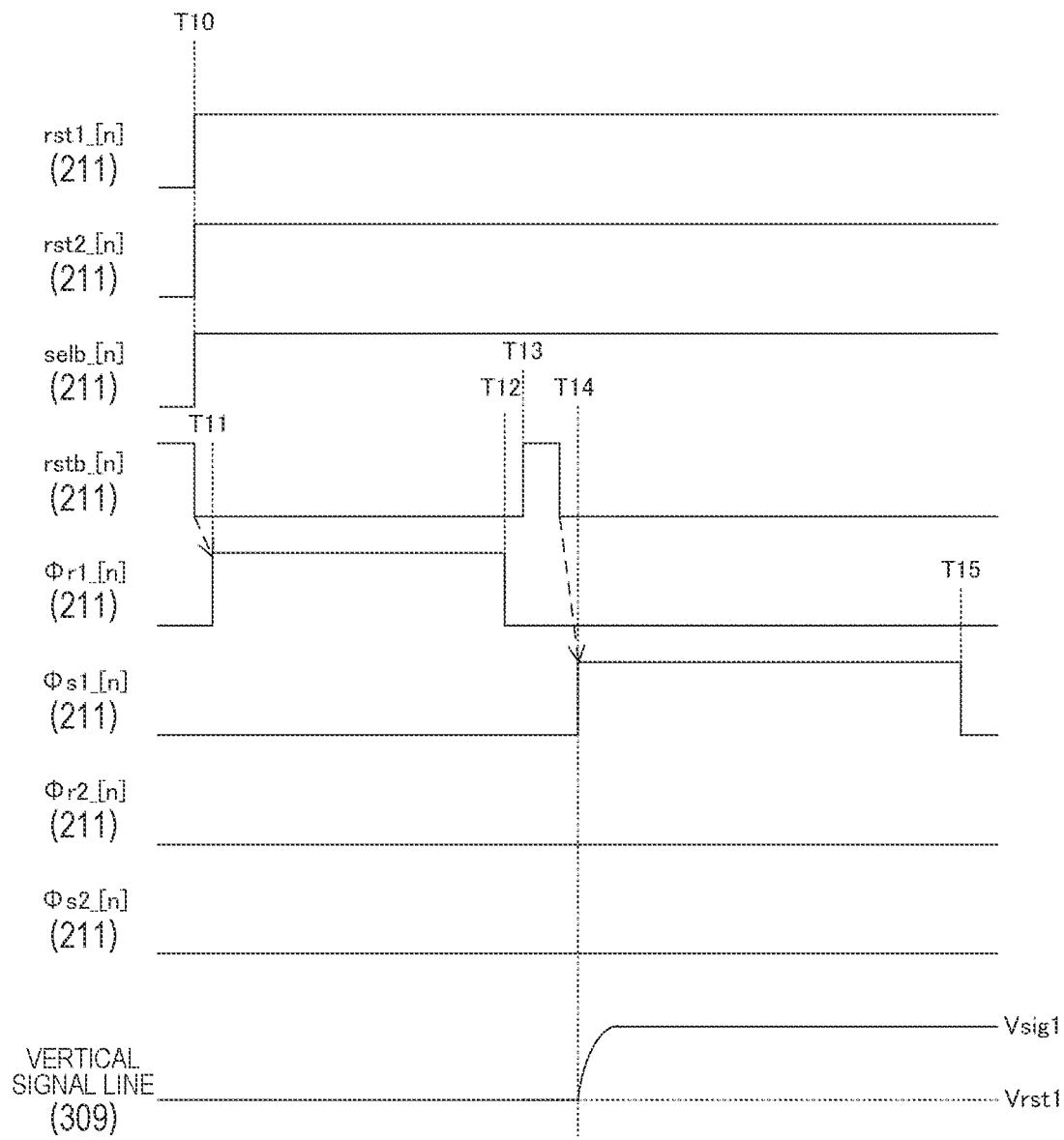
FIG. 14 is a timing chart depicting an example of a read operation of a first pixel in the pixel block in the second embodiment of the present technology.

FIG. 14 is a timing chart depicting an example of a read operation of the first pixel in the pixel block 300 in the second embodiment of the present technology. During the read period of the n-th row after timing T10, the vertical scanning circuit 211 sets the FD reset signals rst1 and rst2 and the post-stage selection signal selb of the n-th row to the high level. Furthermore, at timing T10, the post-stage reset signal rstb of all the rows are controlled to the low level. Here, selb_[n] in the drawing indicates signals to pixels in the n-th row.

The vertical scanning circuit 211 supplies the high-level selection signal Φr1 to the n-th row over a period from timing T11 immediately after timing T10 to timing T12. The potential of the post-stage node 360 becomes a reset level Vrst1. This reset level is AD-converted by the ADC 261.

The vertical scanning circuit 211 supplies the high-level post-stage reset signal rstb to the n-th row over the pulse period from timing T13 immediately after timing T12. Therefore, in a case where a parasitic capacitance exists in the post-stage node 360, the history of the previous signal held in the parasitic capacitance can be erased.

The vertical scanning circuit 211 supplies the high-level selection signal Φs1 to the n-th row over a period from timing T14 immediately after initialization of the post-stage node 360 to timing T15. The potential of the post-stage node 360 becomes a signal level Vsig1. This signal level is AD-converted by the ADC 261. A difference between the reset level Vrst1 and the signal level Vsig1 corresponds to the net signal level from which reset noise and offset noise of the FD have been removed.

Figure 15:
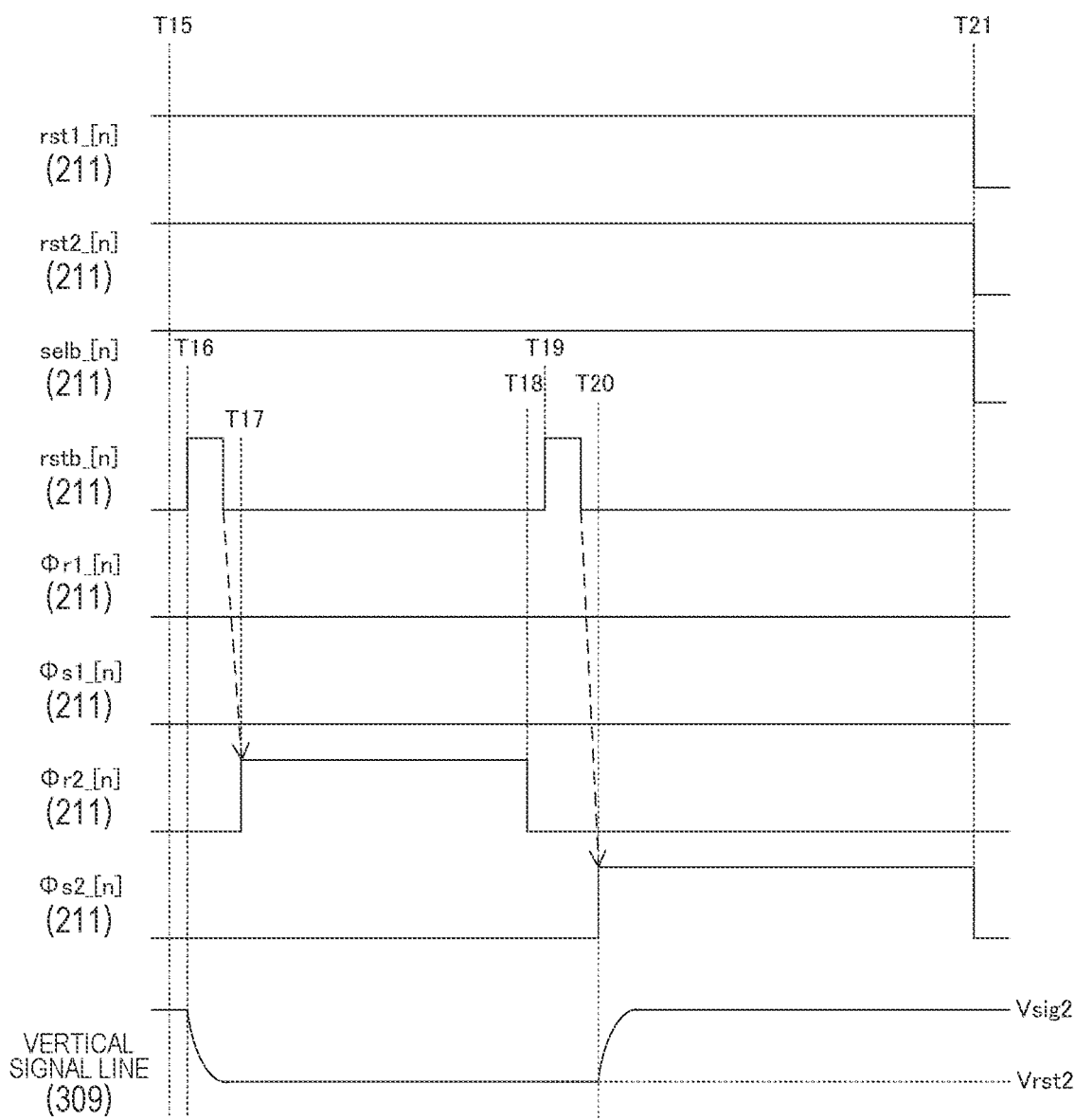
FIG. 15 is a timing chart depicting an example of a read operation of a second pixel in the pixel block in the second embodiment of the present technology.

FIG. 15 is a timing chart depicting an example of a read operation of the second pixel in the pixel block 300 in the second embodiment of the present technology.

The vertical scanning circuit 211 supplies the high-level post-stage reset signal rstb to the n-th row over the pulse period from timing T16 immediately after timing T15.

The vertical scanning circuit 211 supplies the high-level selection signal Φr2 to the n-th row over a period from timing T17 immediately after initialization of the post-stage node 360 to timing T18. The potential of the post-stage node 360 becomes a reset level Vrst2. This reset level is AD-converted by the ADC 261.

The vertical scanning circuit 211 supplies the high-level post-stage reset signal rstb to the n-th row over the pulse period from timing T19 immediately after timing T18.

The vertical scanning circuit 211 supplies the high-level selection signal Φs2 to the n-th row over a period from timing T20 immediately after initialization of the post-stage node 360 to timing T21. The potential of the post-stage node 360 becomes a signal level Vsig2. This signal level is AD-converted by the ADC 261.

Furthermore, at timing T21, the vertical scanning circuit 211 returns the FD reset signals rst1 and rst2 and the post-stage selection signal selb of the n-th row to the low level.

As illustrated in FIGS. 14 and 15, the high-level selection signals Φr1, Φs1, Φ2, and Φs2 are sequentially supplied. In accordance with these selection signals, the selection unit 340 sequentially connects the capacitive elements 331, 332, 336, and 337 to the post-stage node 360. Then, the reset level Vrst1 and the signal level Vsig1 of the first pixel and the reset level Vrst2 and the signal level Vsig2 of the second pixel in the pixel block 300 are read sequentially.

Figure 16:
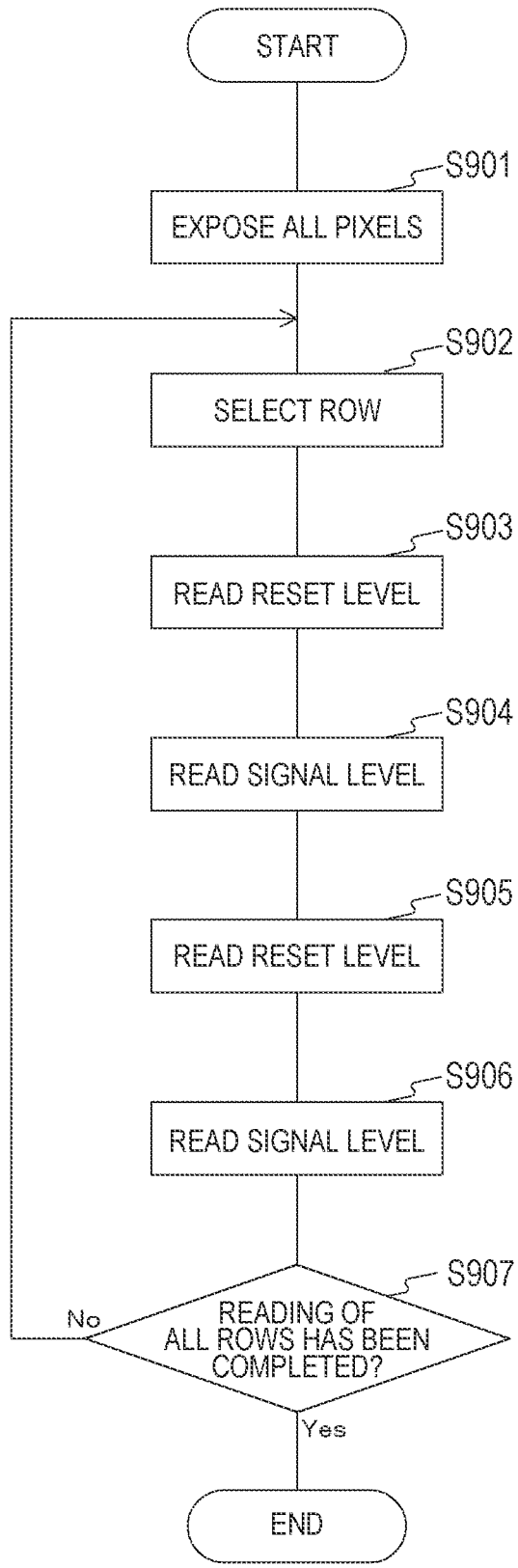
FIG. 16 is a flowchart depicting an example of an operation of a solid-state imaging element in the second embodiment of the present technology.

FIG. 16 is a flowchart depicting an example of the operation of the solid-state imaging element 200 in the second embodiment of the present technology. The operation is started, for example, in a case where a predetermined application for capturing image data is executed.

The vertical scanning circuit 211 exposes all the pixels (step S901). Then, the vertical scanning circuit 211 selects a row of the pixel block 300 to be read (step S902). The column signal processing circuit 260 reads the reset level of the first pixel in the pixel block 300 of the row (step S903), and then reads the signal level of the pixel (step S904). Subsequently, the column signal processing circuit 260 reads the reset level of the second pixel (step S905), and then reads the signal level of the pixel (step S906).

The solid-state imaging element 200 determines whether or not reading of all the rows has been completed (step S907). In a case where the reading of all the rows has not been completed (step S907: No), the solid-state imaging element 200 repeatedly executes step S902 and subsequent steps. On the other hand, in a case where the reading of all the rows has been completed (step S907: Yes), the solid-state imaging element 200 performs CDS processing or the like, and ends the operation for imaging. In a case where a plurality of pieces of image data is continuously captured, steps S901 to S907 are repeatedly executed in synchronization with the vertical synchronization signal.

As described above, according to the second embodiment of the present technology, since two pixels share the post-stage reset transistor 361 and the post-stage circuit 370, the circuit scale of the pixel array unit 220 can be reduced as compared with a case where two pixels do not share the post-stage reset transistor 361 and the post-stage circuit 370.

First Modification Example

In the second embodiment described above, the solid-state imaging element 200 sequentially reads the pixel signal of each of the two pixels in the pixel block 300, but with this configuration, there is a possibility that the reading speed is insufficient. The solid-state imaging element 200 of the first modification example of the second embodiment is different from that of the second embodiment in that pixel addition is performed.

Figure 17:
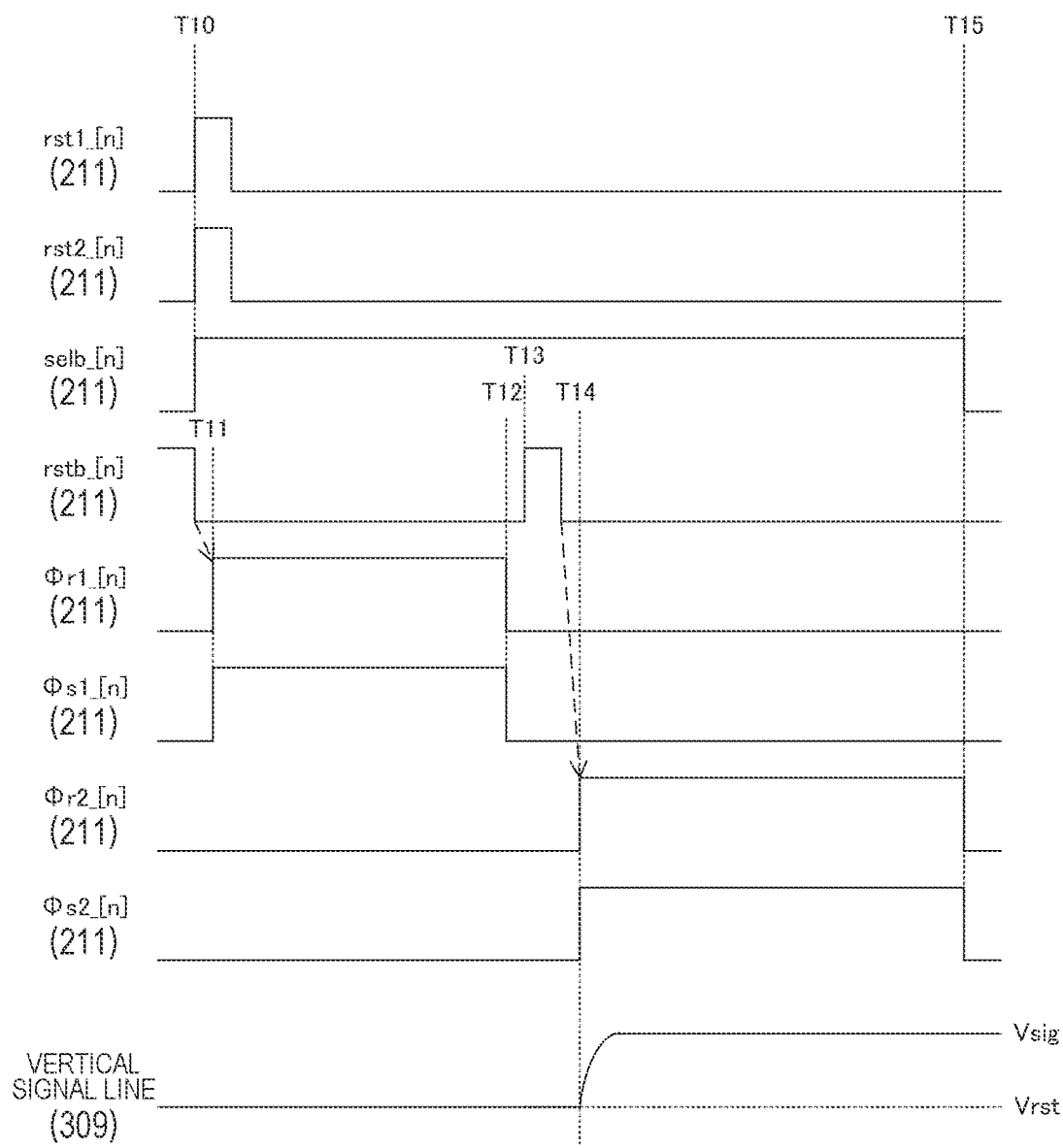
FIG. 17 is a timing chart depicting an example of a read operation of a reset level and a signal level in a first modification example of the second embodiment of the present technology.

FIG. 17 is a timing chart depicting an example of a read operation of the reset level and the signal level in the first modification example of the second embodiment of the present technology. Any of a plurality of modes including a non-addition mode in which pixel addition is not performed and an addition mode in which pixel addition is performed is set in the solid-state imaging element 200 in the first modification example of the second embodiment. The global shutter operation and the read operation in the non-addition mode are similar to those in the second embodiment. The global shutter operation in the addition mode is similar to that in the non-addition mode.

In a case where reading is performed in the addition mode, as illustrated in the drawing, the vertical scanning circuit 211 supplies the high-level FD reset signals rst1 and rst2 over the pulse period at timing T10 of the start of the reading of the n-th row. Furthermore, during the read period from timing T10 to timing T15, the vertical scanning circuit 211 sets the post-stage selection signal selb to the high level.

The vertical scanning circuit 211 supplies the high-level selection signals Φr1 and Φs2 to the n-th row over a period from timing T11 immediately after timing T10 to timing T12. Therefore, the potential of the post-stage node 360 becomes a reset level Vrst. The reset level Vrst is a value obtained by adding the reset levels of the two pixels in the pixel block 300.

The vertical scanning circuit 211 supplies the high-level post-stage reset signal rstb to the n-th row over the pulse period from timing T13 immediately after timing T12.

The vertical scanning circuit 211 supplies the high-level selection signals Φr2 and Φs2 to the n-th row over a period from timing T14 immediately after initialization of the post-stage node 360 to timing T15. Therefore, the potential of the post-stage node 360 becomes a signal level Vsig. The signal level Vsig is a value obtained by adding the signal levels of the two pixels in the pixel block 300.

As illustrated in the drawing, the high-level selection signals Φr1 and Φs1 are supplied, and the selection unit 340 connects the capacitive elements 331 and 336 to the post-stage node 360 in accordance with these selection signals. In other words, the capacitive element 331 and the capacitive element 336 are short-circuited. Therefore, the reset levels of the two pixels are added. Furthermore, the high-level selection signals Φr2 and Φs2 are supplied, and the selection unit 340 connects the capacitive elements 332 and 337 to the post-stage node 360 in accordance with these selection signals. In other words, the capacitive element 332 and the capacitive element 337 are short-circuited. Therefore, the signal levels of the two pixels are added. By such pixel addition, the sensitivity and the reading speed can be improved as compared with a case where addition is not performed. Furthermore, since the number of rows to be read for pixel addition is reduced, power consumption can be reduced.

Note that the solid-state imaging element 200 reads the signal level after the reset level, but is not limited to this order, and can read the reset level after the signal level.

As described above, according to the first modification example of the second embodiment of the present technology, since the selection unit 340 connects the capacitive elements 331 and 336 to the post-stage node 360 and connects the capacitive elements 332 and 337 to the post-stage node 360, it is possible to add the respective pixel signals of the two pixels. Therefore, as compared with the case where the addition is not performed, the sensitivity and the reading speed can be improved and the power consumption can be reduced.

Second Modification Example

In the second embodiment described above, the circuits in the solid-state imaging element 200 are provided in a single semiconductor chip, but with this configuration, there is a possibility that the element does not fit in the semiconductor chip in a case where the pixel is miniaturized. The solid-state imaging element 200 of the second modification example of the second embodiment is different from that of the second embodiment in that the circuits in the solid-state imaging element 200 are dispersedly arranged in two semiconductor chips.

Figure 18:
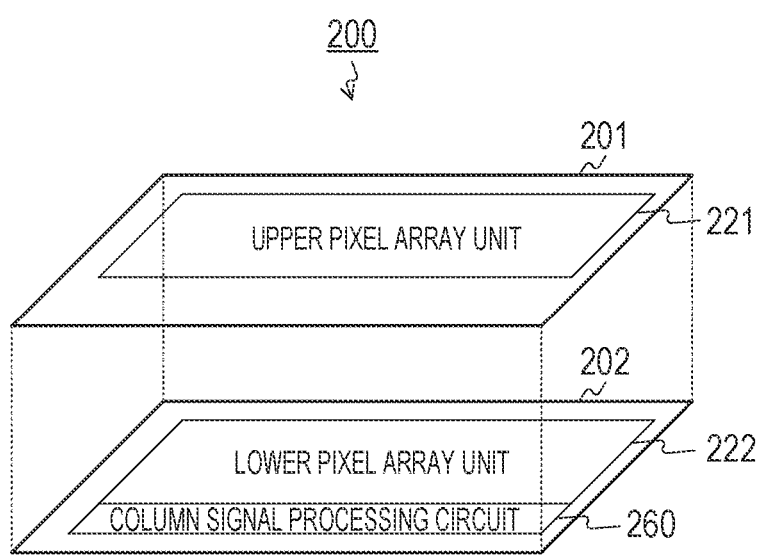
FIG. 18 is a diagram depicting an example of a laminated structure of a solid-state imaging element in a second modification example of the second embodiment of the present technology.

FIG. 18 is a diagram depicting an example of a laminated structure of the solid-state imaging element 200 in the second modification example of the second embodiment of the present technology. The solid-state imaging element 200 of the second modification example of the second embodiment includes a circuit chip 202 and a pixel chip 201 stacked on the circuit chip 202. These chips are electrically connected by, for example, Cu—Cu bonding. Note that, in addition to the Cu—Cu bonding, connection can be made by a via or a bump.

An upper pixel array unit 221 is arranged in the pixel chip 201. A lower pixel array unit 222 and the column signal processing circuit 260 are arranged in the circuit chip 202. For each pixel in the pixel array unit 220, a part of the pixel is arranged in the upper pixel array unit 221, and the rest is arranged in the lower pixel array unit 222.

Furthermore, in the circuit chip 202, the vertical scanning circuit 211, the timing control circuit 212, the DAC 213, and the load MOS circuit block 250 are also arranged. These circuits are omitted in the drawing.

Furthermore, the pixel chip 201 is manufactured, for example, by a pixel-dedicated process, and the circuit chip 202 is manufactured, for example, by a complementary MOS (CMOS) process. Note that the pixel chip 201 is an example of a first chip described in the claims, and the circuit chip 202 is an example of a second chip described in the claims.

Figure 19:
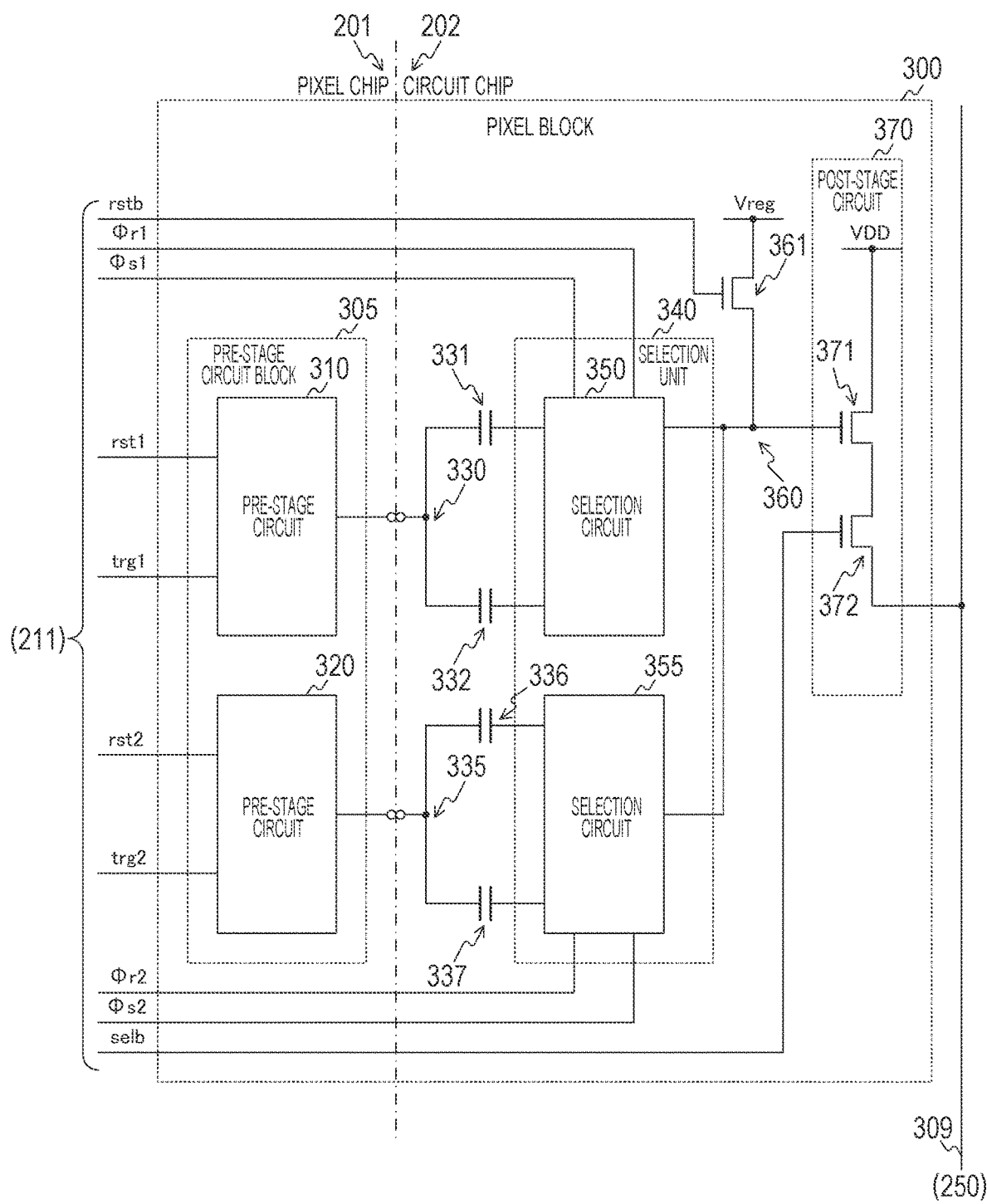
FIG. 19 is a circuit diagram depicting a configuration example of a pixel block in the second modification example of the second embodiment of the present technology.

FIG. 19 is a circuit diagram depicting a configuration example of the pixel block 300 in the second modification example of the second embodiment of the present technology. In the pixel block 300, the pre-stage circuit block 305 is arranged in the pixel chip 201, and other circuits and elements (such as the capacitive elements 331 and 332) are arranged in the circuit chip 202. Note that the current source transistors 316 and 326 can be further arranged in the circuit chip 202. As illustrated in the drawing, by dispersedly arranging the elements in the pixel block 300 in the stacked pixel chip 201 and circuit chip 202, the pixel area can be reduced, and pixel miniaturization is facilitated.

As described above, according to the second modification example of the second embodiment of the present technology, since the circuits and elements in the pixel block 300 are dispersedly arranged in the two semiconductor chips, pixel miniaturization is facilitated.

Third Modification Example

In the second modification example of the second embodiment described above, a part of the pixel block 300 and the peripheral circuit (such as the column signal processing circuit 260) are provided in the circuit chip 202 on the lower side. However, with this configuration, the arrangement area of the circuits and elements on the circuit chip 202 side is larger than that of the pixel chip 201 by the peripheral circuit, and there is a possibility that an unnecessary space without circuits and elements is generated in the pixel chip 201. The solid-state imaging element 200 of the third modification example of the second embodiment is different from that of the second modification example of the second embodiment in that the circuits in the solid-state imaging element 200 are dispersedly arranged in three semiconductor chips.

Figure 20:
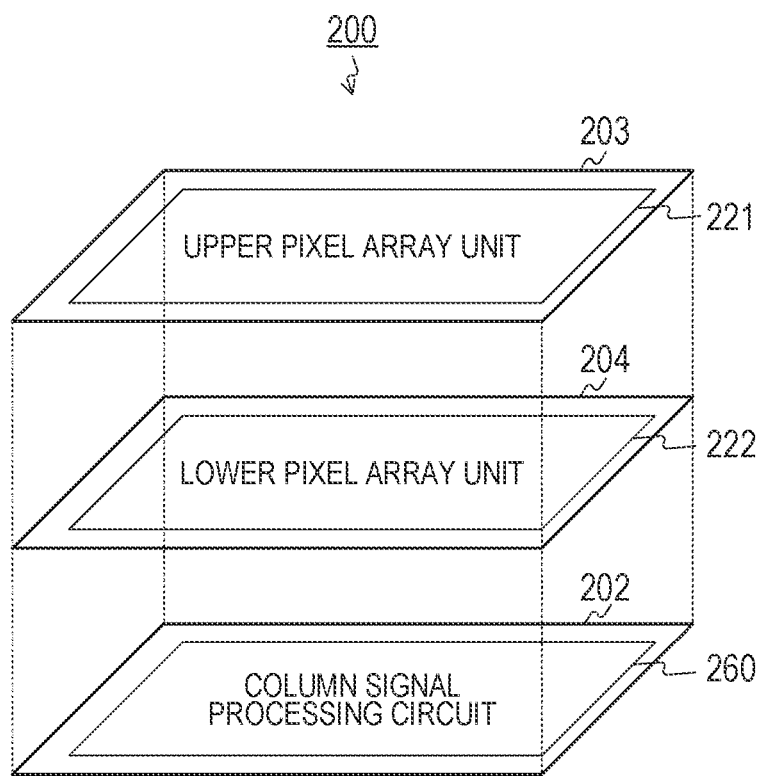
FIG. 20 is a diagram depicting an example of a laminated structure of a solid-state imaging element in a third modification example of the second embodiment of the present technology.

FIG. 20 is a diagram depicting an example of a laminated structure of the solid-state imaging element 200 in the third modification example of the second embodiment of the present technology. The solid-state imaging element 200 of the third modification example of the second embodiment includes an upper pixel chip 203, a lower pixel chip 204, and the circuit chip 202. These chips are stacked, and are electrically connected by, for example, Cu—Cu bonding. Note that, in addition to the Cu—Cu bonding, connection can be made by a via or a bump.

The upper pixel array unit 221 is arranged in the upper pixel chip 203. The lower pixel array unit 222 is arranged in the lower pixel chip 204. For each pixel in the pixel array unit 220, a part of the pixel is arranged in the upper pixel array unit 221, and the rest is arranged in the lower pixel array unit 222.

Furthermore, in the circuit chip 202, the column signal processing circuit 260, the vertical scanning circuit 211, the timing control circuit 212, the DAC 213, and the load MOS circuit block 250 are arranged. Circuits other than the column signal processing circuit 260 are omitted in the drawing.

By adopting the three-layer configuration as illustrated in the drawing, it is possible to reduce unnecessary space and further miniaturize the pixel as compared with the two-layer configuration. Furthermore, the lower pixel chip 204 that is a second layer can be manufactured by a dedicated process for the capacitor and switch.

As described above, in the third modification example of the second embodiment of the present technology, since the circuits in the solid-state imaging element 200 are dispersedly arranged in the three semiconductor chips, the pixel can be further miniaturized as compared with a case where the circuits are dispersedly arranged in the two semiconductor chips.

3. Third Embodiment

In the second embodiment described above, the solid-state imaging element 200 sequentially reads the pixel signal of each of the two pixels in the pixel block 300, but with this configuration, there is a possibility that the reading speed is insufficient. The solid-state imaging element 200 of the third embodiment is different from that of the second embodiment in that pixel addition is performed.

FIG. 21 is a plan view depicting a configuration example of the pixel array unit 220 in the third embodiment of the present technology. In the drawing, a is a plan view depicting an example of the pixel array unit 220 in the Bayer array. In the drawing, b is a plan view depicting an example of the pixel array unit 220 in the Quad Bayer array.

As illustrated in a of the drawing, in the pixel array unit 220 of the second embodiment, red (R), green (G), and blue (B) pixels are arranged in the Bayer array. Among these pixels, the solid-state imaging element 200 can add the respective pixel signals of the R pixel 301, and neighboring R pixels 302 to 304. Similarly, for the G pixel and the B pixel, the solid-state imaging element 200 can add the pixel signals of the four neighboring pixels.

Note that, instead of the Bayer array, the pixels can be arranged in the Quad Bayer array as illustrated in b of the drawing. In the Quad Bayer array, four pixels of the same color are arranged adjacent to each other in 2 rows×2 columns. Then, focusing on the four R pixels, the four B pixels are arranged at the lower right of the four R pixels, and the four G pixels are arranged at the right side and at the lower side. Among these pixels, the solid-state imaging element 200 can add the pixel signals of adjacent four pixels (pixels 301 to 304 and the like) of the same color.

Note that the arrangement of the pixels is not limited to the Bayer array or the Quad Bayer array. For example, R, G, B, and W (white) pixels can be arranged.

Figure 22:
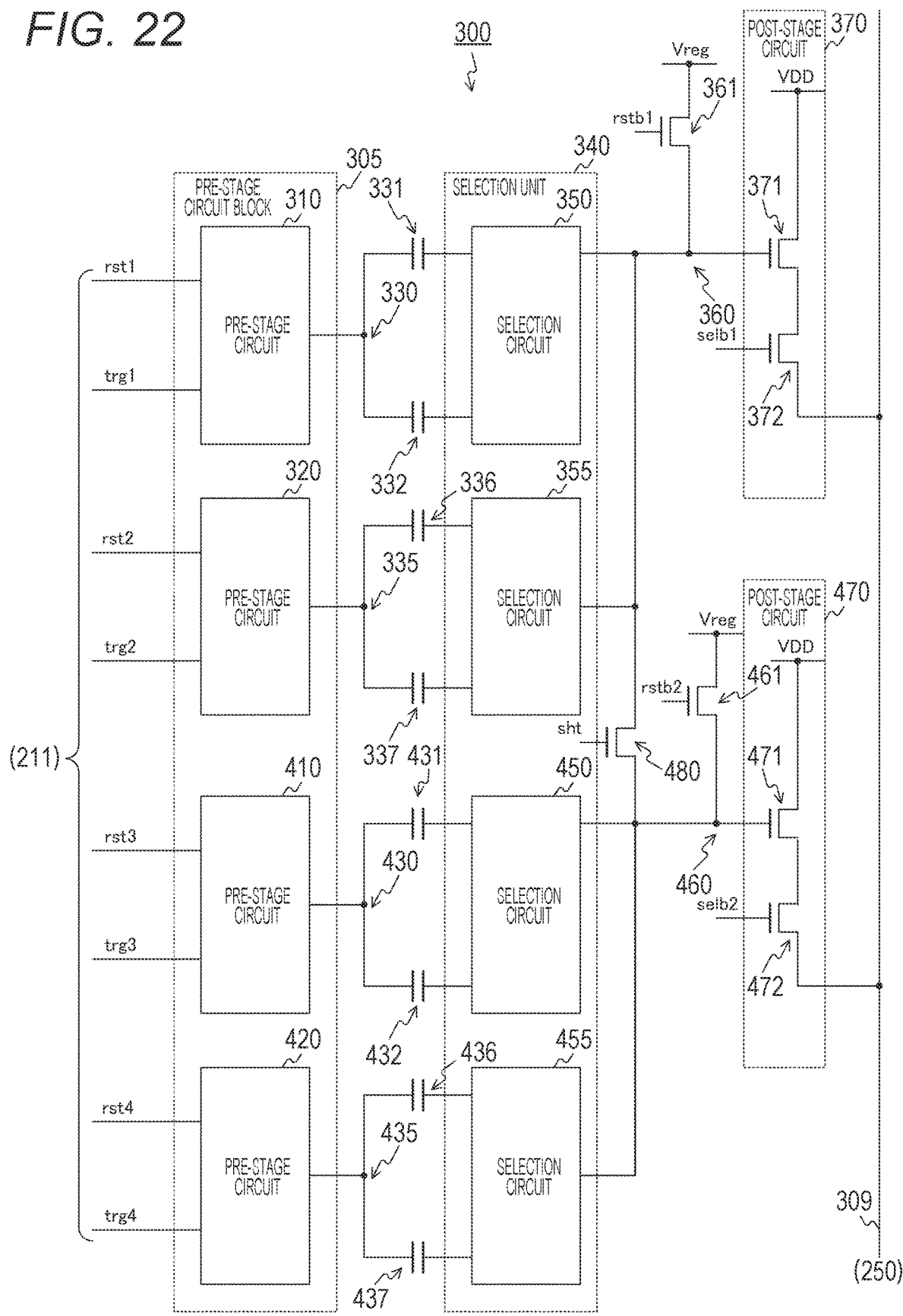
FIG. 22 is a circuit diagram depicting a configuration example of a pixel block in the third embodiment of the present technology.

FIG. 22 is a circuit diagram depicting a configuration example of the pixel block 300 in the third embodiment of the present technology. In the pixel block 300 of the third embodiment, four pixels to be added in a case where pixel addition is performed are arranged. For example, the pixels 301 to 304 in FIG. 21 are arranged in the pixel block 300.

The pixel block 300 of the third embodiment is further provided with capacitive elements 431, 432, 436, and 437, a short-circuit transistor 480, a post-stage reset transistor 461, and a post-stage circuit 470. Furthermore, in the third embodiment, pre-stage circuits 410 and 420 are further arranged in the pre-stage circuit block 305, and selection circuits 450 and 455 are further arranged in the selection unit 340. The vertical scanning circuit 211 supplies a post-stage reset signal rstb1 to the post-stage reset transistor 361, and supplies a post-stage reset signal rstb2 to the post-stage reset transistor 461.

A post-stage amplification transistor 471 and a post-stage selection transistor 472 are arranged in the post-stage circuit 470. As these transistors, for example, nMOS transistors are used. Furthermore, the circuit configurations of the post-stage reset transistor 461 and the post-stage circuit 470 are similar to those of the post-stage reset transistor 361 and the post-stage circuit 370. The post-stage circuits 370 and 470 are connected to the same vertical signal line 309. The vertical scanning circuit 211 supplies a post-stage selection signal selb1 to the post-stage selection transistor 372, and supplies a post-stage selection signal selb2 to the post-stage selection transistor 472.

The pre-stage circuit 410 sequentially generates the reset level and the signal level, and causes the capacitive elements 431 and 432 to hold the reset level and the signal level. The pre-stage circuit 420 sequentially generates the reset level and the signal level, and causes the capacitive elements 436 and 437 to hold the reset level and the signal level. Note that the capacitive elements 431 and 432 are examples of fifth and sixth capacitive elements described in the claims, and the capacitive elements 436 and 437 are examples of seventh and eighth capacitive elements described in the claims.

Furthermore, the selection circuit 450 connects one of the capacitive elements 431 and 432 to a post-stage node 460, and the selection circuit 455 connects one of the capacitive elements 436 and 437 to the post-stage node 460. Note that the selection circuit 450 is an example of a third selection circuit described in the claims, and the selection circuit 455 is an example of a fourth selection circuit described in the claims. Furthermore, the post-stage node 360 is an example of a first post-stage node described in the claims, and the post-stage node 460 is an example of a second post-stage node described in the claims.

The short-circuit transistor 480 opens and closes a path between the post-stage node 360 and the post-stage node 460 in accordance with a short-circuit signal sht from the vertical scanning circuit 211. As the short-circuit transistor 480, for example, an nMOS transistors is used.

Figure 23:
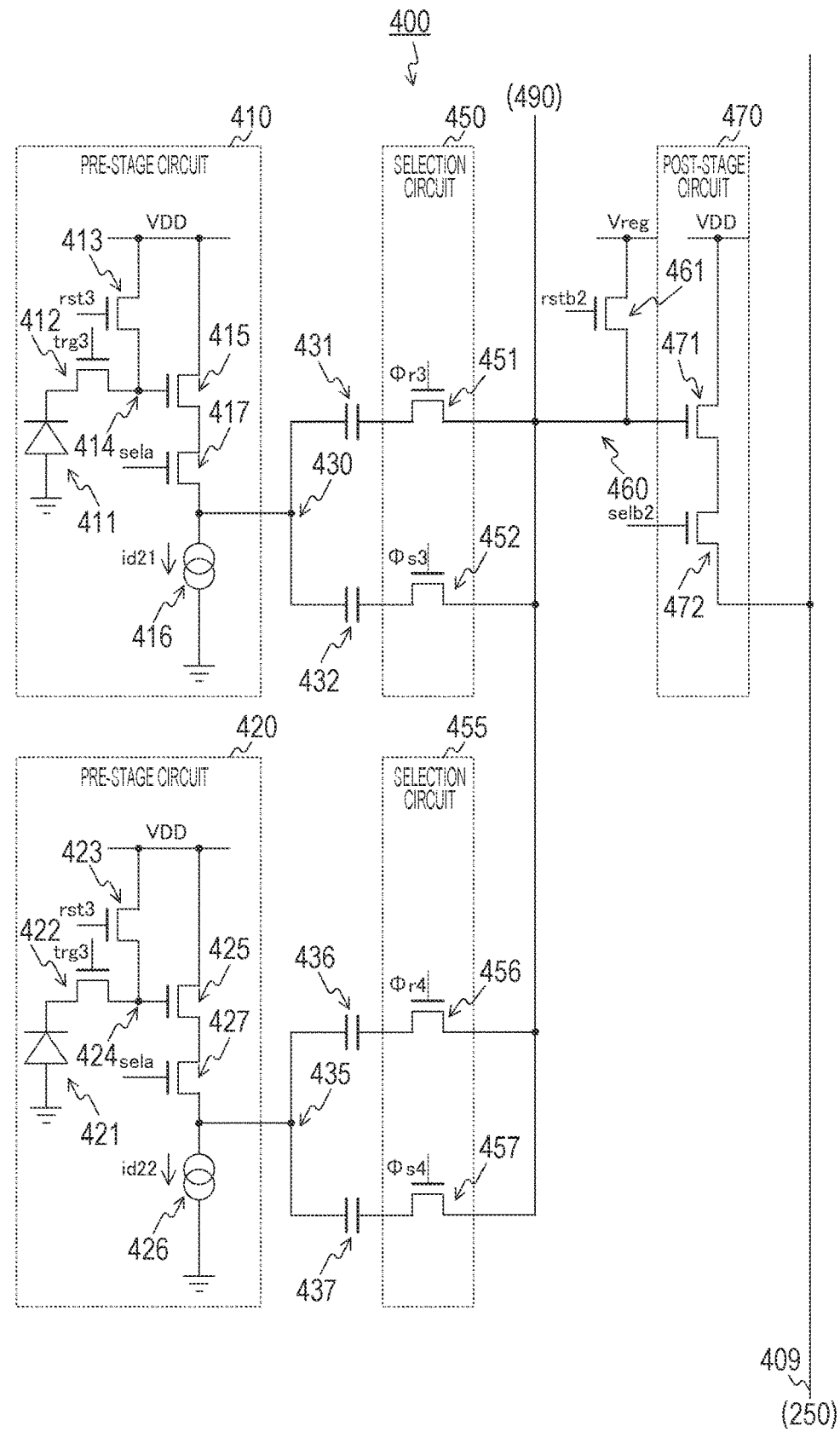
FIG. 23 is a circuit diagram depicting a configuration example of a pre-stage circuit and a selection circuit in the third embodiment of the present technology.

FIG. 23 is a circuit diagram depicting a configuration example of the pre-stage circuits 410 and 420 and the selection circuits 450 and 455 in the third embodiment of the present technology.

The pre-stage circuit 410 includes a photoelectric conversion element 411, a transfer transistor 412, an FD reset transistor 413, an FD 414, a pre-stage amplification transistor 415, a current source transistor 416, and a pre-stage selection transistor 417. The vertical scanning circuit 211 supplies a transfer signal trg3 and an FD reset signal rst3 to the transfer transistor 412 and the FD reset transistor 413.

Furthermore, the pre-stage circuit 420 includes a photoelectric conversion element 421, a transfer transistor 422, an FD reset transistor 423, an FD 424, a pre-stage amplification transistor 425, a current source transistor 426, and a pre-stage selection transistor 427. The vertical scanning circuit 211 supplies a transfer signal trg4 and an FD reset signal rst4 to the transfer transistor 422 and the FD reset transistor 423. The pre-stage selection signal sela is supplied to the pre-stage selection transistors 417 and 427.

The selection circuit 450 includes selection transistors 451 and 452, and the selection circuit 455 includes selection transistors 456 and 457. The vertical scanning circuit 211 supplies selection signals $\Phi r3$ and $\Phi s3$ to the selection transistors 451 and 452, and supplies selection signals $\Phi r4$ and $\Phi s4$ to the selection transistors 456 and 457.

The circuit configurations of the pre-stage circuits 410 and 420 are similar to those of the pre-stage circuits 310 and 320. Furthermore, the circuit configurations of the selection circuits 450 and 455 are similar to those of the selection circuits 350 and 355.

Figure 24:
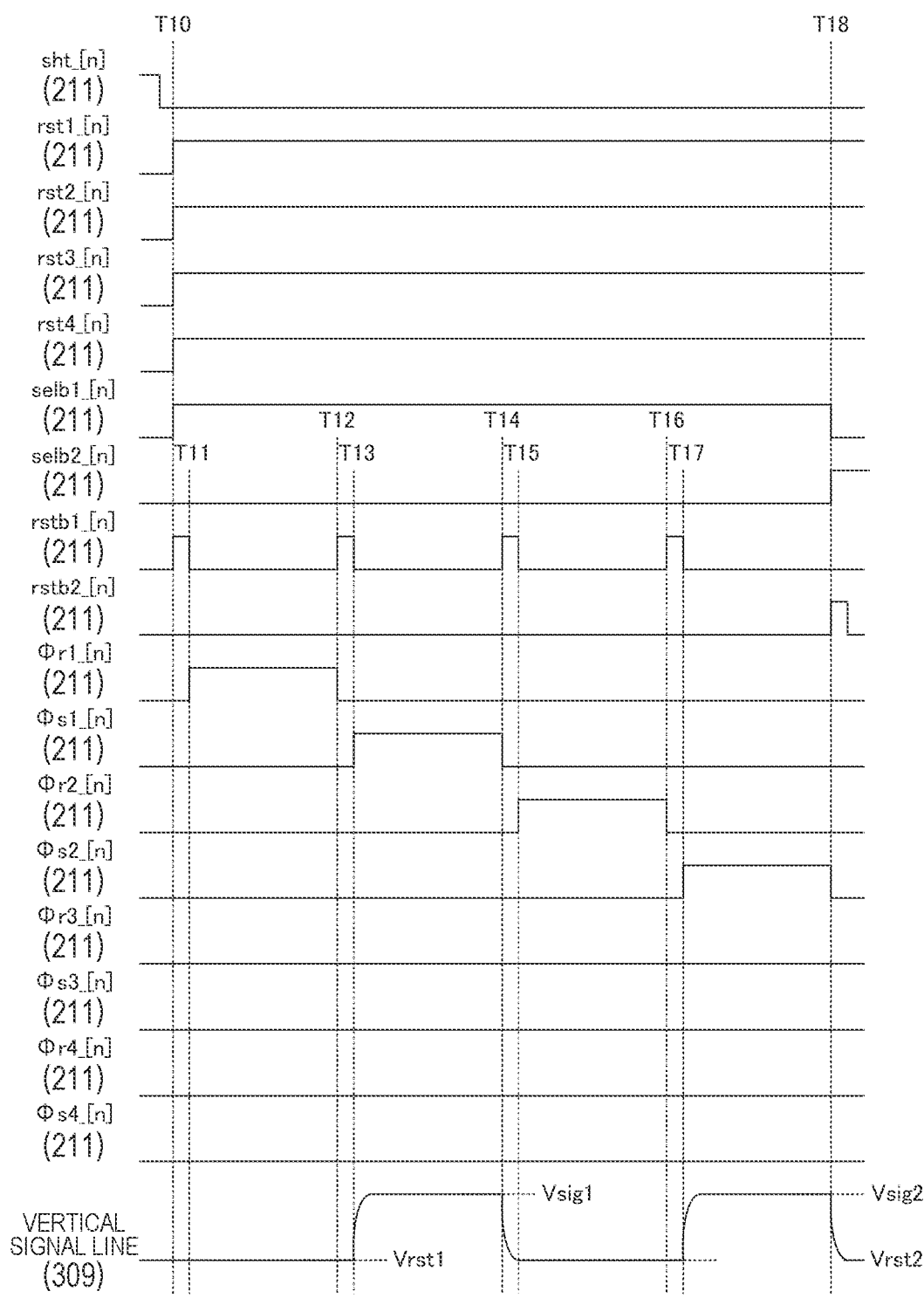
FIG. 24 is a timing chart depicting an example of a read operation of first and second pixels in the pixel block in the third embodiment of the present technology.

FIG. 24 is a timing chart depicting an example of a read operation of first and second pixels in the pixel block 300 in the third embodiment of the present technology. Any of a plurality of modes including the non-addition mode in which pixel addition is not performed and the addition mode in which pixel addition is performed is set in the solid-state imaging element 200 in the third embodiment. The global shutter operation and the read operation in the non-addition mode are similar to those in the second embodiment. The global shutter operation in the addition mode is similar to that in the non-addition mode.

In the non-addition mode, the vertical scanning circuit 211 sets the short-circuit signal sht to the low level. Furthermore, at timing T10 of the start of the reading of the n-th row of the pixel block 300, the vertical scanning circuit 211 sets the FD reset signals rst1 to rst4 to the high level. Furthermore, during the period from timing T10 to timing T18, the vertical scanning circuit 211 sets the post-stage selection signal selb1 to the high level, and sets the post-stage selection signal selb2 to the low level.

Furthermore, the vertical scanning circuit 211 supplies the high-level post-stage reset signal rstb1 during the pulse period from timing T10 to timing T11, and supplies the high-level selection signal $\Phi r1$ during a period from timing T11 to timing T12. During this period, the reset level Vrst1 of the first pixel is read through the vertical signal line 309.

The vertical scanning circuit 211 supplies the high-level post-stage reset signal rstb1 during the pulse period from timing T12 to timing T13, and supplies the high-level selection signal $\Phi s1$ during a period from timing T13 to timing T14. During this period, the signal level Vsig1 of the first pixel is read through the vertical signal line 309.

Subsequently, the vertical scanning circuit 211 supplies the high-level post-stage reset signal rstb1 during the pulse period from timing T14 to timing T15, and supplies the high-level selection signal $\Phi r2$ during a period from timing T15 to timing T16. During this period, the reset level Vrst2 of the second pixel is read through the vertical signal line 309.

The vertical scanning circuit 211 supplies the high-level post-stage reset signal rstb1 during the pulse period from timing T16 to timing T17, and supplies the high-level selection signal $\Phi s2$ during the period from timing T17 to timing T18. During this period, the signal level Vsig2 of the second pixel is read through the vertical signal line 309.

Figure 25:
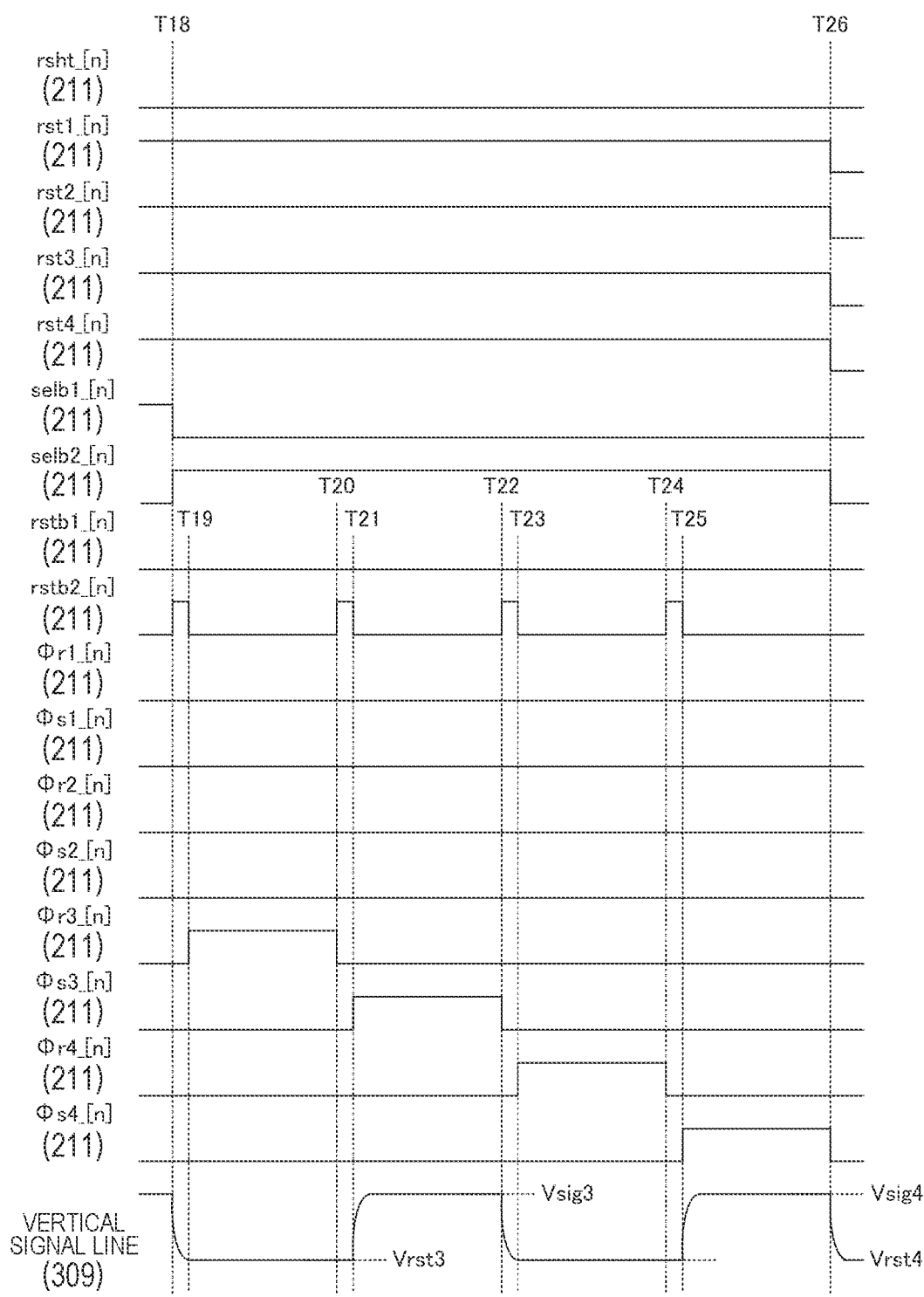
FIG. 25 is a timing chart depicting an example of a read operation of third and fourth pixels in the pixel block in the third embodiment of the present technology.

FIG. 25 is a timing chart depicting an example of a read operation of third and fourth pixels in the pixel block 300 in the third embodiment of the present technology.

During a period from timing T18 to timing T26, the vertical scanning circuit 211 sets the post-stage selection signal selb1 to the low level, and sets the post-stage selection signal selb2 to the high level.

Furthermore, the vertical scanning circuit 211 supplies the high-level post-stage reset signal rstb2 during the pulse period from timing T18 to timing T19, and supplies the high-level selection signal $\Phi r3$ during a period from timing T19 to timing T20. During this period, the reset level Vrst3 of the third pixel is read through the vertical signal line 309.

The vertical scanning circuit 211 supplies the high-level post-stage reset signal rstb2 during the pulse period from timing T20 to timing T21, and supplies the high-level selection signal $\Phi s3$ during a period from timing T21 to timing T22. During this period, the signal level Vsig3 of the third pixel is read through the vertical signal line 309.

Subsequently, the vertical scanning circuit 211 supplies the high-level post-stage reset signal rstb2 during the pulse period from timing T22 to timing T23, and supplies the high-level selection signal $\Phi r4$ during a period from timing T23 to timing T24. During this period, the reset level Vrst4 of the fourth pixel is read through the vertical signal line 309.

The vertical scanning circuit 211 supplies the high-level post-stage reset signal rstb2 during the pulse period from timing T24 to timing T25, and supplies the high-level selection signal $\Phi s4$ during the period from timing T25 to timing T26. During this period, the signal level Vsig4 of the fourth pixel is read through the vertical signal line 309.

Furthermore, at timing T26 of the end of the reading of the n-th row, the vertical scanning circuit 211 sets the FD reset signals rst1 to rst4 to the low level.

As illustrated in FIGS. 24 and 25, in the non-addition mode, the short-circuit transistor 480 is controlled to the open state. Furthermore, the capacitive elements 331 and 332 are sequentially connected to the post-stage node 360, and the reset level and the signal level of the first pixel are sequentially read. The capacitive elements 336 and 337 are sequentially connected to the post-stage node 360, and the reset level and the signal level of the second pixel are sequentially read. Subsequently, the capacitive elements 431 and 432 are sequentially connected to the post-stage node 460, and the reset level and the signal level of the third pixel are sequentially read. The capacitive elements 436 and 437 are sequentially connected to the post-stage node 460, and the reset level and the signal level of the fourth pixel are sequentially read. In this manner, the reset level and the signal level of each of the four pixels in the pixel block 300 are sequentially read.

Figure 26:
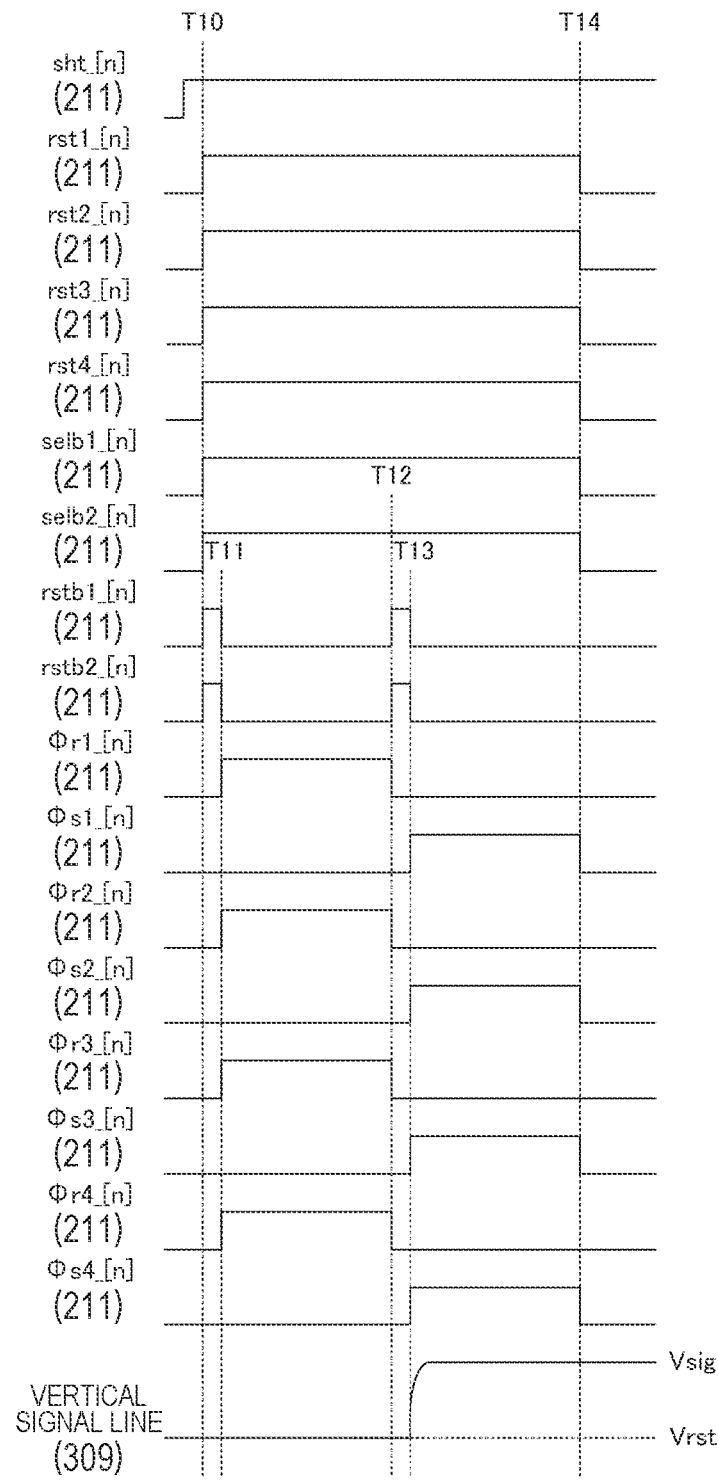
FIG. 26 is a timing chart depicting an example of a read operation in an addition mode in the third embodiment of the present technology.

FIG. 26 is a timing chart depicting an example of a read operation in the addition mode in the third embodiment of the present technology. In the addition mode, the vertical scanning circuit 211 sets the short-circuit signal sht to the high level. From timing T10 to timing T14 as the read period of the n-th row of the pixel block 300, the vertical scanning circuit 211 sets the FD reset signals rst1 to rst4 and the post-stage selection signals selb1 and selb2 to the high level.

Furthermore, the vertical scanning circuit 211 supplies the high-level post-stage reset signals rstb1 and rstb2 during the pulse period from timing T10 to timing T11, and supplies the high-level selection signals Φr1 to Φr4 during a period from timing T11 to timing T12. During this period, the reset level Vrst is read through the vertical signal line 309. The reset level Vrst is a value obtained by adding the reset levels of the four pixels in the pixel block 300.

Subsequently, the vertical scanning circuit 211 supplies the high-level post-stage reset signals rstb1 and rstb2 during the pulse period from timing T12 to timing T13, and supplies the high-level selection signals Φs1 to Φs4 during a period from timing T13 to timing T14. During this period, the signal level Vsig is read through the vertical signal line 309. The signal level Vsig is a value obtained by adding the signal levels of the four pixels in the pixel block 300.

Here, in the pixel block 300 of the second embodiment, four pixels can be added by increasing the number of pixels sharing the post-stage circuit 370 to four. However, an increase in the number of pixels sharing the post-stage circuit 370 causes adverse effects. In a case where the number of pixels sharing the post-stage circuit 370 is four, the wiring of the post-stage node 360 extends over four pixels, and the parasitic capacitance of the post-stage node 360 increases accordingly. Due to the increase in the parasitic capacitance, the gain of the signal in a case where pixel addition is not performed decreases. This is because the voltage held in the capacitive element 331 or 332 is reduced by the parasitic capacitance in a case where the capacitive element 331 or 332 is connected to the post-stage node 360. This decrease in gain causes a decrease in signal-noise (SN) ratio.

On the other hand, in the third embodiment in which the short-circuit transistor 480 is provided, by setting the short-circuit transistor 480 in the open state in the non-addition mode, the number of pixels sharing each of the post-stage circuits 370 and 470 can be two. Therefore, it is possible to suppress an increase in the parasitic capacitance of the post-stage node as compared with a case where four pixels share the post-stage circuit 370. With such a configuration, it is possible to suppress a decrease in the SN ratio in the non-addition mode while realizing addition of more than two pixels.

Note that, in the pixel block 300 illustrated in FIG. 22, one vertical signal line 309 is shared by the post-stage circuits 370 and 470, but the present technology is not limited to this configuration. Vertical signal lines 309-1 and 309-2 can be wired, the post-stage circuit 370 can be connected to the vertical signal line 309-1, and the post-stage circuit 470 can be connected to the vertical signal line 309-2. In this case, it is necessary to double not only the number of vertical signal lines, but also the number of load MOS transistors 251 and the number of ADCs 261 in the post stage. Instead, in the non-addition mode, one of two pixels sharing the post-stage circuit 370 and one of two pixels sharing the post-stage circuit 470 can be simultaneously read, and therefore, the reading speed can be improved. Furthermore, in the addition mode, only one of the vertical signal lines 309-1 and 309-2 is used, and the load MOS transistor 251 corresponding to the other of the vertical signal lines 309-1 and 309-2 is controlled to the off state.

Note that the second and third modification examples of the second embodiment can also be applied to the third embodiment.

As described above, according to the third embodiment of the present technology, since the short-circuit transistor 480 short-circuits the post-stage node 360 and the post-stage node 460, the pixel block 300 can add the respective pixel signals of the four pixels. Therefore, as compared with the case where the addition is not performed, the sensitivity and the reading speed can be improved and the power consumption can be reduced.

4. Fourth Embodiment

In the first embodiment described above, the current source transistor (316 or 326) is arranged for each pixel, but with this configuration, there is a possibility that pixel miniaturization becomes difficult. The solid-state imaging element 200 of the fourth embodiment is different from that of the first embodiment in that the current source transistor is shared by a plurality of pixels.

Figure 27:
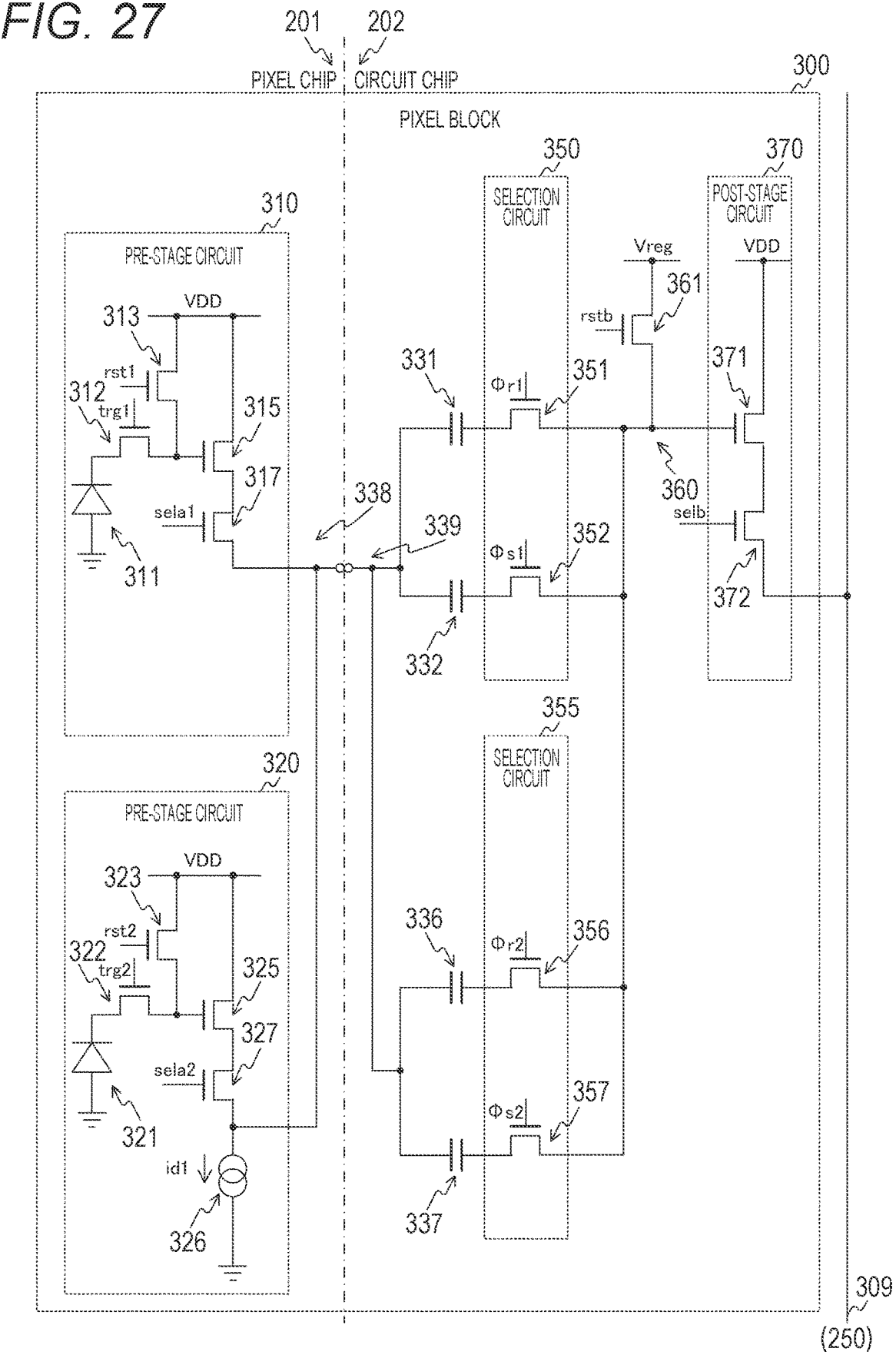
FIG. 27 is a circuit diagram depicting a configuration example of a pixel block in a fourth embodiment of the present technology.

FIG. 27 is a circuit diagram depicting a configuration example of the pixel block 300 in the fourth embodiment of the present technology. The pixel block 300 of the fourth embodiment is different from that of the second embodiment in that the current source transistor 316 is not provided.

The pre-stage selection transistor 317 outputs a voltage amplified by the pre-stage amplification transistor 315 to a pre-stage node 338 in accordance with a pre-stage selection signal sela1 from the vertical scanning circuit 211. The pre-stage selection transistor 327 outputs a voltage amplified by the pre-stage amplification transistor 325 to the pre-stage node 338 in accordance with a pre-stage selection signal sela2 from the vertical scanning circuit 211. Furthermore, the current source transistor 326 is connected to the pre-stage node 338.

Furthermore, the capacitive elements 331, 332, 336, and 337 have their respective one ends commonly connected to a pre-stage node 339, and have their respective other ends connected to the selection circuits 350 and 355. The pre-stage node 339 is connected to the pre-stage node 338.

Furthermore, circuits and elements in the solid-state imaging element 200 are dispersedly arranged in the upper pixel chip 203 and the lower pixel chip 204. For example, the pre-stage circuits 310 and 320 are arranged in the upper pixel chip 203, and circuits in the post stages thereof are arranged in the circuit chip 204. Then, the pre-stage node 338 and the pre-stage node 339 are connected by Cu—Cu connection or the like.

In the second embodiment in which the current source transistor is arranged for each pixel, it is necessary to perform Cu—Cu connection for each pixel as illustrated in FIG. 19 in a case of using a laminated structure. In particular, in a case where the capacitive element 331 having the MIM structure or the like is arranged in the circuit chip 202, the thickness of the chip increases, it becomes difficult to planarize the surfaces connecting the upper and lower chips, and the pitch of the Cu—Cu connection is restricted. For example, while the size of the fine pixel of the image sensor for mobile use is micrometers (μm) or less, the pitch of the Cu—Cu connection is several micrometers (μm). Therefore, in the configuration in which the current source transistor is arranged for each pixel, miniaturization is difficult.

On the other hand, in the configuration in FIG. 27 in which the current source transistor 326 is shared by two pixels, the number of Cu—Cu connections can be reduced. Therefore, pixel miniaturization is facilitated. Furthermore, the current in a case of the global shutter operation can be reduced. Furthermore, the current source transistor 326 generally has a cascade configuration in order to suppress current fluctuations due to the transistor channel-length modulation effect. By sharing the current source transistor 326 having a relatively large size, the transistor area can be reduced.

Note that, although the current source transistor 326 is shared by two pixels, the number of pixels sharing the current source transistor 326 is not limited to two, and may be three or more.

Figure 28:
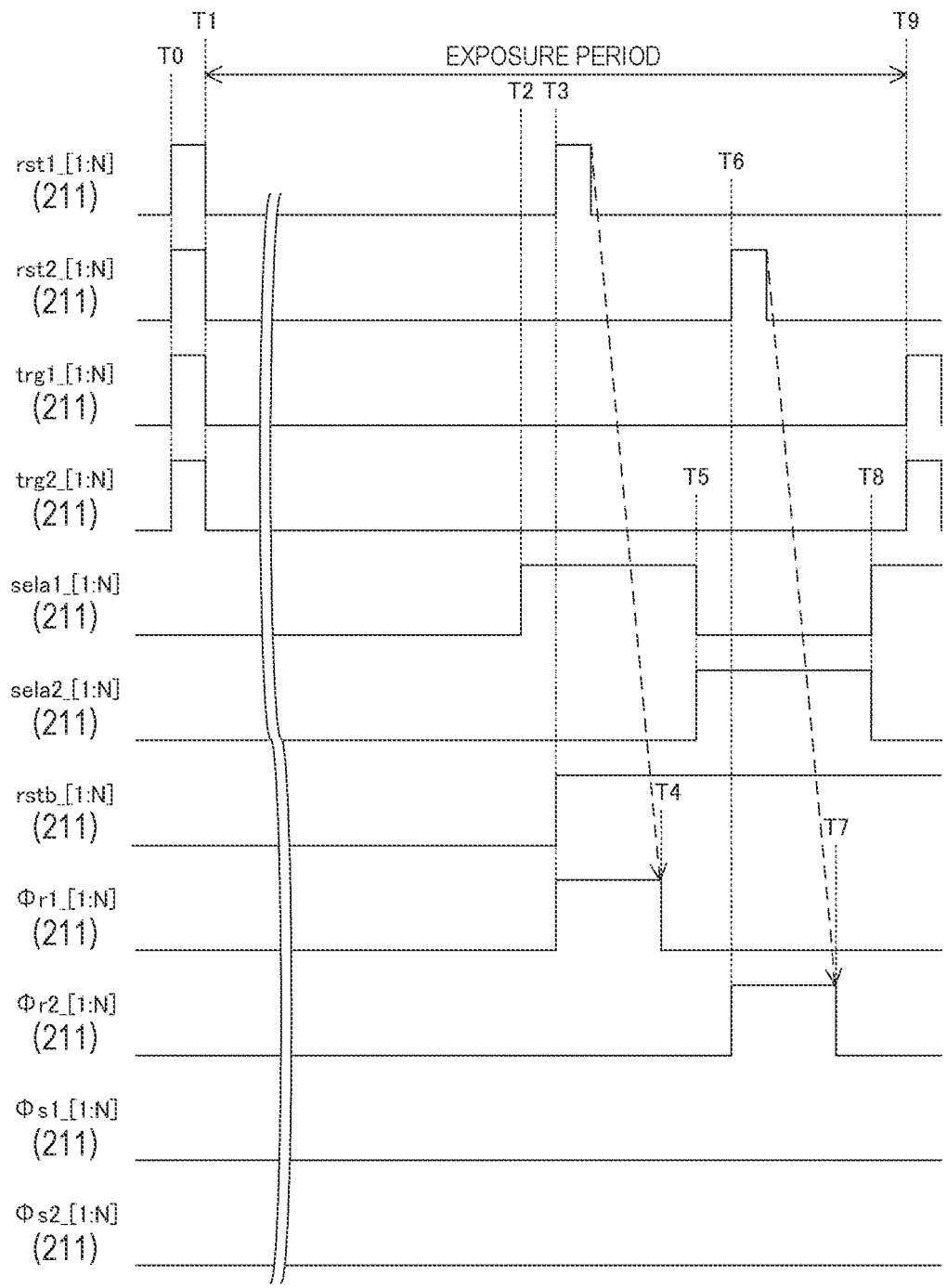
FIG. 28 is a timing chart depicting an example of a global shutter operation in the fourth embodiment of the present technology.

FIG. 28 is a timing chart depicting an example of a global shutter operation in the fourth embodiment of the present technology. The vertical scanning circuit 211 supplies the high-level FD reset signals rst1 and rst2 and the high-level transfer signals trg1 and trg2 to all the rows from timing T0 immediately before the start of the exposure to timing T1 after the pulse period elapses. Therefore, all the pixels are PD reset, and the exposure simultaneously starts in all the rows.

During a period from timing T2 immediately before the end of the exposure to timing T5, the vertical scanning circuit 211 sets the pre-stage selection signal sela1 of all the rows to the high level. At timing T3 in the period, the vertical scanning circuit 211 supplies the high-level FD reset signal rst1 over the pulse period while setting the post-stage reset signal rstb and the selection signal Φr1 to the high level for all the rows. Therefore, the first pixel in the pixel block 300 is FD reset, and the reset level is sampled and held.

At timing T4, the vertical scanning circuit 211 returns the selection signal Φr1 to the low level. Furthermore, during a period from timing T5 to timing T8, the vertical scanning circuit 211 sets the pre-stage selection signal sela1 of all the rows to the low level, and sets the pre-stage selection signal sela2 to the high level. At timing T6 in the period, the vertical scanning circuit 211 supplies the high-level FD reset signal rst2 over the pulse period while setting the post-stage reset signal rstb and the selection signal Φr2 to the high level for all the rows. Therefore, the second pixel in the pixel block 300 is FD reset, and the reset level is sampled and held.

Then, the vertical scanning circuit 211 returns the selection signal Φr2 of all the rows to the low level at timing T7, and sets the pre-stage selection signal sela2 to the low level and sets the pre-stage selection signal sela1 to the high level at timing T8.

Here, sela1_[n] and sela2_[n] in the drawing indicates signals to pixels in the n-th row.

As illustrated in the drawing, the vertical scanning circuit 211 sequentially closes the pre-stage selection transistors 317 and 327 immediately before the end of the exposure. Then, in a case where the pre-stage selection transistor 317 is in the closed state, the FD reset transistor 313 performs the FD reset, and in a case where the pre-stage selection transistor 327 is in the closed state, the FD reset transistor 323 performs the FD reset.

Figure 29:
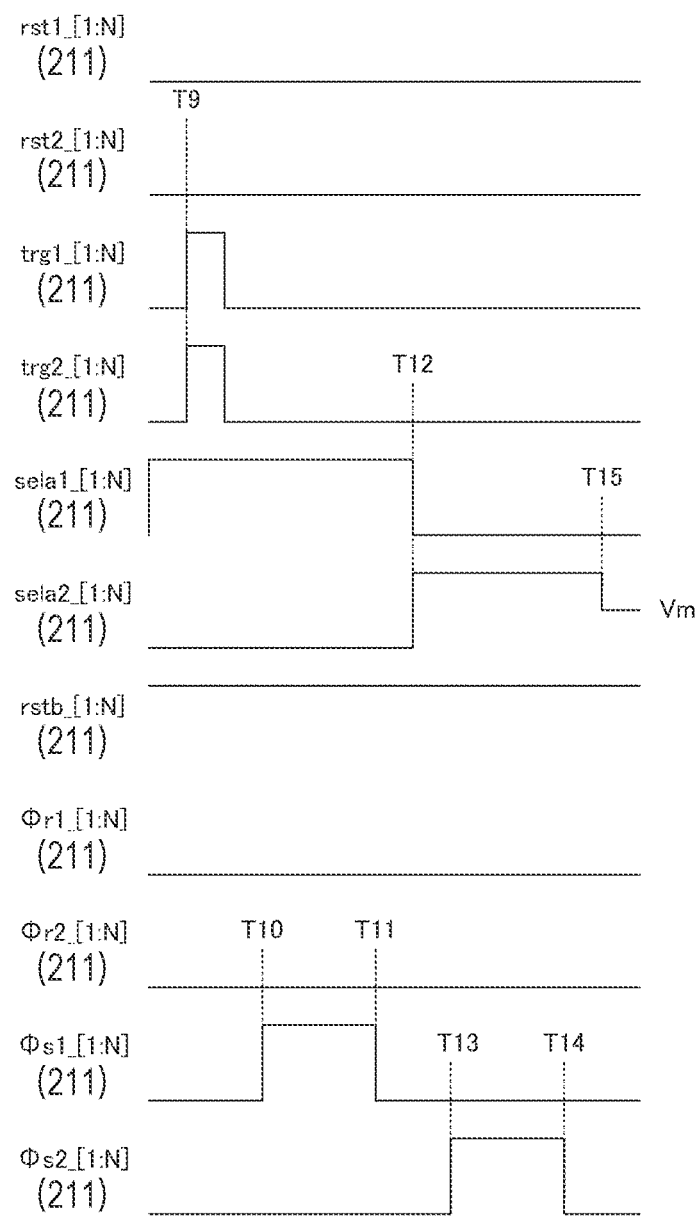
FIG. 29 is a timing chart depicting an example of control immediately after the end of exposure in the fourth embodiment of the present technology.

FIG. 29 is a timing chart depicting an example of control immediately after the end of the exposure in the fourth embodiment of the present technology. At timing T9 of the end of the exposure, the vertical scanning circuit 211 supplies the high-level transfer signals trg1 and trg2 over the pulse period for all the rows.

Then, the vertical scanning circuit 211 sets the selection signal Φs1 to the high level for all the rows during a period from timing T10 to timing T11. Therefore, the signal level of the first pixel in the pixel block 300 is sampled and held.

At timing T12, the vertical scanning circuit 211 sets the pre-stage selection signal sela1 of all the rows to the low level, and sets the pre-stage selection signal sela2 to the high level.

Then, the vertical scanning circuit 211 sets the selection signal Φs2 to the high level for all the rows during a period from timing T13 to timing T14. Therefore, the signal level of the second pixel in the pixel block 300 is sampled and held.

The vertical scanning circuit 211 lowers the pre-stage selection signal sela2 of all the rows to the middle level Vm at timing T15.

As illustrated in the drawing, the vertical scanning circuit 211 sequentially closes the pre-stage selection transistors 317 and 327 at the end of the exposure. Then, the vertical scanning circuit 211 causes the transfer transistors 312 and 322 to transfer charges at the end of the exposure, and then sequentially closes the pre-stage selection transistors 317 and 327.

Note that the first and third modification examples of the second embodiment, and the third embodiment can be applied to the fourth embodiment.

As described above, according to the fourth embodiment of the present technology, since the current source transistor 326 is shared by two pixels, the number of Cu—Cu connections between chips can be reduced. Therefore, pixel miniaturization is facilitated.

5. Fifth Embodiment

In the first embodiment described above, a pair of capacitors is arranged for each pixel, but with this configuration, pixel miniaturization is difficult. The solid-state imaging element 200 of the fifth embodiment is different from that of the first embodiment in that the number of capacitors is reduced.

Figure 30:
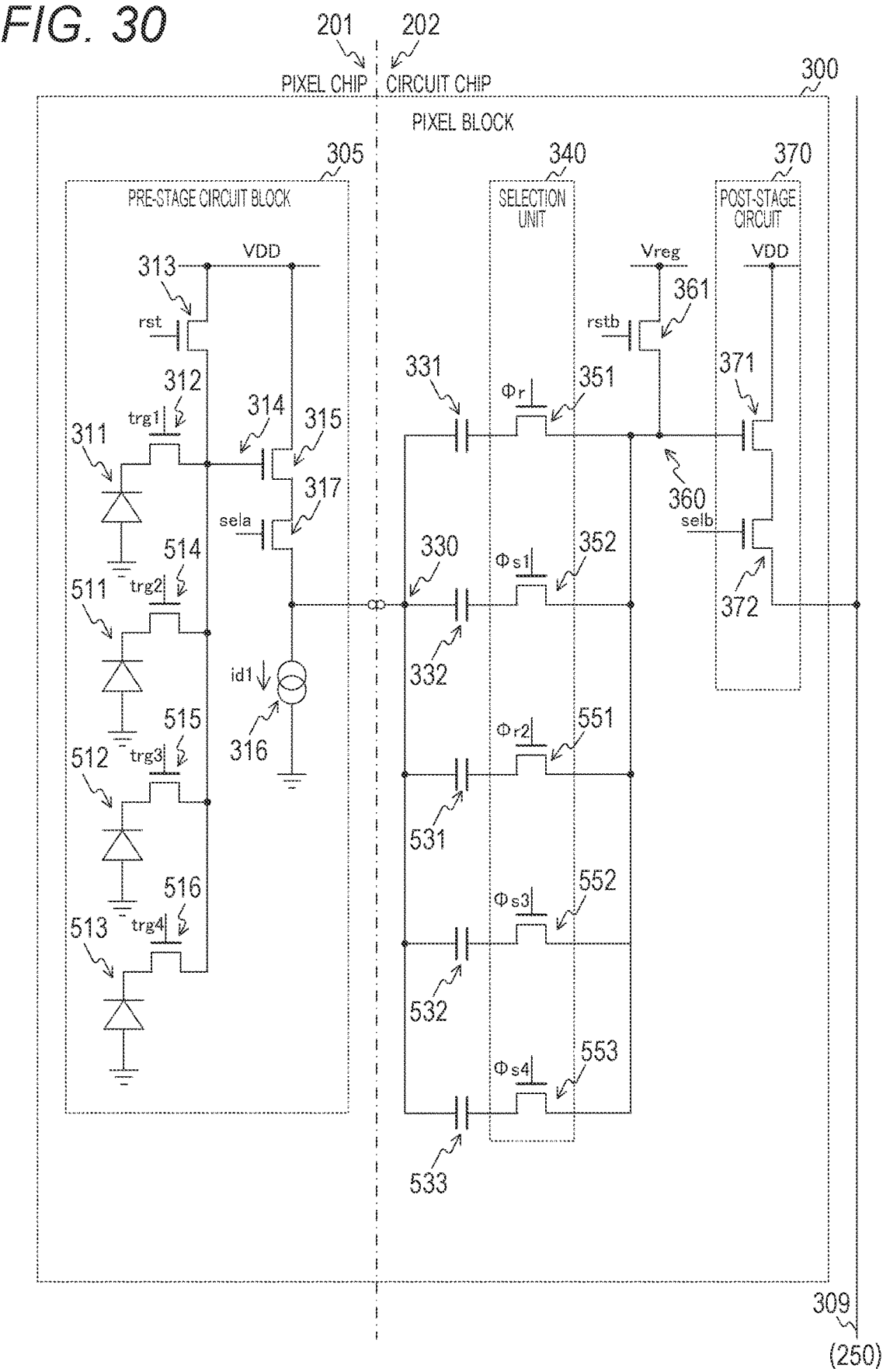
FIG. 30 is a circuit diagram depicting a configuration example of a pixel block in a fifth embodiment of the present technology.

FIG. 30 is a circuit diagram depicting a configuration example of the pixel block 300 in the fifth embodiment of the present technology. In the pixel block 300 of the fifth embodiment, the pre-stage circuit block 305, capacitive elements 331, 332, 531, 532, and 533, the selection unit 340, the post-stage reset transistor 361, and the post-stage circuit 370 are arranged. In the pixel block 300 of the fifth embodiment, four pixels are arranged. For example, the pixels 301 to 304 in FIG. 21 are arranged in the pixel block 300.

The pre-stage circuit block 305 includes the photoelectric conversion element 311, photoelectric conversion elements 511, 512, and 513, the transfer transistor 312, and transfer transistors 514, 515, and 516. The pre-stage circuit block 305 further includes the FD reset transistor 313, the FD 314, the pre-stage amplification transistor 315, the current source transistor 316, and the pre-stage selection transistor 317. As the transfer transistors 312, 514, 515, and 516, for example, nMOS transistors are used.

Furthermore, the selection unit 340 includes selection transistors 351, 352, 551, 552, and 5553. As the selection transistors 551, 552, and 553, for example, nMOS transistors are used.

The connection configuration of the photoelectric conversion element 311, the transfer transistor 312, the FD reset transistor 313, the FD 314, the pre-stage amplification transistor 315, the current source transistor 316, and the pre-stage selection transistor 317 of the fourth embodiment is similar to that of the first embodiment. However, the FD reset signal rst is input from the vertical scanning circuit 211 to the FD reset transistor 313.

The photoelectric conversion elements 511 to 513 generate charges by photoelectric conversion. The transfer transistor 514 transfers the charges from the photoelectric conversion element 511 to the FD 314 in accordance with the transfer signal trg2 from the vertical scanning circuit 211. The transfer transistor 515 transfers the charges from the photoelectric conversion element 512 to the FD 314 in accordance with the transfer signal trg3 from the vertical scanning circuit 211. The transfer transistor 516 transfers the charges from the photoelectric conversion element 513 to the FD 314 in accordance with the transfer signal trg4 from the vertical scanning circuit 211.

The connection configuration of the capacitive elements 331 and 332, and the selection transistors 351 and 352 of the fourth embodiment is similar to that of the first embodiment. However, the selection signal Φr is input from the vertical scanning circuit 211 to the selection transistor 351.

The capacitive elements 531, 532, and 533 have their respective one ends commonly connected to the pre-stage node 330, and have their respective other ends connected to the selection unit 340.

The selection transistor 551 opens and closes a path between the capacitive element 531 and the post-stage node 360 in accordance with the selection signal Φr2 from the vertical scanning circuit 211. The selection transistor 552 opens and closes a path between the capacitive element 532 and the post-stage node 360 in accordance with the selection signal Φr3 from the vertical scanning circuit 211. The selection transistor 553 opens and closes a path between the capacitive element 533 and the post-stage node 360 in accordance with the selection signal Φr4 from the vertical scanning circuit 211.

The circuit configuration of the post-stage reset transistor 361 and the post-stage circuit 370 of the fifth embodiment is similar to that of the first embodiment.

Furthermore, circuits and elements in the solid-state imaging element 200 are dispersedly arranged in the pixel chip 201 and the circuit chip 202. For example, the pre-stage circuit block 305 is arranged in the pixel chip 201, and circuits in the post stages thereof are arranged in the circuit chip 202.

As illustrated in FIG. 30, the one FD 314, the post-stage reset transistor 361, and the post-stage circuit 370 are shared by the four pixels. Furthermore, the reset level of the four pixels is held in the capacitive element 331, and the signal level of each of the four pixels is held in a corresponding one of the capacitive elements 332, 531, 532, and 533. In the first embodiment, it is necessary to arrange the capacitor for holding the reset level for each pixel, but in the fourth embodiment, since the capacitor is shared by the four pixels, the number of capacitors can be reduced. Therefore, as compared with a case where the capacitor is not shared, pixel miniaturization is facilitated.

Note that the FD 314 and the like are shared by the four pixels, but the number of sharing pixels is not limited to four.

Furthermore, the capacitive elements 331 and 332 are examples of first and second capacitive elements described in the claims. The capacitive elements 531, 532, and 533 are examples of a third capacitive element described in the claims.

Figure 31:
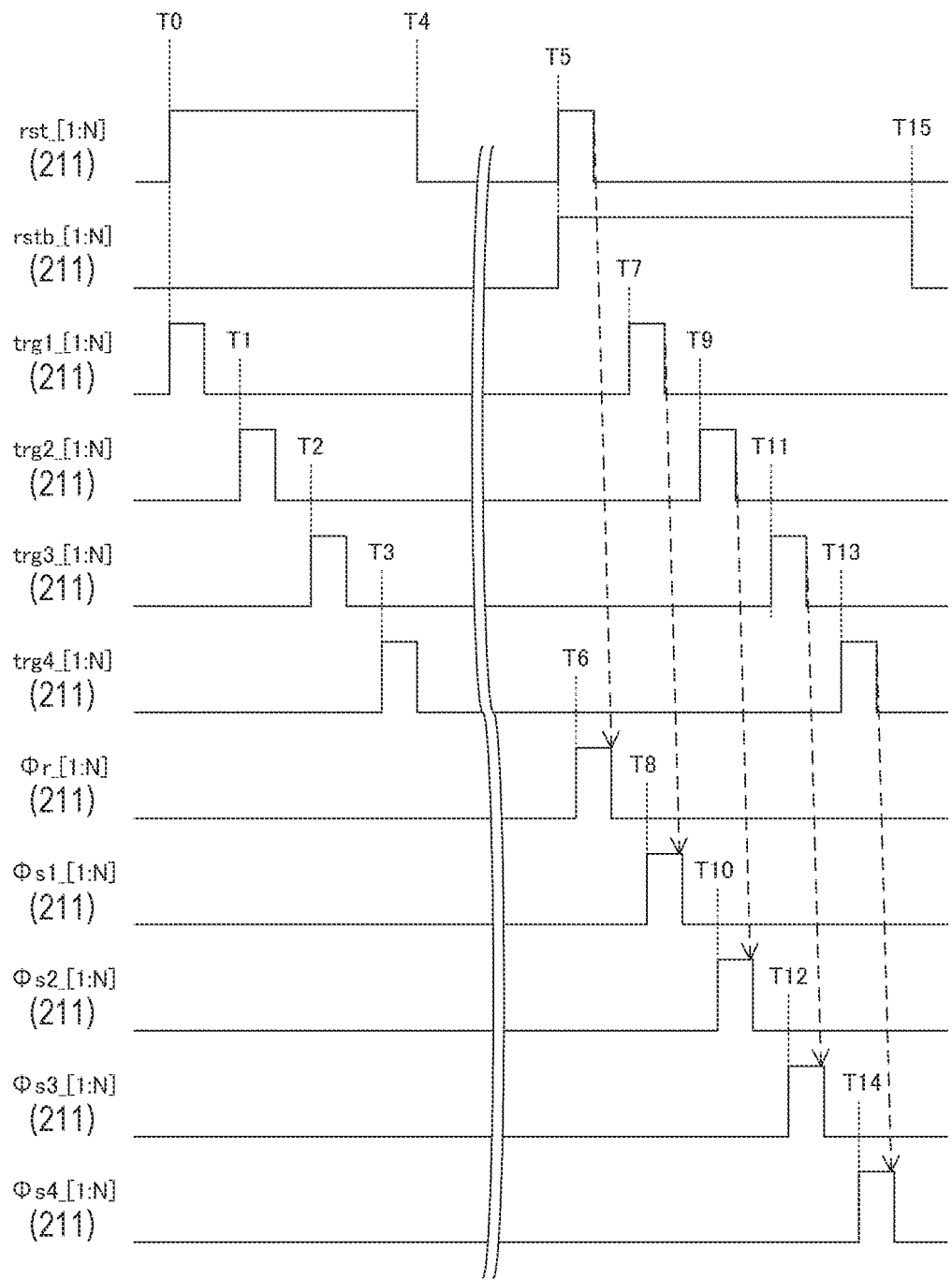
FIG. 31 is a timing chart depicting an example of a global shutter operation in the fifth embodiment of the present technology.

FIG. 31 is a timing chart depicting an example of a global shutter operation in the fourth embodiment of the present technology. The vertical scanning circuit 211 supplies the high-level FD reset signal rst to all the rows during a period from timing T0 at the start of the exposure to timing T4. At timing T0, timing T1, timing T2, and timing T3 in this period, the vertical scanning circuit 211 supplies the transfer signals trg1, trg2, trg3, and trg4 to all the rows over the pulse period. Therefore, all the pixels are PD reset.

Then, the vertical scanning circuit 211 supplies the high-level post-stage reset signal rstb to all the rows during a period from timing T5 at the end of the exposure to timing T15. Furthermore, at timing T5, the vertical scanning circuit 211 supplies the FD reset signal rst to all the rows over the pulse period. At timing T6 immediately after timing T5, the vertical scanning circuit 211 supplies the selection signal Φr to all the rows over the pulse period. Therefore, all the pixels are FD reset.

Furthermore, at timing T7, the vertical scanning circuit 211 supplies the transfer signal trg1 to all the rows over the pulse period. At timing T8 immediately after timing T7, the vertical scanning circuit 211 supplies the selection signal Φs1 to all the rows over the pulse period. Therefore, the signal level of the first pixel in the pixel block 300 is sampled and held. Furthermore, at timing T9, the vertical scanning circuit 211 supplies the transfer signal trg2 to all the rows over the pulse period. At timing T10 immediately after timing T9, the vertical scanning circuit 211 supplies the selection signal Φs2 to all the rows over the pulse period. Therefore, the sum of the signal levels of the first and second pixels in the pixel block 300 is sampled and held.

Furthermore, at timing T11, the vertical scanning circuit 211 supplies the transfer signal trg3 to all the rows over the pulse period. At timing T12 immediately after timing T11, the vertical scanning circuit 211 supplies the selection signal Φs3 to all the rows over the pulse period. Therefore, the sum of the signal levels of the first to third pixels in the pixel block 300 is sampled and held.

Furthermore, at timing T13, the vertical scanning circuit 211 supplies the transfer signal trg4 to all the rows over the pulse period. At timing T14 immediately after timing T13, the vertical scanning circuit 211 supplies the selection signal Φs4 to all the rows over the pulse period. Therefore, the sum of the signal levels of the first to fourth pixels in the pixel block 300 is sampled and held.

Here, rst_[n] and r_[n] indicate signals to pixels in the n-th row among the N rows.

In the fifth embodiment, since the FD 314 is shared by the four pixels, the charge transfer of each of the four pixels cannot be simultaneously performed as illustrated in the drawing. However, since the sampling of the four capacitors (capacitive elements 332, 531, 532 and 533) each serving as a charge transfer destination can be realized on the order of several microseconds (μs), a difference in exposure time between the pixels does not become too large.

Figure 32:
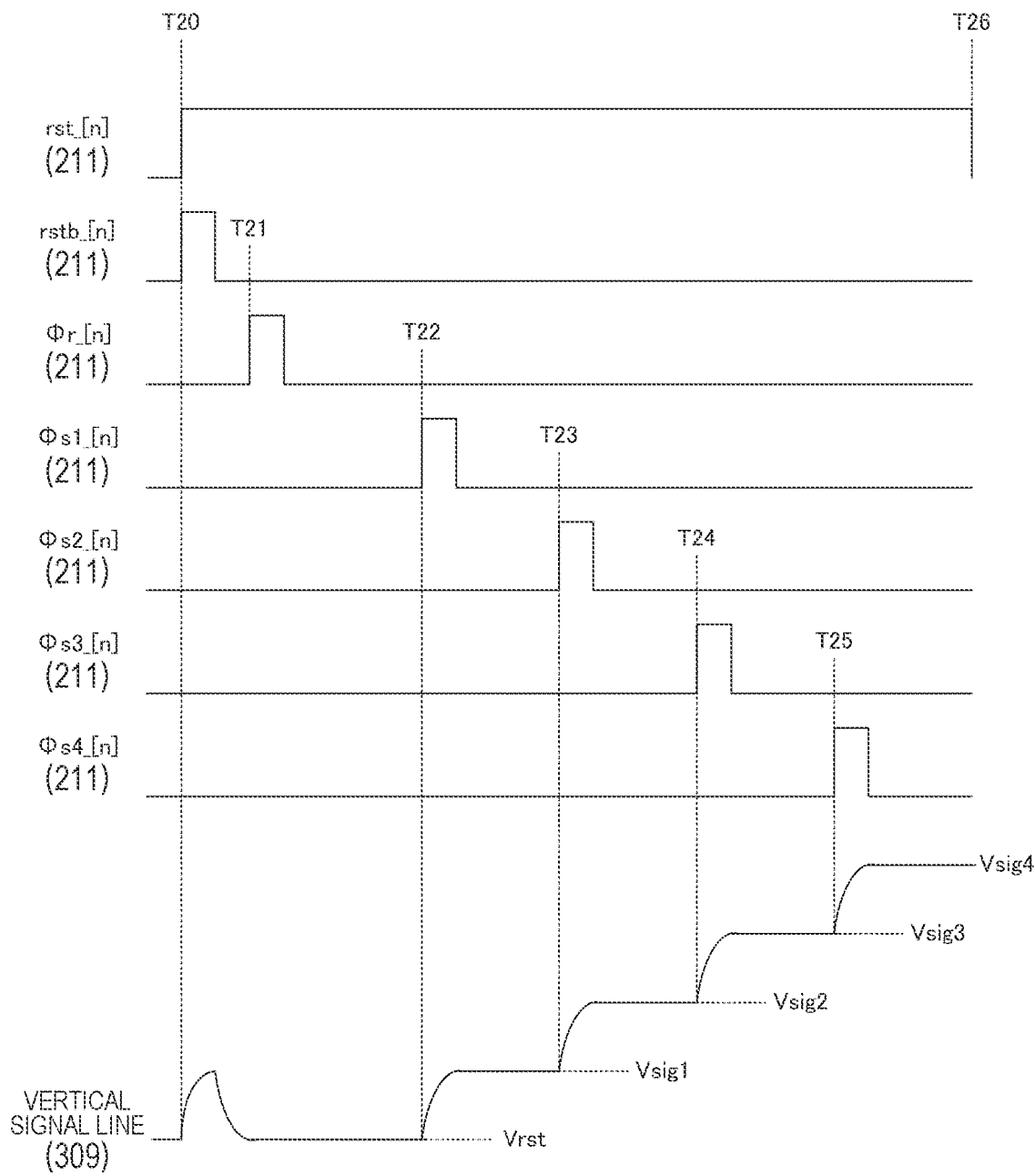
FIG. 32 is a timing chart depicting an example of a read operation of a reset level and a signal level in the fifth embodiment of the present technology.

FIG. 32 is a timing chart depicting an example of a read operation of the reset level and the signal level in the fifth embodiment of the present technology.

During a period from timing T20 to timing T26 during which the n-th row is read, the vertical scanning circuit 211 sets the FD reset signal rst to the high level.

Furthermore, at timing T20, the vertical scanning circuit 211 supplies the high-level post-stage reset signal rstb to the n-th row over the pulse period. Then, at timing T21 immediately after timing T20, the vertical scanning circuit 211 supplies the high-level selection signal Φr to the n-th row over the pulse period. Immediately after this control, the reset level commonly used for the four pixels is read through the vertical signal line 309.

Then, at timing T22 after the reset level is read, the vertical scanning circuit 211 supplies the high-level selection signal Φs1 to the n-th row over the pulse period. Immediately after this control, the signal level Vsig1 of the first pixel is read through the vertical signal line 309. The column signal processing circuit 260 obtains a difference between the reset level Vrst and the signal level Vsig1 as a net signal level of the first pixel by the CDS processing.

Then, at timing T23 after the signal level Vsig1 is read, the vertical scanning circuit 211 supplies the high-level selection signal Φs2 to the n-th row over the pulse period. Immediately after this control, Vsig2 is read through the vertical signal line 309. This Vsig2 corresponds to the sum of the signal levels of the first and second pixels. The column signal processing circuit 260 obtains a difference between Vsig1 and Vsig2 as a signal level of the second pixel after the CDS processing.

Then, at timing T24 after Vsig2 is read, the vertical scanning circuit 211 supplies the high-level selection signal Φs3 to the n-th row over the pulse period. Immediately after this control, Vsig3 is read through the vertical signal line 309. This Vsig3 corresponds to the sum of the signal levels of the first to third pixels. The column signal processing circuit 260 obtains a difference between Vsig2 and Vsig3 as a signal level of the third pixel after the CDS processing.

Then, at timing T25 after Vsig3 is read, the vertical scanning circuit 211 supplies the high-level selection signal Φs4 to the n-th row over the pulse period. Immediately after this control, Vsig 4 is read through the vertical signal line 309. This Vsig4 corresponds to the sum of the signal levels of the first to fourth pixels. The column signal processing circuit 260 obtains a difference between Vsig 3 and Vsig 4 as a signal level of the fourth pixel after the CDS processing.

Note that the third modification example of the second embodiment can also be applied to the fifth embodiment.

As described above, in the fifth embodiment of the present technology, since the capacitive element 331 that holds the reset level is shared by the four pixels, pixel miniaturization is facilitated as compared with a case where the capacitive element is not shared.

6. Sixth Embodiment

In the first embodiment described above, the potentials of the high-impedance nodes 353 and 354 are lowered by means of the control of the pre-stage selection transistor 317, but the potentials of these nodes can also be lowered by means of control of a voltage of a reference signal line. The solid-state imaging element 200 of the sixth embodiment is different from that of the first embodiment in that the voltage of the reference signal line is controlled.

Figure 33:
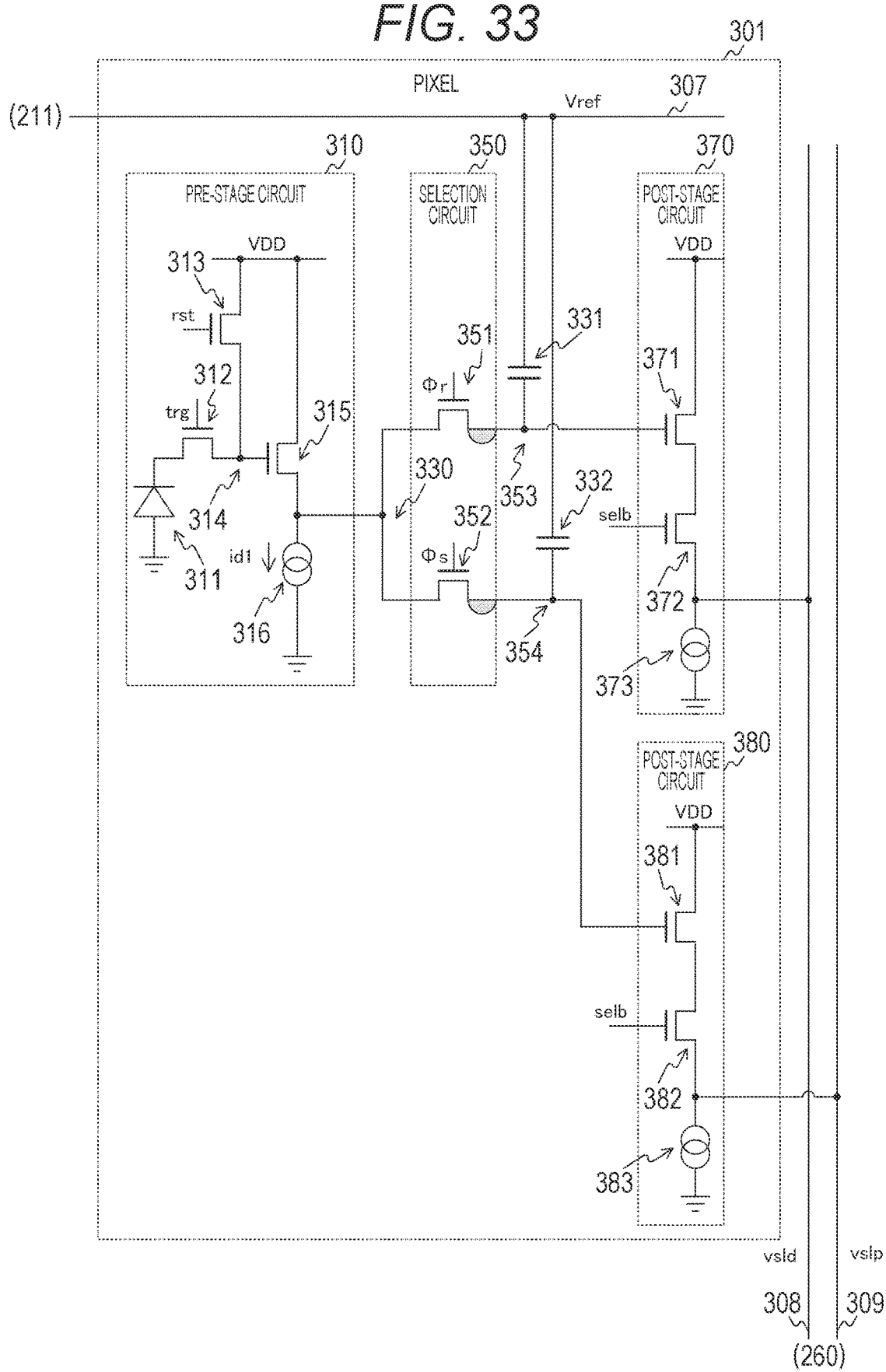
FIG. 33 is a circuit diagram depicting a configuration example of a pixel in a sixth embodiment of the present technology.

FIG. 33 is a circuit diagram depicting a configuration example of the pixel 301 in the sixth embodiment of the present technology. The pixel 301 of the sixth embodiment is different from that of the first embodiment in that neither the pre-stage selection transistor 317 nor the post-stage reset transistor 361 is arranged, and a post-stage circuit 380 is further arranged.

A connection node between the pre-stage amplification transistor 315 and the current source transistor 316 is the pre-stage node 330. The selection transistor 351 opens and closes a path between the pre-stage node 330 and one end of the capacitive element 331, and the selection transistor 352 opens and closes a path between the pre-stage node 330 and one end of the capacitive element 332. Furthermore, the capacitive elements 331 and 332 have their respective other ends commonly connected to a reference signal line 307. The reference signal line 307 is wired in the horizontal direction for each row. The vertical scanning circuit 211 can control a reference voltage Vref that is a voltage of the reference signal line 307 for each row.

Furthermore, the post-stage circuit 370 further includes a load MOS transistor 373 connected to the post-stage selection transistor 372. The post-stage amplification transistor 371 has a gate connected to the node 353 between the selection transistor 351 and the capacitive element 331. The post-stage selection transistor 372 supplies a potential vsld to the column signal processing circuit 260 through a vertical signal line 308.

Furthermore, the post-stage circuit 380 includes a post-stage amplification transistor 381, a post-stage selection transistor 382, and a load MOS transistor 383. The configuration of the post-stage circuit 380 is similar to that of the post-stage circuit 370. The post-stage amplification transistor 381, however, has a gate connected to the node 354 between the selection transistor 352 and the capacitive element 332. Furthermore, the post-stage selection transistor 382 supplies a potential vslp to the column signal processing circuit 260 through the vertical signal line 309.

In the sixth embodiment, two ADCs are arranged for each column in the column signal processing circuit 260, and are connected to the vertical signal lines 308 and 309 of the corresponding column.

In the circuit configuration in the drawing, the node 353 between the selection transistor 351 and the capacitive element 331 is in a high-impedance state while the capacitive element 331 holds the level. Furthermore, the node 354 between the selection transistor 352 and the capacitive element 332 is also in a high-impedance state. A gray semicircle in the drawing indicates a node that becomes high impedance during hold. The higher the potentials of these nodes 353 and 354, the more likely that leakage current will occur at a pn junction between these nodes and the semiconductor substrate.

Therefore, in order to suppress the occurrence of leakage current, the vertical scanning circuit 211 lowers the reference voltage Vref from the high level to the low level when the reset level and the signal level are held. In response to the decrease in the reference voltage Vref, the potentials of the nodes 353 and 354 also shift to the lower level. It is therefore possible to suppress the occurrence of leakage current.

Figure 34:
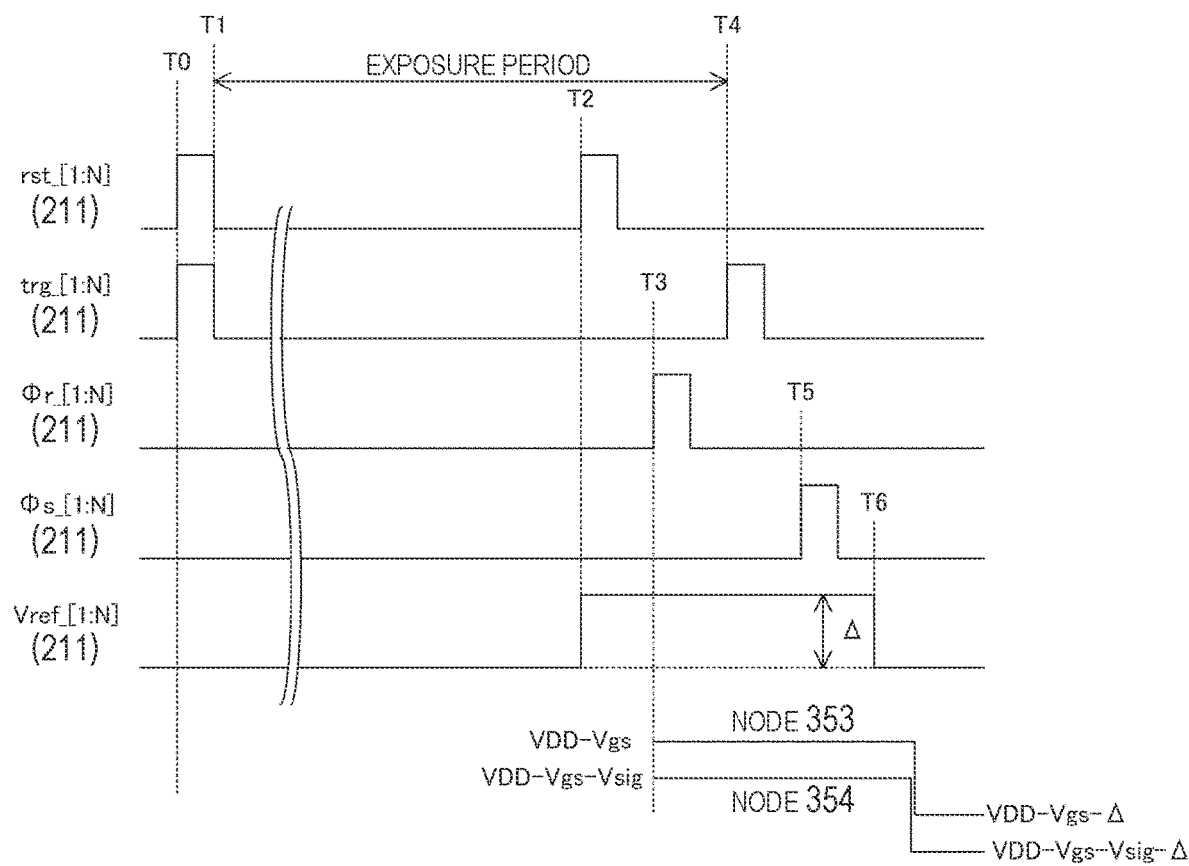
FIG. 34 is a timing chart depicting an example of a global shutter operation in the sixth embodiment of the present technology.

FIG. 34 is a timing chart depicting an example of a global shutter operation in the sixth embodiment of the present technology.

The vertical scanning circuit 211 supplies the high-level FD reset signal rst and the high-level transfer signal trg to all the rows over a period from timing T0 to timing T1 after the pulse period elapses. Therefore, the exposure simultaneously starts in all the rows. At timing T2 immediately before the end of the exposure period, the vertical scanning circuit 211 supplies the high-level FD reset signal rst to all the rows over the pulse period.

The vertical scanning circuit 211 supplies the high-level selection signal Φr to all the rows over the pulse period from timing T3 after timing T2. The vertical scanning circuit 211 supplies the high-level transfer signal trg to all the rows over the pulse period from timing T4 of the end of the exposure. Then, the vertical scanning circuit 211 supplies the high-level selection signal Φs to all the rows over the pulse period from subsequent timing T5.

Furthermore, the vertical scanning circuit 211 changes the reference voltage Vref of all the rows from the low level to the high level at timing T2. In the drawing, Vref_[n] indicates a reference voltage of the n-th row. Then, the vertical scanning circuit 211 changes the reference voltage Vref of all the rows from the high level to the low level at timing T6 after timing T5. A difference between the high level and the low level of the reference voltage Vref is denoted as A.

As described above, the vertical scanning circuit 211 sets the reference voltage Vref to the high level during the signal sampling period (period from timing T2 to timing T6), and shifts the reference voltage Vref to the low level when the sampling period elapses. By this control, immediately after timing T6, the high-impedance node 353 on the reset side of all the rows decreases from VDD−Vgs to VDD−Vgs−A. Furthermore, the high-impedance node 354 on the signal side of all the rows decreases from VDD−Vgs−Vsig to VDD−Vgs−Vsig−A.

If the reference signal line 307 is not wired, and the capacitive elements 331 and 332 have their respective one ends kept at the low level, the potentials of the nodes 353 and 354 remain at VDD−Vgs and VDD−Vgs−Vsig even after the sampling period elapses. In this case, when the potentials (particularly, VDD−Vgs) of these nodes are high, there is a possibility that leakage current occurs at the pn junction.

Therefore, the vertical scanning circuit 211 lowers the reference voltage Vref when the sampling period elapses. It is therefore possible to lower the potentials of the nodes 353 and 354 to suppress the occurrence of leakage current.

Figure 35:
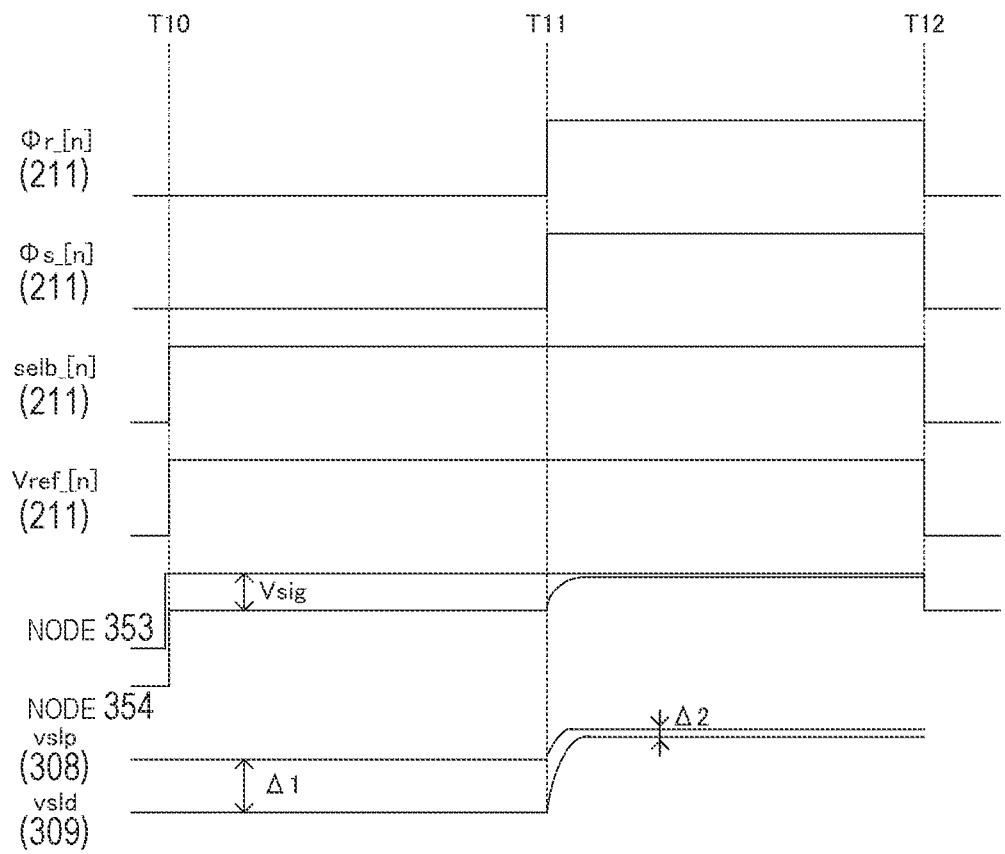
FIG. 35 is a timing chart depicting an example of a read operation of the pixel in the sixth embodiment of the present technology.

FIG. 35 is a timing chart depicting an example of a read operation of the pixel 301 in the sixth embodiment of the present technology. At timing T10 at the start of the reading of the n-th row, the vertical scanning circuit 211 sets the post-stage selection signal selb of the n-th row to the high level. Furthermore, at timing T11 in the read period, the vertical scanning circuit 211 sets the selection signals Φr and Φs of the n-th row to the high level. Then, at timing T12 at the end of the reading, the vertical scanning circuit 211 returns the selection signals Φr and Φs and the post-stage selection signal selb of the n-th row to the low level.

Furthermore, if the reference voltage Vref remains at the low level during the read period (period from timing T10 to timing T12), the potentials of the nodes 353 and 354 decrease, and the potentials vslp and vsld that are read through the vertical signal lines 308 and 309 also decrease. In this case, there is a possibility that the operating point and range of the post-stage circuit cannot be sufficiently secured. Therefore, the vertical scanning circuit 211 returns the reference voltage Vref to the high level during the read period.

A difference between the potentials vslp and vsld becomes Δ1 during a period from timing T10 to timing T11, and the difference between the potentials vslp and vsld becomes Δ2 during a period from timing T11 to timing T12. The post-stage circuit (such as the column signal processing circuit 260) calculates a difference between Δ1 and Δ2 as a net signal level Vsig.

In the sixth embodiment, as illustrated in the drawing, since the control timing of the reference voltage Vref at the time of the reading is different for each row, it is necessary to wire the reference signal line 307 for each row.

As described above, according to the sixth embodiment of the present technology, since the vertical scanning circuit 211 lowers the potential of the high-impedance node by means of the control of the reference voltage Vref, it is possible to eliminate the need of the pre-stage selection transistor 317.

7. Seventh Embodiment

In the first embodiment described above, the potentials of the high-impedance nodes 353 and 354 are lowered by means of the control of the pre-stage selection transistor 317, but the potentials of these nodes can also be lowered by means of control of the voltage of the reference signal line. The solid-state imaging element 200 of the seventh embodiment is different from that of the first embodiment in that the voltage of the reference signal line is controlled.

Figure 36:
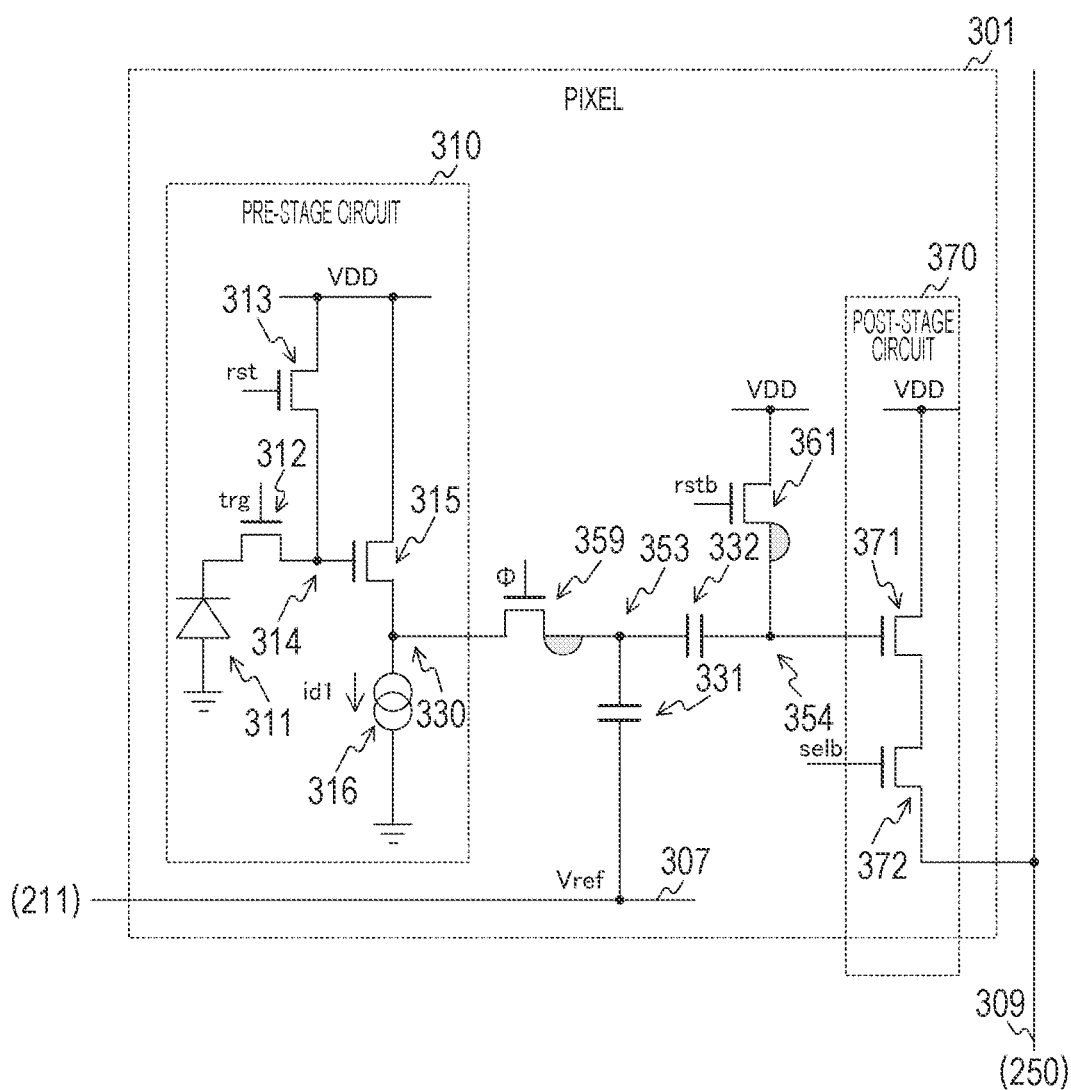
FIG. 36 is a circuit diagram depicting a configuration example of a pixel in a seventh embodiment of the present technology.

FIG. 36 is a circuit diagram depicting a configuration example of the pixel 301 in the seventh embodiment of the present technology. The pixel 301 of the seventh embodiment is different from that of the first embodiment in that the pre-stage selection transistor 317 is not arranged, and a selection transistor 359 is arranged instead of the selection transistors 351 and 352.

A connection node between the pre-stage amplification transistor 315 and the current source transistor 316 is the pre-stage node 330. The selection transistor 359 opens and closes a path between the pre-stage node 330 and the node 353 in accordance with a selection signal Φ.

The capacitive element 331 is inserted between the node 353 and the reference signal line 307, and the capacitive element 332 is inserted between the node 353 and the node 354. The reference signal line 307 is wired in the horizontal direction for each row. Furthermore, the post-stage reset transistor 361 initializes the potential of the node 354 with the power supply voltage VDD.

The nodes 353 and 354 are in a high-impedance state during hold. A gray semicircle in the drawing indicates a node that becomes high impedance during hold. The higher the potentials of these nodes 353 and 354, the more likely that leakage current will occur at a pn junction between these nodes and the semiconductor substrate.

Therefore, in order to suppress the occurrence of leakage current, the vertical scanning circuit 211 lowers the reference voltage Vref from the high level to the low level when the reset level and the signal level are held. In response to the decrease in the reference voltage Vref, the potentials of the nodes 353 and 354 also shift to the lower level. It is therefore possible to suppress the occurrence of leakage current.

Figure 37:
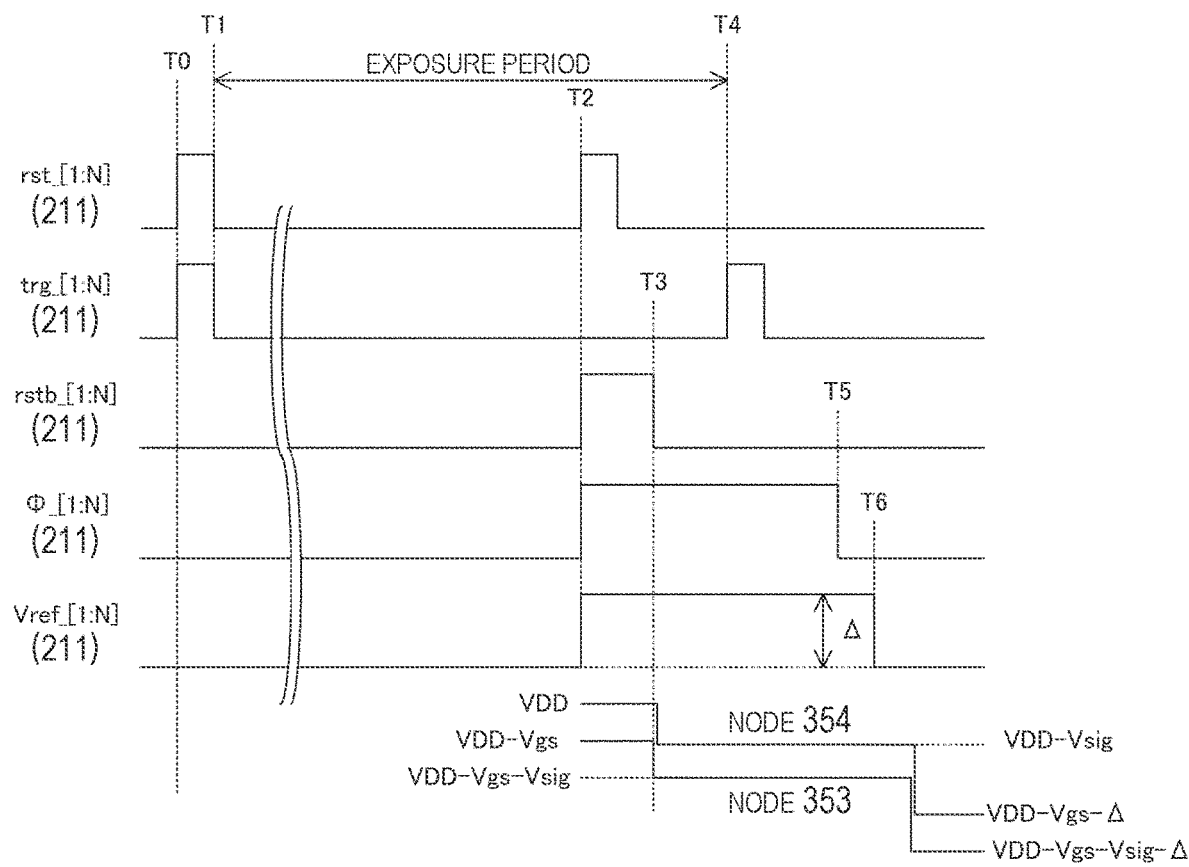
FIG. 37 is a timing chart depicting an example of a global shutter operation in the seventh embodiment of the present technology.

FIG. 37 is a timing chart depicting an example of a global shutter operation in the seventh embodiment of the present technology.

The vertical scanning circuit 211 supplies the high-level FD reset signal rst and the high-level transfer signal trg to all the rows over a period from timing T0 to timing T1 after the pulse period elapses. Therefore, the exposure simultaneously starts in all the rows. At timing T2 immediately before the end of the exposure period, the vertical scanning circuit 211 supplies the high-level FD reset signal rst to all the rows over the pulse period.

Furthermore, the vertical scanning circuit 211 supplies the high-level post-stage reset signal rstb to all the rows over a period from timing T2 to timing T3. The vertical scanning circuit 211 supplies the high-level transfer signal trg to all the rows over the pulse period from timing T4 of the end of the exposure.

Furthermore, the vertical scanning circuit 211 supplies the high-level selection signal Φ to all the rows during a period from timing T2 to timing T5 after timing T4.

By the above-described control, the potentials of the nodes 354 and 353 shift from VDD and VDD−Vgs to VDD−Vsig and VDD−Vgs−Vsig, respectively, at timing T3.

Furthermore, the vertical scanning circuit 211 changes the reference voltage Vref of all the rows from the low level to the high level at timing T2. Then, the vertical scanning circuit 211 changes the reference voltage Vref of all the rows from the high level to the low level at timing T6 after timing T5. A difference between the high level and the low level of the reference voltage Vref is denoted as A.

As described above, the vertical scanning circuit 211 sets the reference voltage Vref to the high level during the signal sampling period (period from timing T2 to timing T6), and shifts the reference voltage Vref to the low level when the sampling period elapses. By this control, immediately after timing T6, the potentials of the nodes 354 and 353 decrease from VDD−Vsig and VDD−Vgs−Vsig to VDD−Vsig−A and VDD−Vgs−Vsig−A, respectively.

If the reference signal line 307 is not wired, and the capacitive element 331 has one end kept at the low level, the potentials of the nodes 354 and 353 remain at VDD−Vsig and VDD−Vgs−Vsig even after the sampling period elapses. In this case, when the potentials (particularly, VDD−Vgs) of these nodes are high, there is a possibility that leakage current occurs at the pn junction.

Therefore, the vertical scanning circuit 211 lowers the reference voltage Vref when the sampling period elapses. It is therefore possible to lower the potentials of the nodes 354 and 353 to suppress the occurrence of leakage current.

Figure 38:
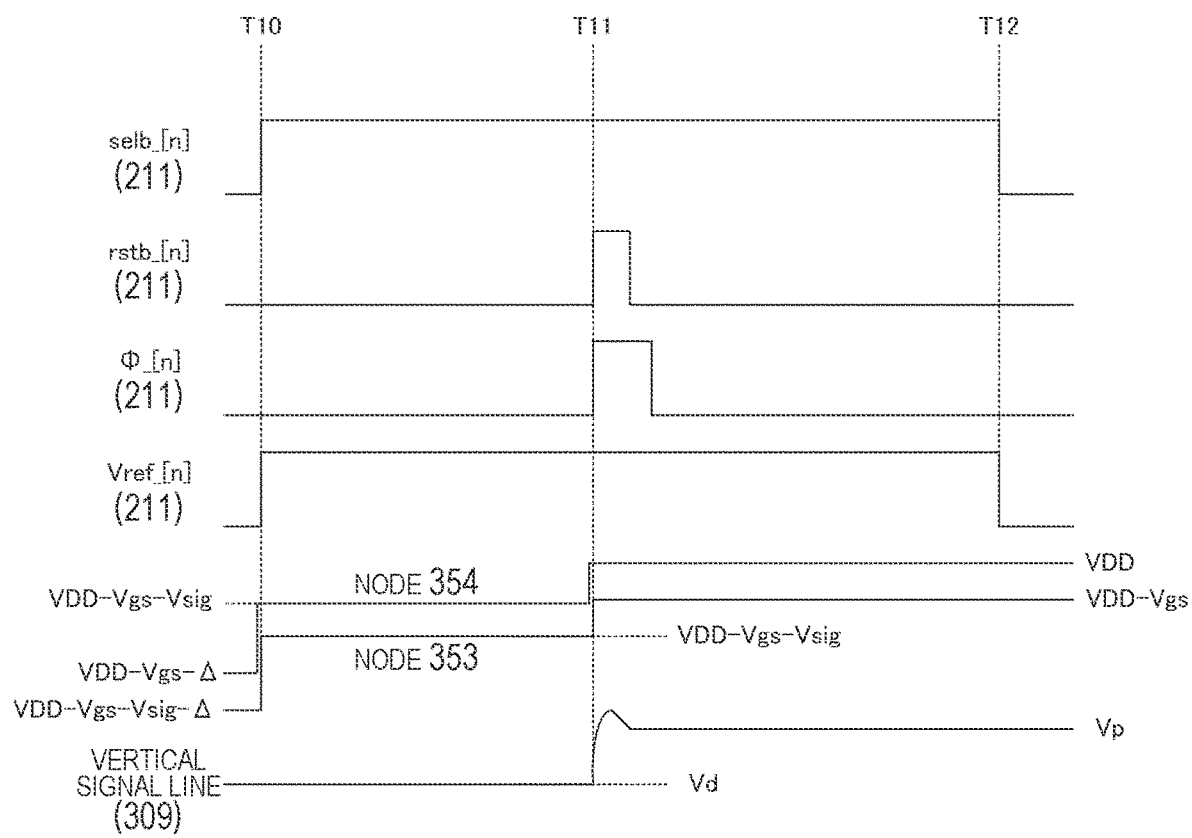
FIG. 38 is a timing chart depicting an example of a read operation of the pixel in the seventh embodiment of the present technology.

FIG. 38 is a timing chart depicting an example of a read operation of the pixel 301 in the seventh embodiment of the present technology. At timing T10 at the start of the reading of the n-th row, the vertical scanning circuit 211 sets the post-stage selection signal selb of the n-th row to the high level. Furthermore, the vertical scanning circuit 211 supplies the high-level post-stage reset signal rstb to the n-th row over the pulse period from timing T11 in the read period. Furthermore, the vertical scanning circuit 211 supplies the high-level selection signal 4 to the n-th row over a certain period from timing T11. Then, at timing T12 at the end of the reading, the vertical scanning circuit 211 returns the post-stage selection signal selb of the n-th row to the low level.

Furthermore, if the reference voltage Vref remains at the low level during the read period (period from timing T10 to timing T12), the potentials of the nodes 353 and 354 decrease, and the potential of the vertical signal line 309 also decreases. In this case, there is a possibility that the operating point and range of the post-stage circuit cannot be sufficiently secured. Therefore, the vertical scanning circuit 211 returns the reference voltage Vref to the high level during the read period.

At timing T11, the potential of the vertical signal line shifts from Vd to Vp. The post-stage circuit (such as the column signal processing circuit 260) calculates a difference between Vd and Vp as a net signal level.

As described above, according to the seventh embodiment of the present technology, since the vertical scanning circuit 211 lowers the potential of the high-impedance node by means of the control of the reference voltage Vref, it is possible to eliminate the need of the pre-stage selection transistor 317.

8. Eighth Embodiment

In the first embodiment described above, the potentials of the high-impedance nodes 353 and 354 are lowered by means of the control of the pre-stage selection transistor 317, but the potentials of these nodes can also be lowered by means of control of the voltage of the reference signal line. The solid-state imaging element 200 of the eighth embodiment is different from that of the first embodiment in that the voltage of the reference signal line is controlled.

Figure 39:
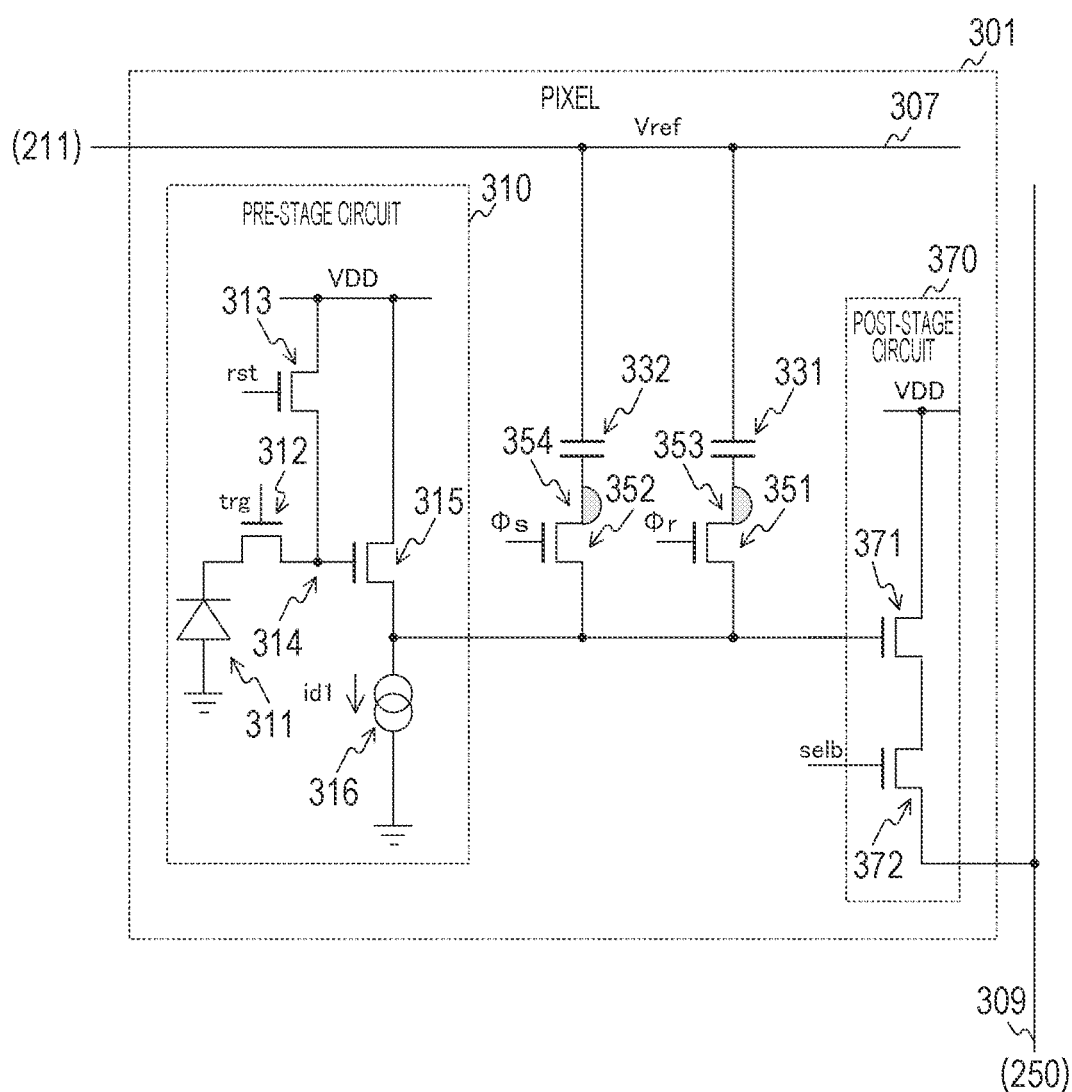
FIG. 39 is a circuit diagram depicting a configuration example of a pixel in an eighth embodiment of the present technology.

FIG. 39 is a circuit diagram depicting a configuration example of the pixel 301 in the eighth embodiment of the present technology. The pixel 301 of the eighth embodiment is different from that of the first embodiment in that the pre-stage selection transistor 317 is not arranged.

Furthermore, in the eighth embodiment, the post-stage circuit 370 is connected to the connection node between the pre-stage amplification transistor 315 and the current source transistor 316. The selection transistor 351 opens and closes a path between the connection node and one end of the capacitive element 331, and the selection transistor 352 opens and closes a path between the connection node and one end of the capacitive element 332. The capacitive elements 331 and 332 have their respective other ends commonly connected to the reference signal line 307. The reference signal line 307 is wired in the horizontal direction for each row.

In the circuit configuration in the drawing, the node 353 between the selection transistor 351 and the capacitive element 331, and the node 354 between the selection transistor 352 and the capacitive element 332 are in a high-impedance state during hold. A gray semicircle in the drawing indicates a node that becomes high impedance during hold. The higher the potentials of these nodes 353 and 354, the more likely that leakage current will occur at a pn junction between these nodes and the semiconductor substrate.

Therefore, in order to suppress the occurrence of leakage current, the vertical scanning circuit 211 lowers the reference voltage Vref from the high level to the low level when the reset level and the signal level are held. In response to the decrease in the reference voltage Vref, the potentials of the nodes 353 and 354 also shift to the lower level. It is therefore possible to suppress the occurrence of leakage current.

The global shutter operation of the eighth embodiment is similar to the operation of the sixth embodiment illustrated in FIG. 34.

Figure 40:
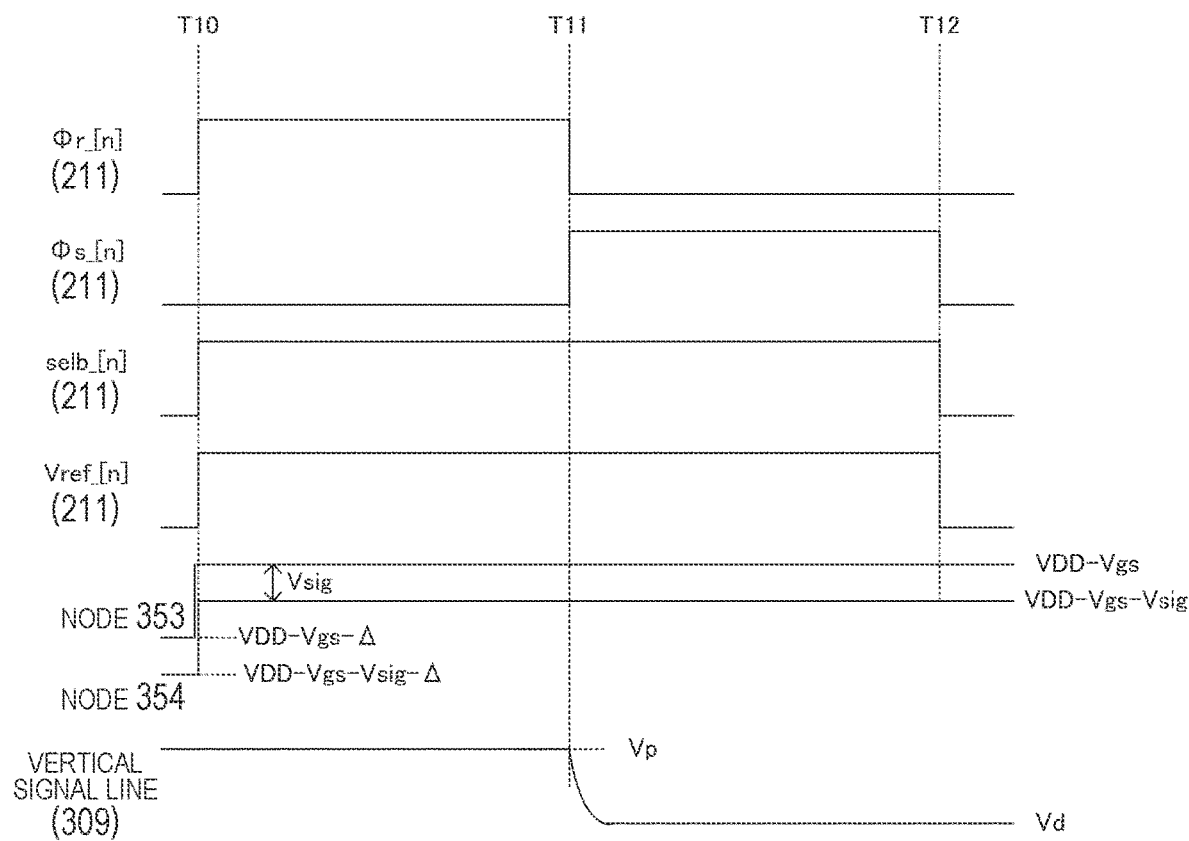
FIG. 40 is a timing chart depicting an example of a read operation of the pixel in the eighth embodiment of the present technology.

FIG. 40 is a timing chart depicting an example of a read operation of the pixel 301 in the eighth embodiment of the present technology. At timing T10 at the start of the reading of the n-th row, the vertical scanning circuit 211 sets the selection signal Φr and the post-stage selection signal selb of the n-th row to the high level. Furthermore, at timing T11 in the read period, the vertical scanning circuit 211 sets the selection signal Φr of the n-th row to the low level and sets the selection signal Φs of the row to the high level. At timing T12 at the end of the reading of the n-th row, the vertical scanning circuit 211 returns the selection signal Φs and the post-stage selection signal selb of the n-th row to the low level.

Furthermore, if the reference voltage Vref remains at the low level during the read period (period from timing T10 to timing T12), the potentials of the nodes 353 and 354 decrease, and the potentials vslp and vsld that are read through the vertical signal lines 308 and 309 also decrease. In this case, there is a possibility that the operating point and range of the post-stage circuit cannot be sufficiently secured. Therefore, the vertical scanning circuit 211 returns the reference voltage Vref to the high level during the read period.

As described above, according to the eighth embodiment of the present technology, since the vertical scanning circuit 211 lowers the potential of the high-impedance node by means of the control of the reference voltage Vref, it is possible to eliminate the need of the pre-stage selection transistor 317.

9. Application Example to Mobile Body

The technology according to an embodiment of the present disclosure (the present technology) is applicable to various products. For example, the technology according to an embodiment of the present disclosure may be implemented as a device mounted on any type of mobile body such as an automobile, an electric vehicle, a hybrid electric vehicle, a motorcycle, a bicycle, a personal mobility, an airplane, a drone, a ship, or a robot.

Figure 41:
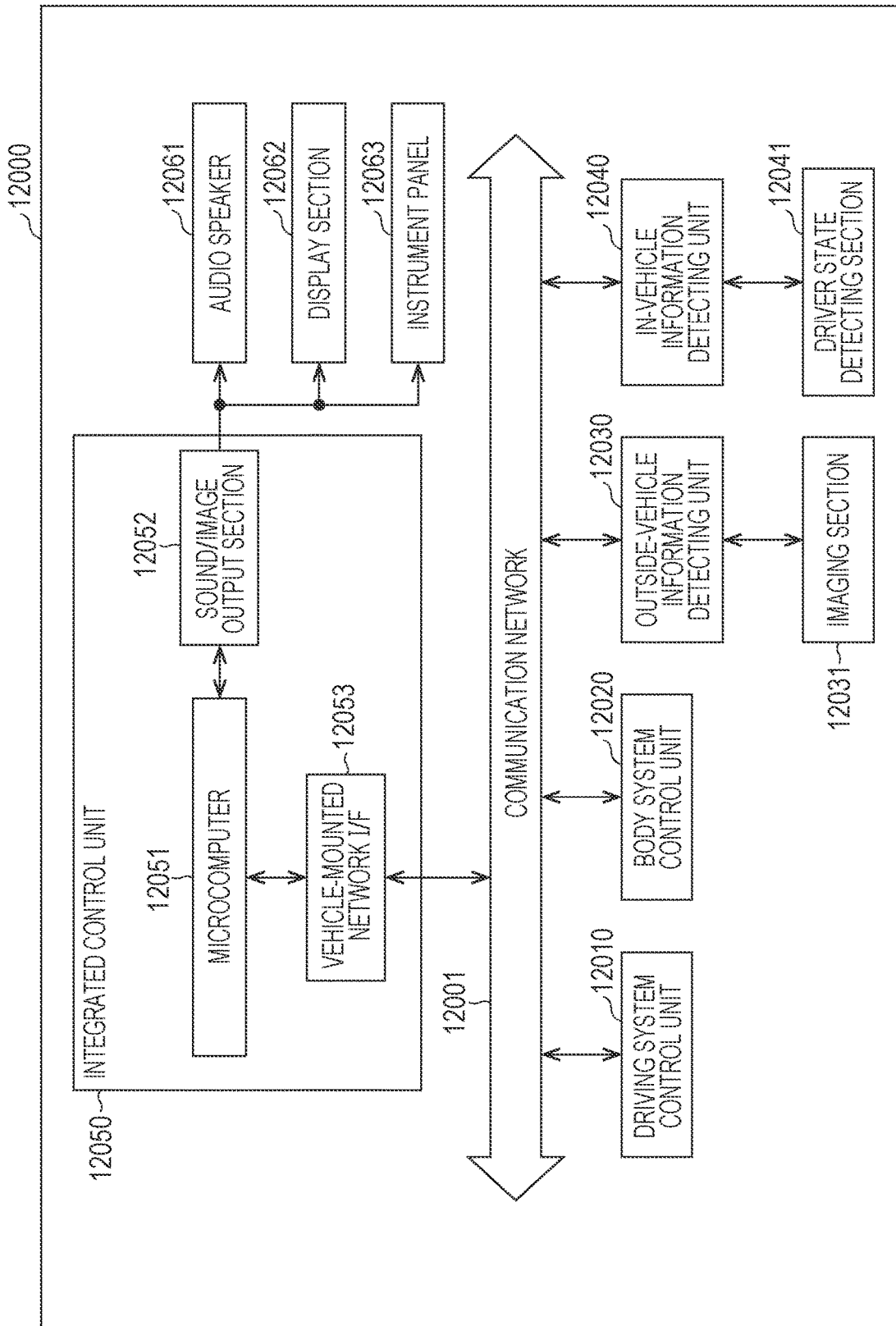
FIG. 41 is a block diagram depicting a schematic configuration example of a vehicle control system.

FIG. 41 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 29, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as functional components of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information about the outside of the vehicle, which is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 41, an audio speaker 12061, a display section 12062, and an instrument panel 12063 are illustrated as the output device. The display section 12062 may, for example, include at least one of an on-board display and a head-up display.

Figure 42:
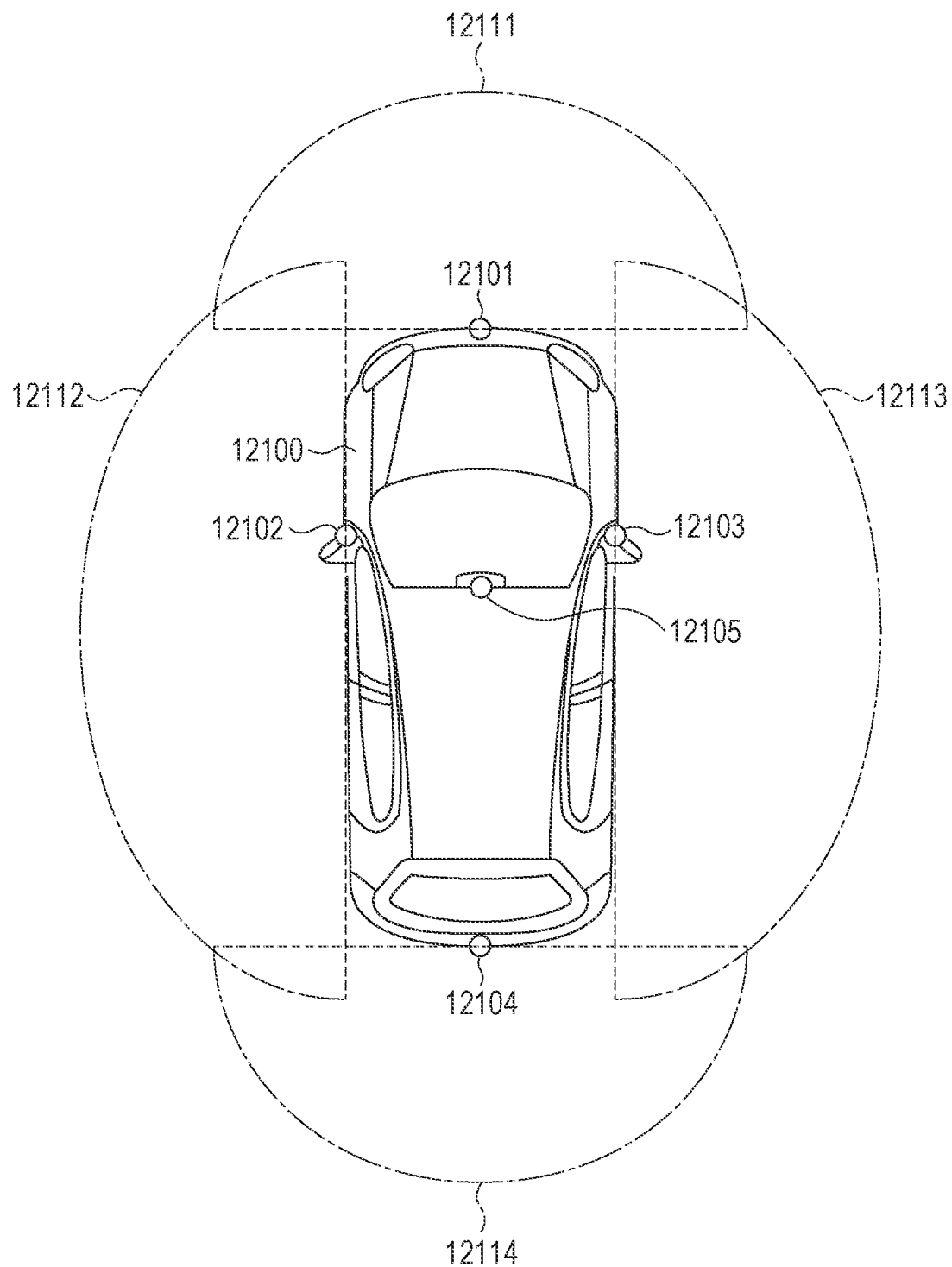
FIG. 42 is an explanatory diagram depicting an example of an installation position of an imaging section.

FIG. 42 is a diagram depicting an example of the installation position of the imaging section 12031.

In FIG. 42, the imaging section 12031 includes imaging sections 12101, 12102, 12103, 12104, and 12105.

The imaging sections 12101, 12102, 12103, 12104, and 12105 are, for example, provided at positions on a front nose, sideview mirrors, a rear bumper, and a back door of the vehicle 12100, and on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 42 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to an embodiment of the present disclosure can be applied has been described above. The technology according to an embodiment of the present disclosure can be applied to the imaging section 12031 among the configurations described above. Specifically, for example, the imaging device 100 in FIG. 1 can be applied to the imaging section 12031. By applying the technology according to an embodiment of the present disclosure to the imaging section 12031, noise can be reduced, and a more easily viewable captured image can be obtained, so that driver's fatigue can be reduced.

Note that, the above embodiments show examples for embodying the present technology, and matters in the embodiments and matters specifying the invention in claims have correspondence relationships. Similarly, the matters specifying the invention in the claims and matters having the same names in the embodiments of the present technology have correspondence relationships. However, the present technology is not limited to the embodiments and can be embodied by making various modifications to the embodiments without departing from the gist thereof.

Note that effects described in the present description are merely examples and are not limited, and other effects may be provided.

Note that the present technology may also have a following configuration.

(1) A solid-state imaging element including:
a predetermined number of capacitive elements;

a pre-stage circuit that generates a predetermined reset level and a signal level corresponding to an exposure amount and causes each of the capacitive elements to hold a corresponding one of the reset level and the signal level;
a selection circuit in which a selection transistor that opens and closes a path between one end of each of the capacitive elements and a predetermined node is arranged;
a post-stage circuit that sequentially reads the reset level and the signal level via the node; and a vertical scanning circuit that performs control to lower a potential of the one end when the reset level and the signal level are held.

(2) The solid-state imaging element described in (1), in which the node is a post-stage node that is a connection point between the selection circuit and the post-stage circuit,
the capacitive elements include first and second capacitive elements,
the selection circuit includes
a first selection transistor that opens and closes a path between one end of the first capacitive element and the post-stage node, and
a second selection transistor that opens and closes a path between one end of the second capacitive element and the post-stage node, the first and second capacitive elements having their respective another ends commonly connected to a predetermined pre-stage node,
the pre-stage circuit includes a pre-stage selection transistor that outputs each of the reset level and the signal level to the pre-stage node in accordance with a predetermined pre-stage selection signal input to a gate, and
the vertical scanning circuit lowers a voltage of the pre-stage selection signal when the reset level and the signal level are held.

(3) The individual imaging element described in (1), in which the node is a pre-stage node that is a connection point between the pre-stage circuit and the selection circuit,
the predetermined number of capacitive elements include first and second capacitive elements,
the selection circuit includes
a first selection transistor that opens and closes a path between one end of the first capacitive element and the pre-stage node, and
a second selection transistor that opens and closes a path between one end of the second capacitive element and the pre-stage node, and
the vertical scanning circuit lowers a reference voltage of a signal line to which their respective another ends of the first and second capacitive elements are commonly connected when the reset level and the signal level are held.

(4) The solid-state imaging element described in (1), in which the node is a pre-stage node that is a connection point between the pre-stage circuit and the selection transistor,
the predetermined number of capacitive elements include a first capacitive element inserted between the selection transistor and a predetermined signal line and a second capacitive element inserted between the selection transistor and the post-stage circuit, and
the vertical scanning circuit lowers a reference voltage of the signal line when the reset level and the signal level are held.

(5) The solid-state imaging element described in (1), in which the node is a connection node between the pre-stage circuit and the post-stage circuit,
the predetermined number of capacitive elements include first and second capacitive elements,
the selection circuit includes
a first selection transistor that opens and closes a path between one end of the first capacitive element and the connection node, and
a second selection transistor that opens and closes a path between one end of the second capacitive element and the connection node, and
the vertical scanning circuit lowers a reference voltage of a signal line to which their respective another ends of the first and second capacitive elements are commonly connected when the reset level and the signal level are held.

(6) The solid-state imaging element described in (1), further including a post-stage reset transistor,
in which the node is a post-stage node that is a connection point between the selection circuit and the post-stage circuit,
the pre-stage circuit is arranged in a pre-stage circuit block that generates each of the reset level and a plurality of the signal levels corresponding to the exposure amount and causes each of the capacitive elements to hold a corresponding one of the reset level and the plurality of signal levels,
the selection circuit is arranged in a selection unit that sequentially performs control to connect a capacitive element in which the reset level is held among the predetermined number of capacitive elements to a predetermined post-stage node, control to disconnect the predetermined number of capacitive elements from the post-stage node, and control to connect a capacitive element in which one of the plurality of signal levels is held among the predetermined number of capacitive elements to the post-stage node, and
the post-stage reset transistor initializes a level of the post-stage node when the predetermined number of capacitive elements are disconnected from the post-stage node.

(7) The solid-state imaging element described in (6), in which the predetermined number of capacitive elements include first and second capacitive elements and third and fourth capacitive elements,
the pre-stage circuit block includes
a first pre-stage circuit that sequentially generates a first reset level and a first signal level and causes the first and second capacitive elements to hold the first reset level and the first signal level, and
a second pre-stage circuit that sequentially generates a second reset level and a second signal level and causes the third and fourth capacitive elements to hold the second reset level and the second signal level, and
the selection unit includes
a first selection circuit that connects one of the first and second capacitive elements to the post-stage node, and
a second selection circuit that connects one of the third and fourth capacitive elements to the post-stage node.

(8) The solid-state imaging element described in (7), in which
the first pre-stage circuit includes
a first photoelectric conversion element,
a first pre-stage transfer transistor that transfers charges from the first photoelectric conversion element to a first floating diffusion layer,
a first reset transistor that initializes the first floating diffusion layer, and
a first pre-stage amplification transistor that amplifies a voltage of the first floating diffusion layer, and
the second pre-stage circuit includes
a second photoelectric conversion element,
a second pre-stage transfer transistor that transfers charges from the second photoelectric conversion element to a second floating diffusion layer,
a second reset transistor that initializes the second floating diffusion layer, and
a second pre-stage amplification transistor that amplifies a voltage of the second floating diffusion layer.

(9) The solid-state imaging element described in (8), in which
the first pre-stage circuit further includes a first current source transistor connected to a first pre-stage node,
the second pre-stage circuit further includes a second current source transistor connected to a second pre-stage node,
the first pre-stage amplification transistor amplifies the voltage of the first floating diffusion layer, and outputs the amplified voltage to the first pre-stage node,
the second pre-stage amplification transistor amplifies the voltage of the second floating diffusion layer, and outputs the amplified voltage to the second pre-stage node,
the first and second capacitive elements have their respective one ends commonly connected to the first pre-stage node, and have their respective another ends connected to the first selection circuit, and
the third and fourth capacitive elements have their respective one ends commonly connected to the second pre-stage node, and have their respective another ends connected to the second selection circuit.

(10) The solid-state imaging element described in (8) or (9), in which
at predetermined exposure start timing, the first and second pre-stage transfer transistors transfer the charges to the first and second floating diffusion layers, and the first and second reset transistors initialize the first and second floating diffusion layers and the first and second photoelectric conversion elements, and
at predetermined exposure end timing, the first and second pre-stage transfer transistors transfer the charges to the first and second floating diffusion layers.

(11) The solid-state imaging element described in any one of (8) to (10), in which
the selection unit sequentially performs control to connect one of the first and second capacitive elements to the post-stage node, control to connect the other of the first and second capacitive elements to the post-stage node, control to connect one of the third and fourth capacitive elements to the post-stage node, and control to connect the other of the third and fourth capacitive elements to the post-stage node.

(12) The solid-state imaging element described in any one of (8) to (11), in which
in a predetermined addition mode, the selection unit sequentially performs control to connect both one of the first and second capacitive elements and one of the third and fourth capacitive elements to the post-stage node and control to connect both the other of the first and second capacitive elements and the other of the third and fourth capacitive elements to the post-stage node.

(13) The solid-state imaging element described in (8), in which
the first pre-stage circuit further includes a first pre-stage selection transistor that outputs a voltage amplified by the first pre-stage amplification transistor to a predetermined pre-stage node in accordance with a predetermined first selection signal,
the second pre-stage circuit further includes
a second pre-stage selection transistor that outputs a voltage amplified by the second pre-stage amplification transistor to the pre-stage node in accordance with a predetermined second selection signal, and
a current source transistor connected to the pre-stage node,
the first and second capacitive elements have their respective one ends commonly connected to the pre-stage node, and have their respective another ends connected to the first selection circuit, and
the third and fourth capacitive elements have their respective one ends commonly connected to the pre-stage node, and have their respective another ends connected to the second selection circuit.

(14) The solid-state imaging element described in (13), in which
the first and second pre-stage selection transistors sequentially shift to a closed state immediately before a predetermined exposure end timing and after the exposure end timing,
the first reset transistor initializes the first floating diffusion layer in a case where the first pre-stage selection transistor is in the closed state,
the second reset transistor initializes the second floating diffusion layer in a case where the second pre-stage selection transistor is in the closed state,
the first and second pre-stage selection transistors sequentially shift to the closed state immediately after the exposure end timing, and
the first and second pre-stage transfer transistors transfer the charges at the predetermined exposure end timing.

(15) The solid-state imaging element described in (6), further including
a short-circuit transistor that opens and closes a path between a first post-stage node and a second post-stage node
in which the predetermined number of capacitors include first, second, third, fourth, fifth, sixth, seventh, and eighth capacitive elements, and
the selection unit includes
a first selection circuit that connects one of the first and second capacitive elements to the first post-stage node,
a second selection circuit that connects one of the third and fourth capacitive elements to the first post-stage node,
a third selection circuit that connects one of the fifth and sixth capacitive elements to the second post-stage node, and
a fourth selection circuit that connects one of the seventh and eighth capacitive elements to the second post-stage node.

(16) The solid-state imaging element described in (15), in which in a predetermined non-addition mode, the short-circuit transistor is in an open state, and in the non-addition mode, the selection unit performs, in a predetermined order, control to sequentially connect each of the first and second capacitive elements to the first post-stage node, control to sequentially connect each of the third and fourth capacitive elements to the first post-stage node, control to sequentially connect each of the fifth and sixth capacitive elements to the second post-stage node, and control to sequentially connect each of the seventh and eighth capacitive elements to the second post-stage node.

(17) The solid-state imaging element described in (15) or (16), in which in a predetermined addition mode, the short-circuit transistor is in a closed state, and in the addition mode, the selection unit sequentially performs control to connect one of the fifth and sixth capacitive elements and one of the seventh and eighth capacitive elements to the second post-stage node while connecting one of the first and second capacitive elements and one of the third and fourth capacitive elements to the first post-stage node, and control to connect the other of the fifth and sixth capacitive elements and the other of the seventh and eighth capacitive elements to the second post-stage node while connecting the other of the first and second capacitive elements and the other of the third and fourth capacitive elements to the first post-stage node.

(18) The solid-state imaging element described in (6), in which the predetermined number of capacitive elements include first and second capacitive elements and a third capacitor, the pre-stage circuit block includes a first photoelectric conversion element, a first pre-stage transfer transistor that transfers charges from the first photoelectric conversion element to a predetermined floating diffusion layer, a second photoelectric conversion element, a second pre-stage transfer transistor that transfers charges from the second photoelectric conversion element to a predetermined floating diffusion layer, a reset transistor that initializes the floating diffusion layer, and a pre-stage amplification transistor that amplifies a voltage of the floating diffusion layer and outputs the amplified voltage to a predetermined pre-stage node, and the first and second capacitive elements and the third capacitive element have their respective one ends commonly connected to the pre-stage node, and have their respective another ends connected to the selection unit.

(19) The solid-state imaging element described in (18), in which at predetermined exposure start timing, the first and second pre-stage transfer transistors transfer the charges to the floating diffusion layer, and the reset transistor initializes the floating diffusion layer and the first and second photoelectric conversion elements, and at predetermined exposure end timing, the first and second pre-stage transfer transistors sequentially transfer the charges to the first and second floating diffusion layers.

(20) The solid-state imaging element described in (18) or (19), in which the selection unit sequentially performs control to connect one of the first and second capacitive elements to the post-stage node, control to connect the other of the first and second capacitive elements to the post-stage node, and control to connect the third capacitive element to the post-stage node.

REFERENCE SIGNS LIST

100 Imaging device
110 Imaging lens
120 Recording unit
130 Imaging control unit
200 Solid-state imaging element
201 Pixel chip
202 Circuit chip
203 Upper pixel chip
204 Lower pixel chip
211 Vertical scanning circuit
212 Timing control circuit
213 DAC
220 Pixel array unit
221 Upper pixel array unit
222 Lower pixel array unit
250 Load MOS circuit block
251, 373, 383 Load MOS transistor
260 Column signal processing circuit
261 ADC
262 Digital signal processing unit
300 Pixel block
301 to 304 Pixel
305 Pre-stage circuit block
310, 320, 410, 420 Pre-stage circuit
311, 321, 411, 421, 511 to 513 Photoelectric conversion element
312, 322, 412, 422, 514 to 516 Transfer transistor
313, 323, 413, 423 FD reset transistor
314, 324, 414, 424 FD
315, 325, 415, 425 Pre-stage amplification transistor
316, 326, 416, 426 Current source transistor
317, 327, 417, 427 Pre-stage selection transistor
331, 332, 336, 337, 431, 432, 436, 437, 531 to 533 Capacitive element
340 Selection unit
350, 355, 450, 455 Selection circuit
351, 352, 356, 357, 359, 451, 452, 456, 457, 551 to 553 Selection transistor
361, 461 Post-stage reset transistor
370, 380, 470 Post-stage circuit
371, 381, 471 Post-stage amplification transistor
372, 382, 472 Post-stage selection transistor
480 Short-circuit transistor
501 Semiconductor substrate
502, 504 $n^+$ region
503 Gate electrode
12031 Imaging section

The invention claimed is:

1. A solid-state imaging element comprising:
a predetermined number of capacitive elements;
a pre-stage circuit that generates a predetermined reset level and a signal level corresponding to an exposure amount and causes each of the capacitive elements to hold a corresponding one of the reset level and the signal level;

a selection circuit in which a selection transistor that opens and closes a path between one end of each of the capacitive elements and a predetermined node is arranged;

a post-stage circuit that sequentially reads the reset level and the signal level via the node; and a vertical scanning circuit that performs control to lower a potential of the one end when the reset level and the signal level are held.

2. The solid-state imaging element according to claim 1, wherein the node is a post-stage node that is a connection point between the selection circuit and the post-stage circuit, the capacitive elements include first and second capacitive elements, the selection circuit includes a first selection transistor that opens and closes a path between one end of the first capacitive element and the post-stage node, and a second selection transistor that opens and closes a path between one end of the second capacitive element and the post-stage node, the first and second capacitive elements having their respective another ends commonly connected to a predetermined pre-stage node, the pre-stage circuit includes a pre-stage selection transistor that outputs each of the reset level and the signal level to the pre-stage node in accordance with a predetermined pre-stage selection signal input to a gate, and the vertical scanning circuit lowers a voltage of the pre-stage selection signal when the reset level and the signal level are held.

3. The individual imaging element according to claim 1, wherein the node is a pre-stage node that is a connection point between the pre-stage circuit and the selection circuit, the predetermined number of capacitive elements include first and second capacitive elements, the selection circuit includes a first selection transistor that opens and closes a path between one end of the first capacitive element and the pre-stage node, and a second selection transistor that opens and closes a path between one end of the second capacitive element and the pre-stage node, and the vertical scanning circuit lowers a reference voltage of a signal line to which their respective another ends of the first and second capacitive elements are commonly connected when the reset level and the signal level are held.

4. The solid-state imaging element according to claim 1, wherein the node is a pre-stage node that is a connection point between the pre-stage circuit and the selection transistor, the predetermined number of capacitive elements include a first capacitive element inserted between the selection transistor and a predetermined signal line and a second capacitive element inserted between the selection transistor and the post-stage circuit, and the vertical scanning circuit lowers a reference voltage of the signal line when the reset level and the signal level are held.

5. The solid-state imaging element according to claim 1, wherein the node is a connection node between the pre-stage circuit and the post-stage circuit, the predetermined number of capacitive elements include first and second capacitive elements, the selection circuit includes a first selection transistor that opens and closes a path between one end of the first capacitive element and the connection node, and a second selection transistor that opens and closes a path between one end of the second capacitive element and the connection node, and the vertical scanning circuit lowers a reference voltage of a signal line to which their respective another ends of the first and second capacitive elements are commonly connected when the reset level and the signal level are held.

6. The solid-state imaging element according to claim 1, further comprising a post-stage reset transistor, wherein the node is a post-stage node that is a connection point between the selection circuit and the post-stage circuit, the pre-stage circuit is arranged in a pre-stage circuit block that generates each of the reset level and a plurality of the signal levels corresponding to the exposure amount and causes each of the capacitive elements to hold a corresponding one of the reset level and the plurality of signal levels, the selection circuit is arranged in a selection unit that sequentially performs control to connect a capacitive element in which the reset level is held among the predetermined number of capacitive elements to a predetermined post-stage node, control to disconnect the predetermined number of capacitive elements from the post-stage node, and control to connect a capacitive element in which one of the plurality of signal levels is held among the predetermined number of capacitive elements to the post-stage node, and the post-stage reset transistor initializes a level of the post-stage node when the predetermined number of capacitive elements are disconnected from the post-stage node.

7. The solid-state imaging element according to claim 6, wherein the predetermined number of capacitive elements include first and second capacitive elements and third and fourth capacitive elements, the pre-stage circuit block includes a first pre-stage circuit that sequentially generates a first reset level and a first signal level and causes the first and second capacitive elements to hold the first reset level and the first signal level, and a second pre-stage circuit that sequentially generates a second reset level and a second signal level and causes the third and fourth capacitive elements to hold the second reset level and the second signal level, and the selection unit includes a first selection circuit that connects one of the first and second capacitive elements to the post-stage node, and a second selection circuit that connects one of the third and fourth capacitive elements to the post-stage node.

8. The solid-state imaging element according to claim 7, wherein the first pre-stage circuit includes a first photoelectric conversion element, a first pre-stage transfer transistor that transfers charges from the first photoelectric conversion element to a first floating diffusion layer,
a first reset transistor that initializes the first floating diffusion layer, and
a first pre-stage amplification transistor that amplifies a voltage of the first floating diffusion layer, and
the second pre-stage circuit includes
a second photoelectric conversion element,
a second pre-stage transfer transistor that transfers charges from the second photoelectric conversion element to a second floating diffusion layer,
a second reset transistor that initializes the second floating diffusion layer, and
a second pre-stage amplification transistor that amplifies a voltage of the second floating diffusion layer.

9. The solid-state imaging element according to claim 8, wherein
the first pre-stage circuit further includes a first current source transistor connected to a first pre-stage node,
the second pre-stage circuit further includes a second current source transistor connected to a second pre-stage node,
the first pre-stage amplification transistor amplifies the voltage of the first floating diffusion layer, and outputs the amplified voltage to the first pre-stage node,
the second pre-stage amplification transistor amplifies the voltage of the second floating diffusion layer, and outputs the amplified voltage to the second pre-stage node,
the first and second capacitive elements have their respective one ends commonly connected to the first pre-stage node, and have their respective another ends connected to the first selection circuit, and
the third and fourth capacitive elements have their respective one ends commonly connected to the second pre-stage node, and have their respective another ends connected to the second selection circuit.

10. The solid-state imaging element according to claim 8, wherein
at predetermined exposure start timing, the first and second pre-stage transfer transistors transfer the charges to the first and second floating diffusion layers, and the first and second reset transistors initialize the first and second floating diffusion layers and the first and second photoelectric conversion elements, and
at predetermined exposure end timing, the first and second pre-stage transfer transistors transfer the charges to the first and second floating diffusion layers.

11. The solid-state imaging element according to claim 8, wherein
the selection unit sequentially performs control to connect one of the first and second capacitive elements to the post-stage node, control to connect the other of the first and second capacitive elements to the post-stage node, control to connect one of the third and fourth capacitive elements to the post-stage node, and control to connect the other of the third and fourth capacitive elements to the post-stage node.

12. The solid-state imaging element according to claim 8, wherein
in a predetermined addition mode, the selection unit sequentially performs control to connect both one of the first and second capacitive elements and one of the third and fourth capacitive elements to the post-stage node and control to connect both the other of the first and second capacitive elements and the other of the third and fourth capacitive elements to the post-stage node.

13. The solid-state imaging element according to claim 8, wherein
the first pre-stage circuit further includes a first pre-stage selection transistor that outputs a voltage amplified by the first pre-stage amplification transistor to a predetermined pre-stage node in accordance with a predetermined first selection signal,
the second pre-stage circuit further includes
a second pre-stage selection transistor that outputs a voltage amplified by the second pre-stage amplification transistor to the pre-stage node in accordance with a predetermined second selection signal, and
a current source transistor connected to the pre-stage node,
the first and second capacitive elements have their respective one ends commonly connected to the pre-stage node, and have their respective another ends connected to the first selection circuit, and
the third and fourth capacitive elements have their respective one ends commonly connected to the pre-stage node, and have their respective another ends connected to the second selection circuit.

14. The solid-state imaging element according to claim 13, wherein
the first and second pre-stage selection transistors sequentially shift to a closed state immediately before a predetermined exposure end timing and after the exposure end timing,
the first reset transistor initializes the first floating diffusion layer in a case where the first pre-stage selection transistor is in the closed state,
the second reset transistor initializes the second floating diffusion layer in a case where the second pre-stage selection transistor is in the closed state,
the first and second pre-stage selection transistors sequentially shift to the closed state immediately after the exposure end timing, and
the first and second pre-stage transfer transistors transfer the charges at the predetermined exposure end timing.

15. The solid-state imaging element according to claim 6, further comprising
a short-circuit transistor that opens and closes a path between a first post-stage node and a second post-stage node,
wherein the predetermined number of capacitors include first, second, third, fourth, fifth, sixth, seventh, and eighth capacitive elements, and
the selection unit includes
a first selection circuit that connects one of the first and second capacitive elements to the first post-stage node,
a second selection circuit that connects one of the third and fourth capacitive elements to the first post-stage node,
a third selection circuit that connects one of the fifth and sixth capacitive elements to the second post-stage node, and
a fourth selection circuit that connects one of the seventh and eighth capacitive elements to the second post-stage node.

16. The solid-state imaging element according to claim 15, wherein
in a predetermined non-addition mode, the short-circuit transistor is in an open state, and in the non-addition mode, the selection unit performs, in a predetermined order, control to sequentially connect each of the first and second capacitive elements to the first post-stage node, control to sequentially connect each of the third and fourth capacitive elements to the first post-stage node, control to sequentially connect each of the fifth and sixth capacitive elements to the second post-stage node, and control to sequentially connect each of the seventh and eighth capacitive elements to the second post-stage node.

17. The solid-state imaging element according to claim 15, wherein
in a predetermined addition mode, the short-circuit transistor is in a closed state, and
in the addition mode, the selection unit sequentially performs control to connect one of the fifth and sixth capacitive elements and one of the seventh and eighth capacitive elements to the second post-stage node while connecting one of the first and second capacitive elements and one of the third and fourth capacitive elements to the first post-stage node, and control to connect the other of the fifth and sixth capacitive elements and the other of the seventh and eighth capacitive elements to the second post-stage node while connecting the other of the first and second capacitive elements and the other of the third and fourth capacitive elements to the first post-stage node.

18. The solid-state imaging element according to claim 6, wherein
the predetermined number of capacitive elements include first and second capacitive elements and a third capacitor,
the pre-stage circuit block includes
a first photoelectric conversion element,
a first pre-stage transfer transistor that transfers charges from the first photoelectric conversion element to a predetermined floating diffusion layer,
a second photoelectric conversion element,
a second pre-stage transfer transistor that transfers charges from the second photoelectric conversion element to a predetermined floating diffusion layer,
a reset transistor that initializes the floating diffusion layer, and
a pre-stage amplification transistor that amplifies a voltage of the floating diffusion layer and outputs the amplified voltage to a predetermined pre-stage node, and
the first and second capacitive elements and the third capacitive element have their respective one ends commonly connected to the pre-stage node, and have their respective another ends connected to the selection unit.

19. The solid-state imaging element according to claim 18, wherein
at predetermined exposure start timing, the first and second pre-stage transfer transistors transfer the charges to the floating diffusion layer, and the reset transistor initializes the floating diffusion layer and the first and second photoelectric conversion elements, and
at predetermined exposure end timing, the first and second pre-stage transfer transistors sequentially transfer the charges to the first and second floating diffusion layers.

20. The solid-state imaging element according to claim 18, wherein
the selection unit sequentially performs control to connect one of the first and second capacitive elements to the post-stage node, control to connect the other of the first and second capacitive elements to the post-stage node, and control to connect the third capacitive element to the post-stage node.

* * * * *